United States Patent
Kubota et al.

(10) Patent No.: US 11,794,702 B2
(45) Date of Patent: Oct. 24, 2023

(54) CLEANER, SENSOR WITH CLEANER, AND VEHICLE INCLUDING CLEANER OR SENSOR WITH CLEANER

(71) Applicant: KOITO MANUFACTURING CO., LTD., Tokyo (JP)

(72) Inventors: Akinobu Kubota, Shizuoka (JP); Yasuhiro Ichikawa, Shizuoka (JP); Junji Baba, Shizuoka (JP); Kazuki Kawamura, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 1203 days.

(21) Appl. No.: 16/330,712

(22) PCT Filed: Sep. 4, 2017

(86) PCT No.: PCT/JP2017/031809
§ 371 (c)(1),
(2) Date: Mar. 5, 2019

(87) PCT Pub. No.: WO2018/043743
PCT Pub. Date: Mar. 8, 2018

(65) Prior Publication Data
US 2020/0324738 A1 Oct. 15, 2020

(30) Foreign Application Priority Data

Sep. 5, 2016 (JP) .................................. 2016-172534
Sep. 5, 2016 (JP) .................................. 2016-172535
(Continued)

(51) Int. Cl.
*B60S 1/54* (2006.01)
*B60R 11/04* (2006.01)
(Continued)

(52) U.S. Cl.
CPC ................. *B60S 1/54* (2013.01); *B60R 11/04* (2013.01); *B60S 1/60* (2013.01); *B60Q 1/0023* (2013.01); *B60R 2011/004* (2013.01)

(58) Field of Classification Search
CPC ... B60S 1/54; B60S 1/60; B60R 11/04; B60R 2011/004; B60Q 1/0023
(Continued)

(56) References Cited

U.S. PATENT DOCUMENTS

2009/0314847 A1* 12/2009 Nemoto ............. B60H 1/00828
237/12.3 A
2011/0073142 A1  3/2011 Hattori et al.
(Continued)

FOREIGN PATENT DOCUMENTS

CN    102756712 A    10/2012
CN    103286097 A    9/2013
(Continued)

OTHER PUBLICATIONS

Office Action issued in corresponding Chinese application No. 201780054110.8, dated Aug. 4, 2021, with English translation (20 pages).
(Continued)

*Primary Examiner* — Matthew David Kim
(74) *Attorney, Agent, or Firm* — Osha Bergman Watanabe & Burton LLP

(57) ABSTRACT

A cleaner for cleaning an object to be cleaned includes a generation unit configured to generate high-pressure air, a nozzle configured to inject the high-pressure air toward a cleaning surface of the object to be cleaned, and a control unit configured to control an injection of the high-pressure air. Even when foreign objects do not adhere to the cleaning surface, the control unit executes an operation mode in
(Continued)

which the high-pressure air is generated and injected when a predetermined condition is satisfied.

9 Claims, 39 Drawing Sheets

(30) Foreign Application Priority Data

| Sep. 5, 2016 | (JP) | 2016-172536 |
| Sep. 5, 2016 | (JP) | 2016-172537 |
| Oct. 14, 2016 | (JP) | 2016-202472 |
| Nov. 21, 2016 | (JP) | 2016-226095 |
| Aug. 30, 2017 | (JP) | 2017-165445 |

(51) Int. Cl.
*B60S 1/60* (2006.01)
*B60Q 1/00* (2006.01)
*B60R 11/00* (2006.01)

(58) Field of Classification Search
USPC .......................................................... 15/319
See application file for complete search history.

(56) References Cited

U.S. PATENT DOCUMENTS

| 2011/0266375 A1* | 11/2011 | Ono | B60S 1/0848 |
| | | | 239/589 |
| 2012/0266926 A1 | 10/2012 | Kikuta et al. | |
| 2013/0092758 A1* | 4/2013 | Tanaka | B60S 1/52 |
| | | | 239/284.1 |
| 2013/0219742 A1 | 8/2013 | Field et al. | |
| 2015/0177512 A1 | 6/2015 | Hayakawa et al. | |
| 2015/0296108 A1* | 10/2015 | Hayakawa | B60R 1/00 |
| | | | 348/148 |
| 2015/0343999 A1 | 12/2015 | Lopez Galera et al. | |
| 2016/0103316 A1 | 4/2016 | Rousseau | |
| 2017/0210304 A1 | 7/2017 | Davies et al. | |
| 2017/0313286 A1 | 11/2017 | Galera et al. | |
| 2018/0272996 A1* | 9/2018 | Nielsen | B60S 1/52 |

FOREIGN PATENT DOCUMENTS

| CN | 104507765 A | 4/2015 |
| CN | 104508552 A | 4/2015 |
| CN | 105499183 A | 4/2016 |
| CN | 106536296 A | 3/2017 |
| EP | 2631734 A1 | 8/2013 |
| JP | 2001-171491 A | 6/2001 |
| JP | 2014-37239 A | 2/2014 |
| JP | 2015-137070 A | 7/2015 |
| JP | 2015-224032 A | 12/2015 |
| JP | 2016-9099 A | 1/2016 |

OTHER PUBLICATIONS

International Search Report issued in Application No. PCT/JP2017/031809, dated Dec. 5, 2017 (9 pages).

Written Opinion issued in International Application No. PCT/JP2017/031809, dated Dec. 5, 2017 (7 pages).

Extended European Search Report issued in corresponding European Application No. 17846746.0, dated Mar. 31, 2020 (7 pages).

* cited by examiner

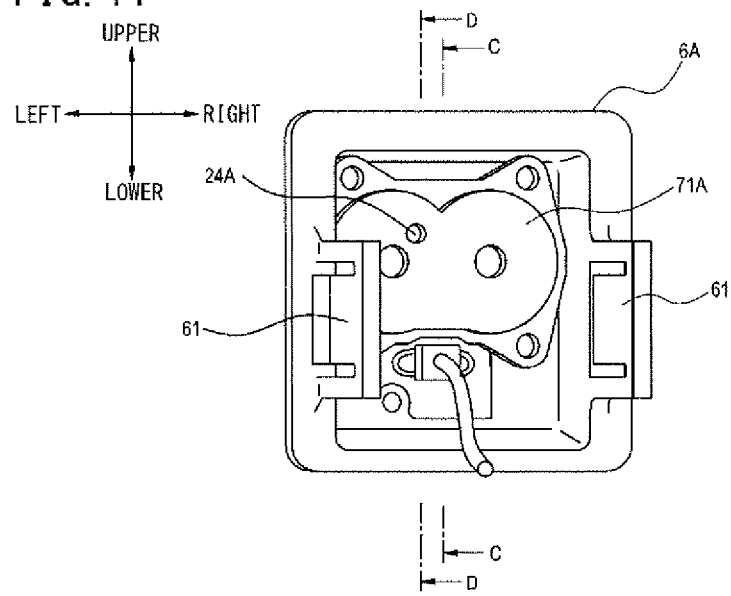

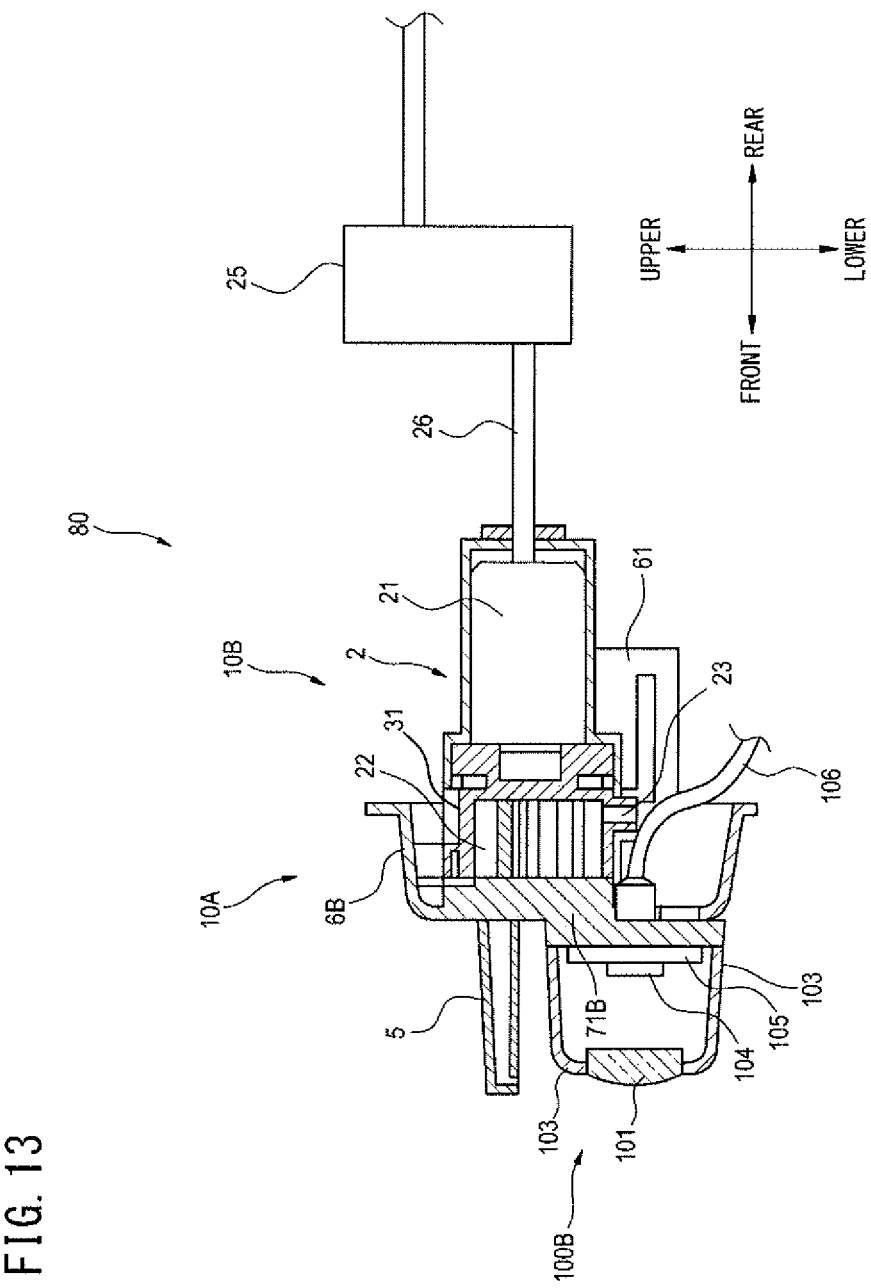

CLEANER, SENSOR WITH CLEANER, AND VEHICLE INCLUDING CLEANER OR SENSOR WITH CLEANER

CROSS-REFERENCE TO RELATED APPLICATIONS

The present application is a national stage application of PCT Application No. PCT/JP2017/031809, and claims priority to Japanese Patent Application No. 2016-172534 filed on Sep. 5, 2016, Japanese Patent Application No. 2016-172535 filed on Sep. 5, 2016, Japanese Patent Application No. 2016-172536 filed on Sep. 5, 2016, Japanese Patent Application No. 2016-172537 filed on Sep. 5, 2016, Japanese Patent Application No. 2016-202472 filed on Oct. 14, 2016, Japanese Patent Application No. 2016-226095 filed on Nov. 21, 2016, and Japanese Patent Application No. 2017-165445 filed on Aug. 30, 2017, the contents of which are incorporated herein by reference in their entirety.

BACKGROUND

Technical Field

The disclosure relates to a cleaner for cleaning an object to be cleaned, a sensor with a cleaner, and a vehicle including the cleaner or the sensor with the cleaner.

Related Art

Recently, the number of vehicles equipped with in-vehicle cameras for photographing the situations around the vehicle is increasing. In the in-vehicle cameras, there is a case that a lens serving as an imaging surface becomes dirty due to rain, mud or the like. Therefore, conventionally, a device for removing foreign objects by blowing cleaning liquid or compressed air or the like to the lens of the in-vehicle camera in order to remove foreign objects such as water droplets adhering on the lens has been known.

For example, Patent Document 1 discloses a configuration in which a compressed air generation unit is installed in the vicinity of an in-vehicle camera, compressed air generated by the compressed air generation unit is injected from a nozzle, and high-pressure air is ejected to a front glass of the in-vehicle camera, thereby removing water droplets adhering to the front glass (see Patent Document 1).
[PATENT DOCUMENT 1] JP-A-2001-171491

SUMMARY OF INVENTION

In the configuration of Patent Document 1, the compressed air generation unit and the nozzle are configured separately from the in-vehicle camera, and there is room for improvement in workability and space saving when installing these parts in a vehicle.

In the configuration of Patent Document 1, the compressed air generation unit and the nozzle are configured separately from the in-vehicle camera, and there is room for enhancement in the layout of these parts in order to realize further space saving.

In the configuration of Patent Document 1, the compressed air generation unit and the nozzle are configured separately from the in-vehicle camera, and the number of parts is large.

In order to improve the performance of removing foreign objects on a camera lens by high-pressure air injected from a nozzle, there is room for improvement in the shape and position of the nozzle to the camera lens. On the other hand, particularly when arranging a nozzle for a camera lens having a wide angle of view, it is necessary to devise the arrangement of the nozzle so that the nozzle does not appear in the captured image of the camera.

When ice and snow adhere to a front glass of an in-vehicle camera in winter or the like, that is, when the front glass is frozen, it is conceivable to constantly eject high-pressure air to the front glass to melt it. However, when the compressed air generation unit is constantly operated, the service life is shortened due to consumption of each member and the like.

The compressed air generation unit of Patent Document 1 intermittently repeats, multiple times, the operation of ejecting air at a high pressure. However, in the case where ice and mud and the like adhere to the front glass or lens of the camera, there is a possibility that the compressed air generation unit of Patent Document 1 is insufficient to remove ice and mud adhering to the front glass.

One or more embodiments in the present disclosure aims to provide a cleaner capable of improving installation workability and realizing the space saving and a vehicle including the cleaner.

One or more embodiments in the present disclosure aims to provide a cleaner capable of realizing the space saving by efficient component layout and a vehicle including the cleaner.

One or more embodiments in the present disclosure aims to provide a sensor with a cleaner capable of reducing the number of parts and a vehicle including the sensor with the cleaner.

One or more embodiments in the present disclosure aims to provide a cleaner capable of arranging a nozzle at a position where it does not appear in a capture image of a camera and improving the performance of removing foreign objects on a camera lens and a vehicle including the cleaner.

One or more embodiments in the present disclosure aims to provide a cleaner which can prevent foreign objects from adhering to a cleaning surface of an object to be cleaned and which has a long service life, and a vehicle including the cleaner.

One or more embodiments in the present disclosure aims to provide a cleaner capable of efficiently removing foreign objects adhering to an object to be cleaned and a vehicle including the cleaner.

A cleaner according to one or more embodiments of the disclosure is a cleaner for cleaning an object to be cleaned, the cleaner including a generation unit configured to generate high-pressure air, and a nozzle configured to inject the high-pressure air toward a cleaning surface of the object to be cleaned, in which the generation unit is configured integrally with a bracket supporting the object to be cleaned.

According to this configuration, it is possible to improve installation workability and realize the space saving.

Further, in the cleaner according to one or more embodiments of the disclosure, the generation unit may have a compression chamber for compressing air and discharging the high-pressure air to the nozzle side, the bracket may have a conduit line having one end to which the nozzle is connected, and an exhaust port provided in the compression chamber may be connected to the other end of the conduit line.

According to this configuration, the generation unit and the nozzle can be integrated with the bracket by a simple configuration.

Further, in the cleaner according to one or more embodiments of the disclosure, the generation unit may have a compression chamber for compressing air and discharging the high-pressure air to the nozzle side, and at least a part of a casing defining the compression chamber may be formed integrally with the bracket.

According to this configuration, the generation unit can be integrated with the bracket by a simple configuration.

Further, in the cleaner according to one or more embodiments of the disclosure, an exhaust port for discharging the high-pressure air to the nozzle may be formed at the portion of the casing formed integrally with the bracket.

According to this configuration, high-pressure air generated in the compression chamber can be appropriately fed to the nozzle while ensuring the waterproofness between the generation unit and the bracket.

Further, in the cleaner according to one or more embodiments of the disclosure, the cleaning surface may have a partition wall interposed between an in-vehicle sensor attached to a vehicle and a measurement target of the in-vehicle sensor, and the bracket may be attached to an opening portion formed in a vehicle body panel of the vehicle.

According to this configuration, the cleaner for cleaning the in-vehicle sensor can be efficiently attached to a vehicle body panel together with the in-vehicle sensor.

Further, in the cleaner according to one or more embodiments of the disclosure, the partition wall may include a lens of the in-vehicle camera, and the lens may be attached so as to be exposed toward an outside of the vehicle body panel.

Particularly, this configuration is preferably applied to a cleaner for cleaning a lens of an in-vehicle camera exposed to an outside of a vehicle body.

Further, in the cleaner according to one or more embodiments of the disclosure, the bracket may be formed integrally with the object to be cleaned.

According to this configuration, the object to be cleaned and the generation unit are configured integrally. Therefore, it is possible to reduce the number of parts and further improve installation workability.

Further, in the cleaner according to one or more embodiments of the disclosure, the bracket may be configured separately from the object to be cleaned, and the object to be cleaned may be assembled to the bracket.

According to this configuration, it is possible to apply the cleaner to different kinds of objects to be cleaned.

Further, a vehicle according to one or more embodiments of the disclosure includes the cleaner having any one of the configurations described above.

According to this configuration, it is possible to improve installation workability of the cleaner and realize the space saving of the cleaner.

A cleaner according to one or more embodiments of the disclosure is a cleaner for cleaning an object to be cleaned, the cleaner including a generation unit configured to generate high-pressure air, and a nozzle configured to inject the high-pressure air toward a cleaning surface of the object to be cleaned, in which the generation unit has a driving unit and a compression chamber for compressing air based on the operation of the driving unit to generate the high-pressure air, and the compression chamber is disposed between the driving unit and the object to be cleaned.

According to this configuration, the layout of the driving unit and the compression chamber constituting the generation unit is efficiently made with respect to the object to be cleaned, so that space saving can be realized.

Further, in the cleaner according to one or more embodiments of the disclosure, the driving unit, the compression chamber, and the nozzle may be arranged in this order on a straight line.

According to this configuration, it is possible to realize more efficient layout.

Further, in the cleaner according to one or more embodiments of the disclosure, the generation unit may have a control unit for operating the driving unit, and the control unit may be disposed on the side of the driving unit different from the side to which the compression chamber is close.

According to this configuration, it is possible to realize more efficient layout of the cleaner including the control unit.

Further, in the cleaner according to one or more embodiments of the disclosure, the object to be cleaned may have a partition wall interposed between an in-vehicle sensor attached to a vehicle and a measurement target of the in-vehicle sensor, the generation unit and the nozzle may be configured integrally with a bracket supporting the in-vehicle sensor, and the bracket may be attached to an opening portion formed in a vehicle body panel of the vehicle.

According to this configuration, the in-vehicle sensor and the cleaner can be set to a size that can be attached to a relatively small opening formed in a vehicle body panel. In this way, these members can be easily attached to the vehicle body panel, and working efficiency is improved.

Further, in the cleaner according to one or more embodiments of the disclosure, the partition wall may include a lens of the in-vehicle camera, the lens may be attached so as to be exposed toward an outside of the vehicle body panel, and the generation unit may be disposed on the side of the bracket opposite to the side where the in-vehicle camera is disposed.

According to this configuration, it is preferable that one or more embodiments of the disclosure is particularly applied to a cleaner for cleaning a lens of an in-vehicle camera exposed to an outside of a vehicle body. Further, since the generation unit can be accommodated in, for example, a vehicle interior, it is possible to ensure the waterproofness of the generation unit.

Further, a vehicle according to one or more embodiments of the disclosure includes the cleaner having any one of the configurations described above.

According to this configuration, it is possible to realize the space saving of the cleaner by efficient component layout of the cleaner.

A sensor with a cleaner according to one or more embodiments of the disclosure includes a sensor unit and a cleaner, in which the cleaner includes a generation unit configured to generate high-pressure air, and a nozzle configured to inject the high-pressure air toward a partition wall interposed between the sensor unit and a measurement target of the sensor unit, in which at least a part of a housing of the sensor unit and at least a part of a housing of the generation unit are configured as an integral structure.

According to this configuration, it is possible to provide the sensor with the cleaner capable of reducing the number of parts.

Further, in the sensor with the cleaner according to one or more embodiments of the disclosure, the integral structure and the nozzle may be integrally formed.

According to this configuration, it is possible to further reduce the number of parts.

Further, in the sensor with the cleaner according to one or more embodiments of the disclosure, the generation unit may have a compression chamber for compressing air and discharging the high-pressure air to the nozzle side, and the integral structure may have at least a part of a casing defining the compression chamber.

According to this configuration, it is possible to realize efficient layout of the generation unit of the high-pressure air with respect to the sensor.

Further, in the sensor with the cleaner according to one or more embodiments of the disclosure, the integral structure may have a mounting portion for mounting the sensor with the cleaner to an opening of a vehicle body panel of a vehicle.

According to this configuration, the sensor with the cleaner can be simply attached to the vehicle without increasing the number of parts.

Further, in the sensor with the cleaner according to one or more embodiments of the disclosure, at least a part of each of the sensor unit and the nozzle may be disposed so as to be exposed to an outside of the vehicle body panel, and the generation unit may be disposed on the side opposite to the at least part of the sensor unit with respect to the vehicle body panel.

According to this configuration, the generation unit can be accommodated, for example, in a vehicle interior which is not easily influenced by the outside air environment, and it is possible to generate high-pressure air having a relatively high temperature while ensuring the waterproofness. Therefore, foreign objects such as ice adhering to the sensor unit can be effectively removed.

Further, in the sensor with the cleaner according to one or more embodiments of the disclosure, the sensor unit may include an in-vehicle camera, and a lens of the in-vehicle camera may be exposed toward an outside of the vehicle body panel.

Particularly, this configuration is preferably applied to a cleaner for cleaning a lens of an in-vehicle camera exposed to an outside of a vehicle body.

Further, a sensor with a cleaner according to one or more embodiments of the disclosure includes a sensor unit and a cleaner, in which the cleaner includes a generation unit configured to generate high-pressure air, and a nozzle configured to inject the high-pressure air toward a partition wall interposed between the sensor unit and a measurement target of the sensor unit, and in which at least a part of a housing of the sensor unit and the nozzle are configured as an integral structure.

According to this configuration, it is possible to provide the sensor with the cleaner capable of reducing the number of parts.

Further, a vehicle according to one or more embodiments of the disclosure includes the sensor with the cleaner having any one of the configurations described above.

According to this configuration, it is possible to reduce the number of parts of the sensor with the cleaner.

A cleaner according to one or more embodiments of the disclosure is a cleaner for cleaning a lens of a camera, the cleaner including a generation unit configured to generate high-pressure air, and a nozzle configured to inject the high-pressure air toward the lens, in which a first wall portion facing a front surface of the camera is formed in a tip side of the nozzle, and when a center axis passing through a center point of the lens is defined as a first axis and an axis extending perpendicularly to the first axis in an upper and lower direction of the camera and passing through the surface of the lens or a tangent line of the lens is defined as a second axis, the following conditional equation (1) is satisfied.

$$h-1(\text{mm}) \le H \le h+6(\text{mm}), \text{ and, } 0(\text{mm}) \le T \le H \times \tan\theta + 0.5 \text{ (mm)} \quad \text{(Equation 1)}$$

here, $h$(mm): the distance along the second axis from the center point of the lens to the outer end portion of the lens $H$(mm): the shortest distance between the first axis and a tip of the first wall portion $T$(mm): the shortest distance between the second axis and the tip of the first wall portion $\theta$(degree): the angle formed by the second axis and an inner surface of the first wall portion According to this configuration, it is possible to provide the cleaner capable of arranging the nozzle at a position where it does not appear in the capture image of the camera and improving the performance of removing foreign objects on the camera lens.

Further, in the cleaner according to one or more embodiments of the disclosure, the shortest distance H may be 3 mm or more but 31 mm or less, and, the shortest distance T may be 0 mm or more but 5.5 mm or less.

Further, in the cleaner according to one or more embodiments of the disclosure, when the distance h is 4 mm or more but 6 mm or less, the shortest distance H may be 3 mm or more but 12 mm or less.

Further, in the cleaner according to one or more embodiments of the disclosure, the angle θ may be 0 degree or more but 45 degrees or less.

Further, in the cleaner according to one or more embodiments of the disclosure, the angle θ may be 0 degree or more but 10 degrees or less.

Further, in the cleaner according to one or more embodiments of the disclosure, the first wall portion may have a flat shape along the second axis direction, and the following conditional equation (2) may be satisfied.

$$0.5(\text{mm}) \le L \le d - h + 2.5(\text{mm}) \quad \text{(Equation 2)}$$

here, $L$(mm): the length of the flat shape portion $d$(mm): the distance along the second axis from the center point of the lens to the outer edge portion of a housing of the camera Further, in the cleaner according to one or more embodiments of the disclosure, when the distance h is 4 mm or more but 6 mm or less and the distance d is 4 mm or more but 13.5 mm or less, the length L may be 0.5 mm or more but 10.0 mm or less.

Further, in the cleaner according to one or more embodiments of the disclosure, the nozzle further may include a joint conduit line formed between the first wall portion and the generation unit, and an angle γ formed by an inner surface of the first wall portion and an inner surface of the joint conduit line may be 90 degrees or more but 170 degrees or less, and the first wall portion and the joint conduit line may be connected by a curved portion having an inscribed circle of R1(mm) or more.

Further, in the cleaner according to one or more embodiments of the disclosure, the angle γ may be 90 degrees or more but 120 degrees or less.

Further, in the cleaner according to one or more embodiments of the disclosure, when an axis extending perpendicularly to the first axis and the second axis in a right and left direction of the camera is defined as a third axis, the following conditional equation (3) may be satisfied.

$$Wh - 2(\text{mm}) \le W \le Wh \quad \text{(Equation 3)}$$

here, $Wh$(mm): the width of the lens along the third axis $W$(mm): the width of the first wall portion along the third axis Further, in the cleaner according to one or more embodiments of the disclosure, the width W may be 2 mm or more but 12 mm or less.

Further, in the cleaner according to one or more embodiments of the disclosure, the nozzle may have a pair of second wall portions extending from both side surfaces of the first wall portion toward the lens, and when an axis extending perpendicularly to the first axis and the second axis in a right and left direction of the camera is defined as a third axis, the following conditional equation (4) may be satisfied.

[Formula 1]

$$\omega = 2\tan^{-1}\left(\frac{W - 1.55(\text{mm})}{2(d - h + 2.5(\text{mm}))}\right) \quad \text{(Equation 4)}$$

here,

W(mm): the width of the first wall portion along the third axis

ω(degree): the angle formed by the pair of second wall portions

Further, in the cleaner according to one or more embodiments of the disclosure, the angle ω may be 0 degree or more but 70 degrees or less.

Further, in the cleaner according to one or more embodiments of the disclosure, the lens may be a convex lens, and when an axis extending perpendicularly to the first axis and the second axis in a right and left direction of the camera is defined as a third axis, the following conditional equation (5) may be satisfied.

$$r \leq R \leq r+50(\text{mm}) \quad \text{(Equation 5)}$$

here,

R(mm): the radius of curvature of the first wall portion along the third axis r(mm): the radius of curvature of the surface of the lens along the third axis Further, in the cleaner according to one or more embodiments of the disclosure, when an injection opening portion for the high-pressure air is defined by the first wall portion, the pair of second wall portions, and a straight line connecting ends of the pair of second wall portions on the side opposite to the front wall portion, and an opening area of the injection opening portion is defined as S(mm²), the following conditional equation (6) may be satisfied.

$$7.5(\text{mm}^2) \leq S \leq W \times (T+2) \quad \text{(Equation 6)}$$

Further, in the cleaner according to one or more embodiments of the disclosure, the opening area S may be 7.5 mm² or more but 90 mm² or less.

Further, in the cleaner according to one or more embodiments of the disclosure, the nozzle may be disposed so that an angle α formed by a center axis of the first wall portion and the second axis is −60 degrees or more but +60 degrees or less, in the front view of the camera.

Further, in the cleaner according to one or more embodiments of the disclosure, the angle α may be −20 degrees or more but +20 degrees or less.

Specifically, since the nozzle has these configurations with respect to the camera lens, it is possible to arrange the nozzle at a position where it does not appear in the capture image of the camera and improve the performance of removing foreign objects on the camera lens.

Further, in the cleaner according to one or more embodiments of the disclosure, the camera may be an in-vehicle camera attached to a vehicle so that the lens is exposed toward an outside of a body panel of the vehicle.

Particularly, this configuration is preferably used as a cleaner for cleaning a lens of an in-vehicle camera.

Further, a vehicle including the cleaner according to one or more embodiments of the disclosure includes the cleaner having any one of the configurations described above.

According to this configuration, it is possible to arrange the nozzle at a position where it does not appear in the capture image of the camera and improve the performance of removing foreign objects on the camera lens.

A cleaner one or more embodiments of the disclosure is a cleaner for cleaning an object to be cleaned, the cleaner including a generation unit configured to generate high-pressure air, a nozzle configured to inject the high-pressure air toward a cleaning surface of the object to be cleaned, and a control unit configured to control the injection of the high-pressure air, in which even when foreign objects do not adhere to the cleaning surface, the control unit executes an operation mode in which the high-pressure air is generated and injected when a predetermined condition is satisfied.

According to this configuration, it is possible to provide the cleaner which can prevent adhesion of foreign objects to the cleaning surface of the object to be cleaned, in particular, icing and freezing, and which has a long service life.

Further, in the cleaner according to one or more embodiments of the disclosure, the object to be cleaned may include at least one of a vehicle lamp and an in-vehicle sensor mounted on a vehicle, and the predetermined condition may include detection of a situation in which an outside air temperature of the vehicle is equal to or lower than a predetermined temperature.

According to this configuration, high-pressure air can be efficiently injected to the cleaning surface when the freezing of the cleaning surface of the object to be cleaned is expected. In this way, it is possible to prevent icing and freezing on the cleaning surface.

Further, in the cleaner according to one or more embodiments of the disclosure, the operation mode may include a constant operation mode in which the high-pressure air is constantly injected, a first intermittent operation mode in which the high-pressure air is intermittently injected at a predetermined cycle, and a second intermittent operation mode in which the high-pressure air is injected at a cycle shorter than in the first intermittent operating mode.

According to this configuration, the operating mode is switched according to the adhesion state of foreign objects to the cleaning surface, so that high-pressure air can be efficiently injected to the cleaning surface while preventing the service life of the cleaner from being lowered.

Further, in the cleaner according to one or more embodiments of the disclosure, as the predetermined condition, when it is detected that the outside air temperature is equal to or lower than the predetermined temperature, the control unit may execute the constant operation mode.

According to this configuration, in a situation where freezing of the cleaning surface of the object to be cleaned is expected, high-pressure air is constantly injected to the cleaning surface. In this way, the freezing of the cleaning surface can be prevented and the de-icing of the cleaning surface can be performed.

Further, in the cleaner according to one or more embodiments of the disclosure, as the predetermined condition, when it is detected that the outside air temperature is higher than the predetermined temperature, the control unit may execute the first intermittent operation mode when it is detected that a travelling speed of the vehicle is lower than a predetermined speed, and the control unit may execute the second intermittent operation mode when it is detected that the travelling speed is faster than the predetermined speed.

According to this configuration, even when the outside air temperature is higher than a certain temperature, high-pressure air can be intermittently injected to the cleaning surface while switching the operating mode according to a vehicle speed. In this way, foreign objects such as raindrops adhering to the cleaning surface can be efficiently removed.

Further, in the cleaner according to one or more embodiments of the disclosure, the predetermined temperature may be 3° C.

Further, in the cleaner according to one or more embodiments of the disclosure, the predetermined speed may be 50 km/h.

It is preferable to adopt these numerical values as the thresholds of the outside air temperature of the vehicle and the vehicle speed.

Further, in the cleaner according to one or more embodiments of the disclosure, the object to be cleaned may be a back camera attached to a rear portion of a vehicle so that its lens is exposed toward an outside of a body panel of the vehicle, and the control unit may execute the constant operation mode when it is detected that a shift position of a transmission of the vehicle is switched to a reverse range.

According to this configuration, the constant operating mode is executed in a situation where it is expected that the vehicle will start back travelling, so that foreign objects such as raindrops adhering to the lens of the back camera can be reliably removed.

Further, in the cleaner according to one or more embodiments of the disclosure, the operation mode may include a foreign object removal mode for removing foreign objects when it is detected that foreign objects adhere to the cleaning surface, and a foreign object adhesion preventing mode for preventing adhesion of foreign objects when it is not detected that foreign objects adhere to the cleaning surface.

According to this configuration, the operation mode is switched according to the presence or absence of adhesion of foreign objects to the cleaning surface, so that high-pressure air can be efficiently injected to the cleaning surface while preventing the service life of the cleaner from being lowered.

Further, in the cleaner according to one or more embodiments of the disclosure, the object to be cleaned may be an in-vehicle camera attached to a vehicle so that its lens is exposed toward an outside of a body panel of the vehicle.

Particularly, one or more embodiments in the disclosure is preferably used as a cleaner for cleaning a lens of an in-vehicle camera.

Further, a vehicle including the cleaner according to one or more embodiments of the disclosure includes the cleaner having any one of the configurations described above.

According to this configuration, it is possible to provide the vehicle including the cleaner which can prevent adhesion of foreign objects to the cleaning surface of the object to be cleaned and which has a long service life.

A cleaner according to one or more embodiments of the disclosure is a cleaner for cleaning an object to be cleaned, the cleaner including a rotary positive displacement pump configured to generate high-pressure air, and a nozzle configured to inject the high-pressure air toward a cleaning surface of the object to be cleaned.

According to this configuration, the rotary positive displacement pump capable of more continuously injecting high-pressure air than a conventional type pump is used. Therefore, foreign objects adhering to the object to be cleaned, for example, ice or mud or the like can be efficiently removed.

Further, in the cleaner according to one or more embodiments of the disclosure, the rotary positive displacement pump may include a cylinder forming a compression chamber, a pair of rotating shafts accommodated in the cylinder and configured to synchronously rotate in parallel with each other in opposite directions, a pair of rotors respectively fixed to the pair of rotating shafts in the cylinder and having hook-shaped claw portions meshing with each other in a non-contact state, and an intake port and an exhaust port formed in the cylinder and respectively communicating with the compression chamber, the exhaust port may communicate with the nozzle, and each axial direction of the pair of rotating shafts may coincide with an extending direction of the nozzle.

According to this configuration, high-pressure air generated by the rotary pump can be continuously ejected from the nozzle while realizing the space saving.

Further, in the cleaner according to one or more embodiments of the disclosure, the cylinder may have a cylindrical portion having a cross-sectional shape obtained by partially overlapping two circles, and a pair of side walls formed on both end surface of the cylindrical portion, the exhaust port may be formed in one of the pair of side walls, and the intake port may be formed in the cylindrical portion or in the other of the pair of side walls.

According to this configuration, it is possible to realize the space saving while appropriately generating high-pressure air.

Further, in the cleaner according to one or more embodiments of the disclosure, the intake port may be formed in a portion of the cylindrical portion, in which the two circles are partially overlapped.

According to this configuration, it is possible to efficiently feed air to the compression chamber.

Further, in the cleaner according to one or more embodiments of the disclosure, the intake port may be formed in each of the two circles of the cylindrical portion.

According to this configuration, it is possible to efficiently feed air to the compression chamber.

Further, in the cleaner according to one or more embodiments of the disclosure, the rotary positive displacement pump may further include a rotary driving device configured to rotationally drive the pair of rotors via the pair of rotating shafts, and the direction of a driving shaft of the rotary driving device may coincide with the axial direction and the extending direction.

According to this configuration, the respective members of the rotary positive displacement pump can be arranged linearly with respect to the nozzle, so that the space saving can be further realized.

Further, in the cleaner according to one or more embodiments of the disclosure, the object to be cleaned may include an in-vehicle sensor attached to a vehicle, the rotary positive displacement pump and the nozzle may be mounted on a bracket attached to an opening of a vehicle body panel of the vehicle together with the in-vehicle sensor, and the intake port may be disposed on the side of the bracket opposite to the side to which the nozzle is attached.

According to this configuration, the intake port is provided in, for example, a vehicle interior, so that relatively warm air can be fed into the compression chamber. In this way, foreign objects adhering to the object to be cleaned, in particular, ice can be efficiently removed.

Further, in the cleaner according to one or more embodiments of the disclosure, the in-vehicle sensor may include an in-vehicle camera, and a lens of the in-vehicle camera may be attached so as to be exposed toward an outside of the vehicle body panel.

Particularly, this configuration is preferably applied to a cleaner for cleaning a lens of an in-vehicle camera exposed to an outside of a vehicle body.

Further, a vehicle according to one or more embodiments of the disclosure includes the cleaner having any one of the configurations described above.

According to this configuration, it is possible to efficiently remove foreign objects adhering to the object to be cleaned by the cleaner.

According to the cleaner according to one or more embodiments of the disclosure, it is possible to improve installation workability and realize the space saving. Further, according to the vehicle including the cleaner according to one or more embodiments of the disclosure, it is possible to improve installation workability of the cleaner and realize the space saving of the cleaner.

According to the cleaner according to one or more embodiments of the disclosure, it is possible to realize the space saving by efficient component layout. Further, according to the vehicle including the cleaner according to one or more embodiments of the disclosure, it is possible to realize the space saving of the cleaner by efficient component layout of the cleaner.

According to the sensor with the cleaner, it is possible to reduce the number of parts. Further, according to the vehicle including the sensor with the cleaner according to one or more embodiments of the disclosure, it is possible to reduce the number of parts of the sensor with the cleaner.

According to according to one or more embodiments in the disclosure, it is possible to provide the cleaner capable of arranging the nozzle at a position where it does not appear in the capture image of the camera and improving the performance of removing foreign objects on the camera lens and the vehicle including the cleaner.

According to according to one or more embodiments in the disclosure, it is possible to provide the cleaner which can prevent foreign objects from adhering to the cleaning surface of the object to be cleaned and which has a long service life, and the vehicle including the cleaner.

According to the cleaner according to one or more embodiments of the disclosure, foreign objects adhering to the object to be cleaned can be efficiently removed. Further, according to the vehicle including the cleaner according to one or more embodiments of the disclosure, foreign objects adhering to the object to be cleaned can be efficiently removed by the cleaner.

BRIEF DESCRIPTION OF DRAWINGS

FIG. 11 is a rear perspective view of a bracket shown in FIG. 9;

FIG. 13 is a sectional view of a camera with a cleaner according to a third embodiment;

DETAILED DESCRIPTION

Hereinafter, embodiments of the disclosure will be described with reference to the drawings. In embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid obscuring the disclosure.

The cleaner described in the present specification is applied as a device (foreign object removal device) for cleaning, with high-pressure air, foreign objects such as water droplets, mud and dust adhering to a lens of an in-vehicle sensor (e.g., including an in-vehicle camera) which is an example of an object to be cleaned.

Figure 1:
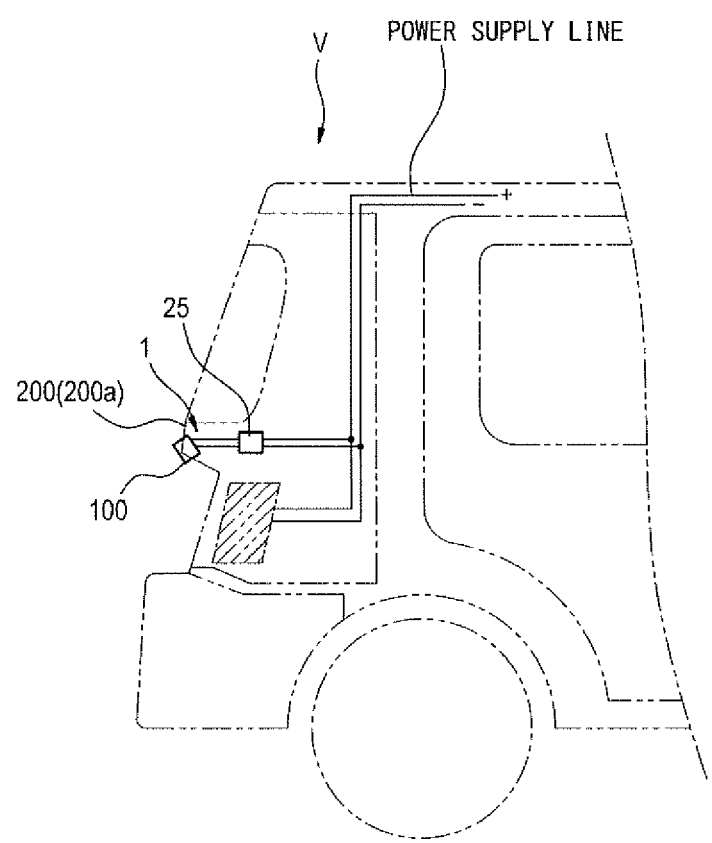
FIG. 1 is a side view of a rear part of a vehicle (an in-vehicle camera and a cleaner are shown in perspective)

As shown in FIG. 1, a cleaner 1 is attached to, for example, a vehicle body panel 200a of a back door 200 of a vehicle V. The vehicle body panel 200a includes a body panel, a garnish provided outside the body panel, and the like. The cleaner 1 includes a control unit 25 (to be described later), and a power supply terminal of the control unit 25 is connected to a power supply line of the vehicle V.

Meanwhile, for example, the cleaner 1 may be attached to a rear bumper or the like of the vehicle V.

Figure 2:
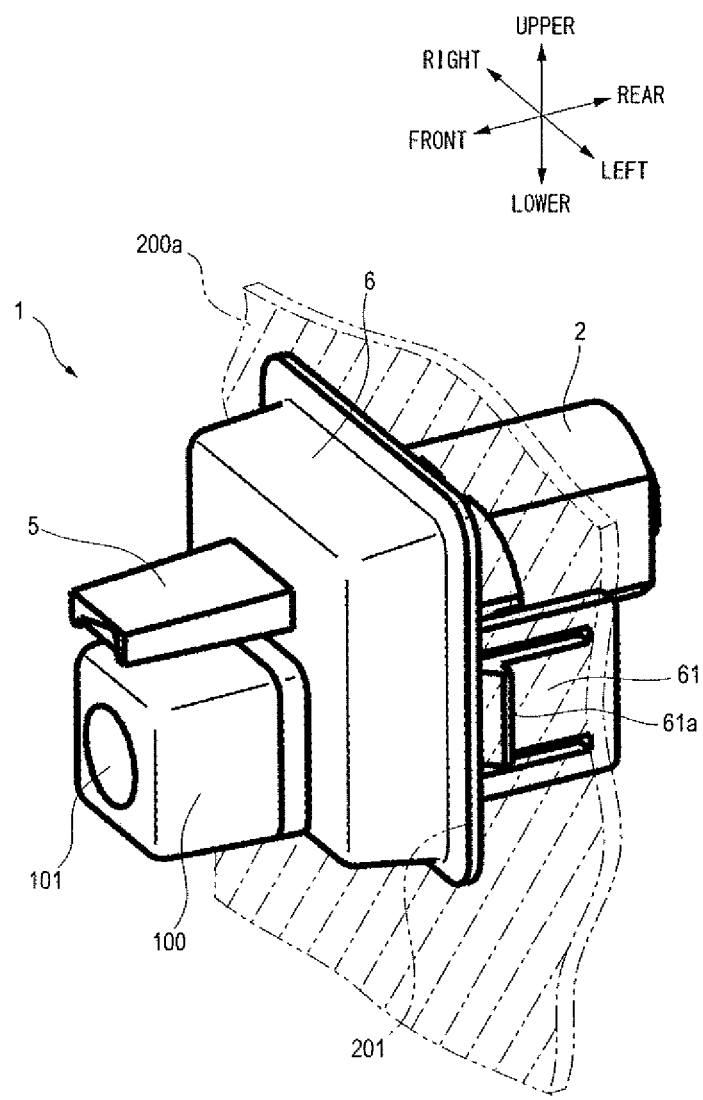
FIG. 2 is a front perspective view of an in-vehicle camera and a cleaner according to a first embodiment of the disclosure.

An in-vehicle camera 100 (an object to be cleaned, an example of the in-vehicle sensor) is a camera for confirming the rear side of the vehicle V, for example. As shown in FIG. 2, the in-vehicle camera 100 is attached to the vehicle body panel 200a so that a lens 101 (an example of the partition wall serving as the cleaning surface) of the in-vehicle camera 100 is exposed to the outside of the vehicle body panel 200a. The in-vehicle camera 100 has an imaging unit (not shown), and the lens 101 covers the imaging unit.

Meanwhile, the in-vehicle camera 100 may be mounted in a vehicle interior, for example. In this case, the in-vehicle camera 100 is installed at a place close to a rear glass (an example of the partition wall serving as the cleaning surface), for example, and confirms an object to be measured on the outer rear side of the vehicle through the rear glass. Further, the in-vehicle camera 100 may be mounted in a rear lamp, for example. In this case, the in-vehicle camera 100 confirms an object to be measured on the outer rear side of the vehicle through an outer cover (an example of the partition wall serving as the cleaning surface) of the rear lamp.

Further, the in-vehicle camera 100 may be mounted in an interior of another in-vehicle part that is the object to be cleaned (that includes the object to be cleaned). For example, the in-vehicle camera 100 may be mounted in a side turn signal lamp (STSL).

First Embodiment

Figure 3:
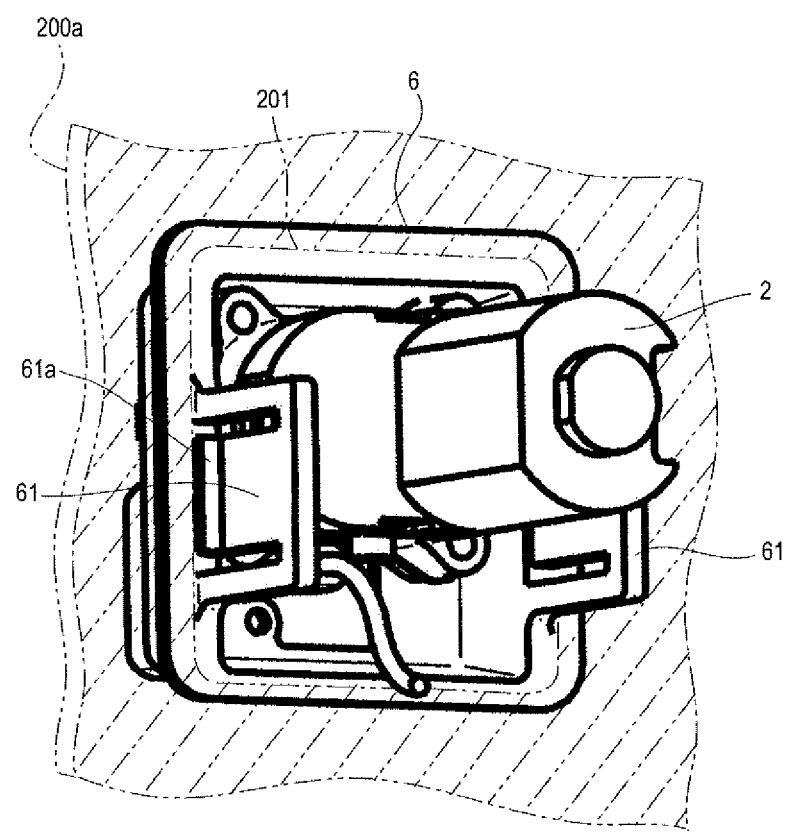
FIG. 3 is a rear perspective view of the in-vehicle camera and the cleaner of FIG. 2.

As shown in FIGS. 2 and 3, the cleaner 1 according to the first embodiment includes a pump 2 (an example of the generation unit) that generates high-pressure air for cleaning, and a nozzle 5 that injects high-pressure air toward the lens 101 of the in-vehicle camera 100. In the following, the direction (nozzle side) for feeding high-pressure air by the pump 2 is defined as the front side, and the direction opposite to the feeding direction is defined as the rear side. Further, in the cleaner 1, the side of the nozzle 5 is defined as the upper side, and the side of the in-vehicle camera 100 is defined as the lower side.

The pump 2 and the nozzle 5 are integrally configured via a bracket 6 supporting the in-vehicle camera 100. The nozzle 5 is exposed toward the outside of the vehicle body panel 200a and provided so that an injection portion at the tip thereof is located at a predetermined position with respect to the lens 101. The bracket 6 has a pair of mounting arm portions 61 for attaching to the vehicle body panel 200a. The bracket 6 is attached to the vehicle body panel 200a by engaging a claw portion 61a provided on each mounting arm portion 61 with an opening portion 201 formed in the vehicle body panel 200a.

Meanwhile, in the present specification, the expression "integrally configured" includes that respective members are integrated by an integral molding and that these members are integrated by a mechanical fastening or bonding. For example, each member may be molded of the same material with the same mold, or each member may be respectively molded of separate materials and then may be combined with each other and integrally formed. Meanwhile, each member can be formed of, for example, resin, metal or the like. Further, in the present example, cleaning is performed by injecting high-pressure air to the cleaning surface of the object to be cleaned. Water is not essential for cleaning.

Figure 4:
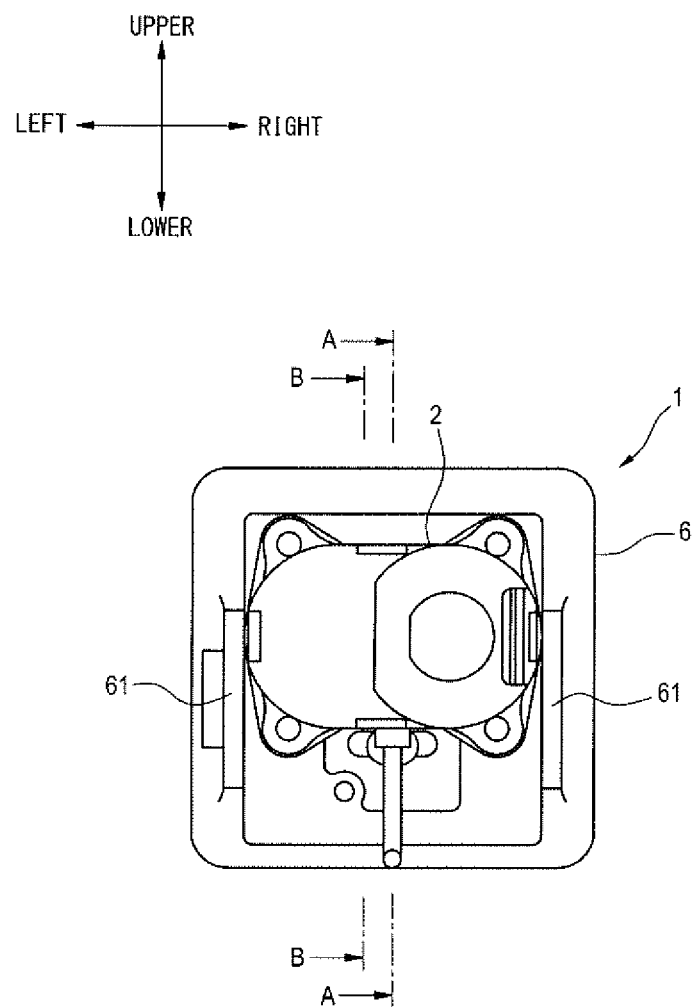
FIG. 4 is a rear view of the cleaner of FIG. 1.
Figure 5:
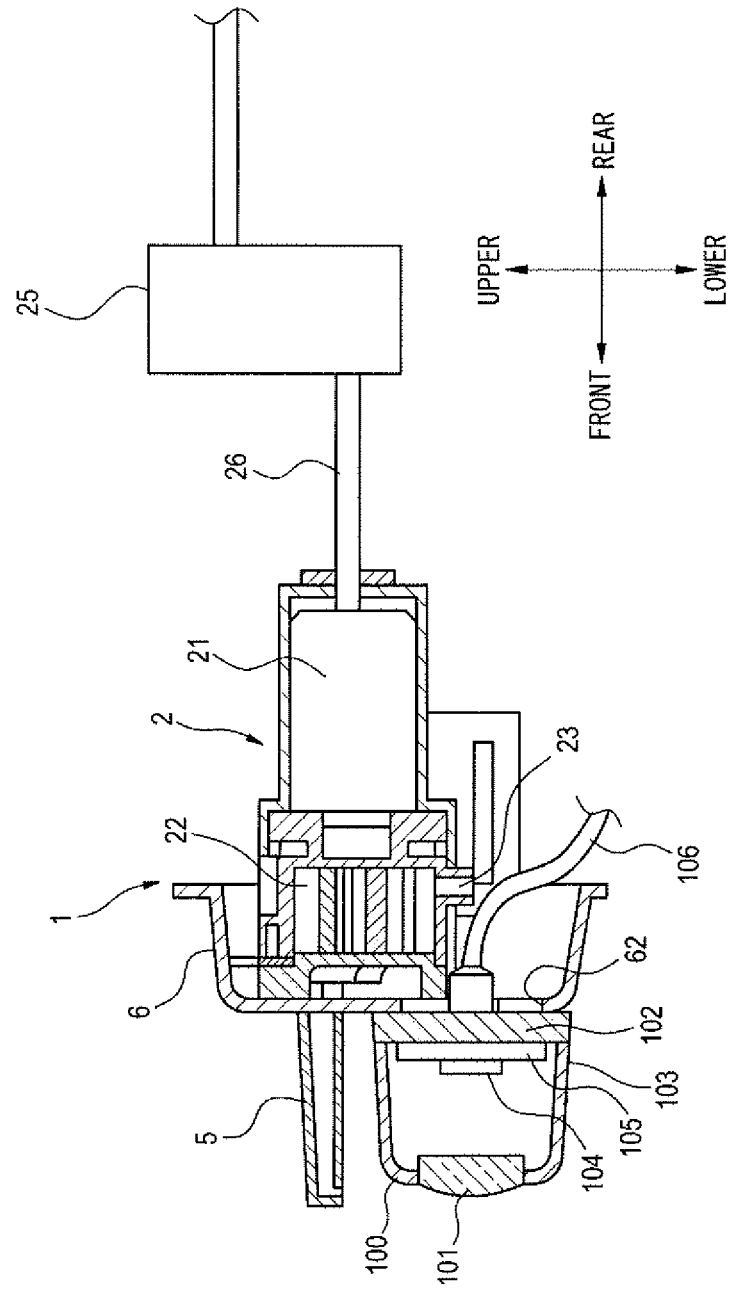
FIG. 5 is a sectional view taken along the line A-A in FIG. 4.

FIG. 4 is a rear view of the cleaner 1. FIG. 5 is a sectional view taken along the line A-A in FIG. 4, and FIG. 6 is a sectional view taken along the line B-B in FIG. 4.

Figure 6:
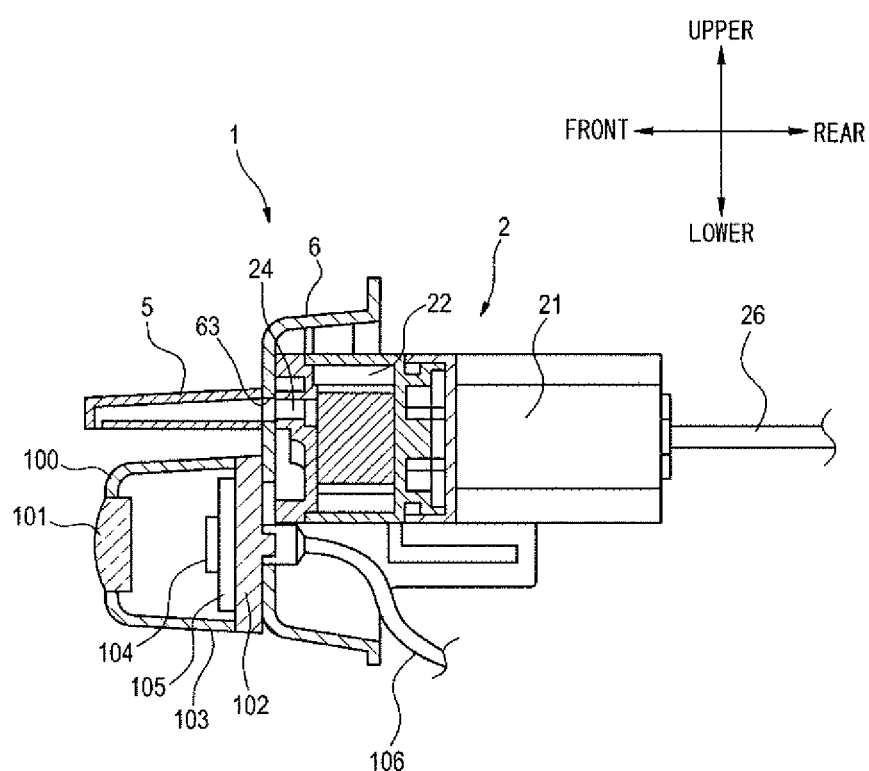
FIG. 6 is a sectional view taken along the line B-B in FIG. 4.

As shown in FIGS. 5 and 6, the bracket 6 is formed in a rectangular bracket shape opened rearward. The in-vehicle camera 100 is provided on the front surface of the bracket 6. The in-vehicle camera 100 includes a base housing 102 and a peripheral housing 103. A circuit board 105 on which an imaging device 104 is mounted is attached to the base housing 102. A cable 106 wired to the rear side is connected to the circuit board 105 via an opening portion 62 formed in the front wall of the bracket 6. A rear end side of the cable 106 is connected to a camera control unit (not shown). The lens 101 is provided on the surface of the peripheral housing 103 opposite to the imaging device 104.

The in-vehicle camera 100 is configured separately from the bracket 6 and is mechanically attached to the bracket 6 via the base housing 102. Meanwhile, the bracket 6 is a member interposed between the in-vehicle camera 100 and the cleaner 1 and the vehicle body panel 200a when the in-vehicle camera 100 (object to be cleaned) and the cleaner 1 are attached to the vehicle body panel 200a that is a member to be fixed.

The pump 2 includes a driving unit 21 for operating the pump 2 and a compression chamber 22 for compressing air. The driving unit 21 is configured by, for example, a motor. Air is taken into the compression chamber 22 via an intake port 23 from the outside and compressed therein, and compressed high-pressure air is discharged toward the nozzle 5 via an exhaust port 24.

The pump 2 further includes a control ECU 25 (electronic control unit, an example of the control unit) that controls the operation of the driving unit 21. The control ECU 25 is connected to the driving unit 21 via a cable 26.

A conduit line 63 is provided above the opening portion 62 in the front wall of the bracket 6 and penetrates the front wall of the bracket 6. The nozzle 5 is coupled to a front end (one end) of the conduit line 63 by adhesion (or mechanical method). Further, the exhaust port 24 of the compression chamber 22 is mechanically coupled to a rear end (the other end) of the conduit line 63. That is, the nozzle 5 communicates with the exhaust port 24 of the compression chamber 22 via the conduit line 63 of the bracket 6 and is provided so as to extend forward from the front surface of the bracket 6. The pump 2 is provided so that its front end portion including the compression chamber 22 is accommodated in the bracket 6 from the rear side of the bracket 6. The pump 2 is disposed on the side opposite to the in-vehicle camera 100 with respect to the bracket 6. That is, the in-vehicle camera 100 is disposed on the outer side (front side) of the bracket 6, whereas the pump 2 is disposed on the inner side (rear side) of the bracket 6.

The compression chamber 22 of the pump 2 is disposed between the in-vehicle camera 100 and the driving unit 21 in the front and rear direction of the cleaner 1. Further, the control ECU 25 is disposed on the side of the driving unit 21 different from the side to which the compression chamber 22 is close. In the present example, the compression chamber 22 is disposed on the front side of the driving unit 21, and the control ECU 25 is disposed on the rear side of the driving unit 21. Further, the nozzle 5, the compression chamber 22, and the driving unit 21 are arranged in this order on a straight line in the front and rear direction of the cleaner 1.

Further, the intake port 23 of the pump 2 is disposed on the side opposite to the nozzle 5 with respect to the bracket 6. That is, the nozzle 5 is disposed on the outer side (front side) of the bracket 6, whereas the intake port 23 is disposed on the inner side (rear side) of the bracket 6.

Subsequently, a specific configuration of the pump 2 will be described in detail with reference to FIGS. 7 and 8.

Figure 7:
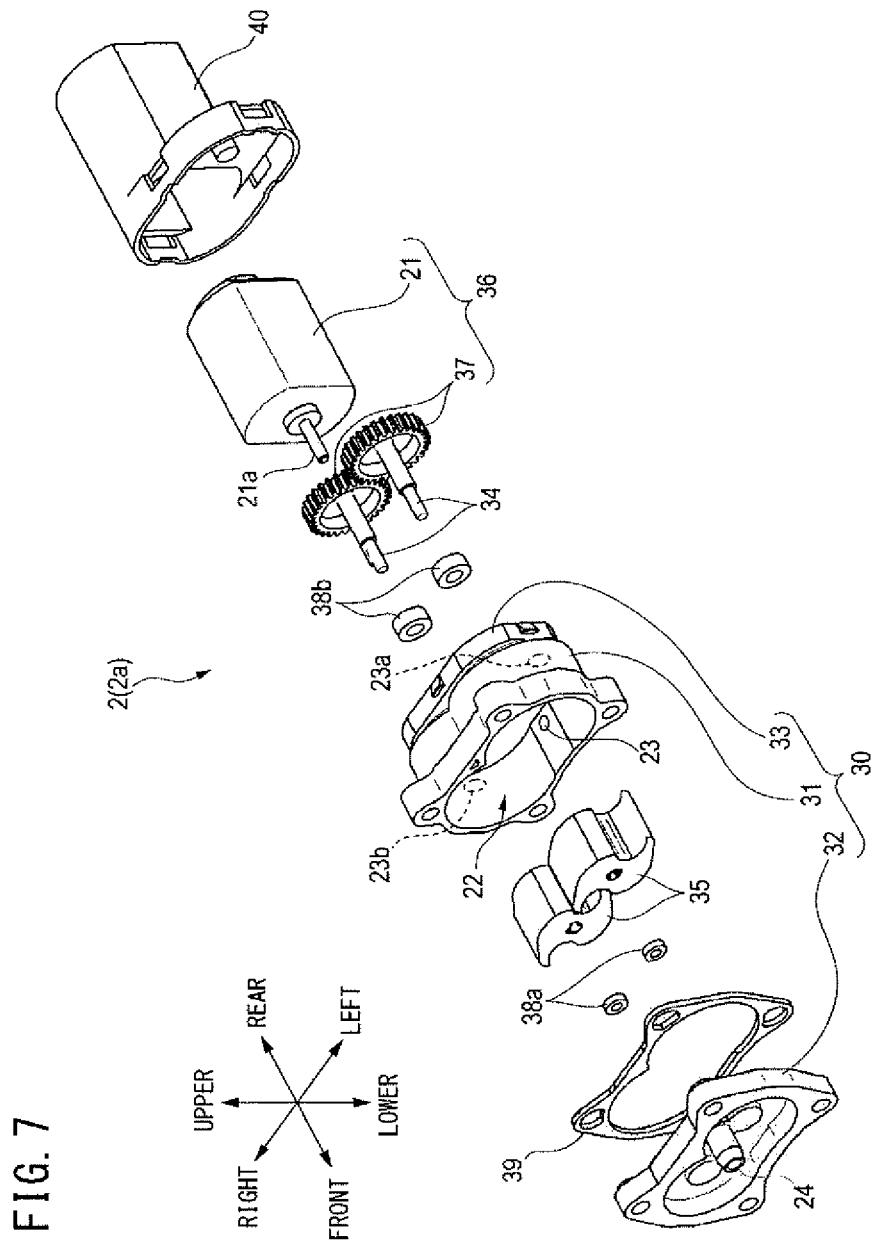
FIG. 7 is an exploded perspective view of a pump constituting the cleaner.

As shown in FIG. 7, in the present embodiment, a claw pump 2a (an example of the rotary positive displacement pump) capable of continuously injecting (at high cycle) high-pressure air is used as the pump 2.

The pump 2 includes a cylinder 30 forming the compression chamber 22, a pair of rotating shafts 34, a pair of rotors 35, the intake port 23, the exhaust port 24, and a rotary driving device 36.

The cylinder 30 includes a cylindrical portion 31 having a cross-sectional shape obtained by partially overlapping two circles, a front wall 32 attached to a front end surface of the cylindrical portion 31, and a rear wall 33 attached to a rear end surface of the cylindrical portion 31. A packing 39 is disposed between the front wall 32 and the front end surface of the cylindrical portion 31.

The pair of rotating shafts 34 is disposed in the cylinder 30. The pair of rotating shafts 34 is configured to synchronously rotate in parallel with each other in opposite directions. Each axial direction of the pair of rotating shafts 34 substantially coincides with an extending direction of the nozzle 5 provided on the front surface side of the bracket 6.

The pair of rotors 35 is accommodated in the cylinder 30 and fixed to the pair of rotating shafts 34, respectively. In each rotating shaft 34, the front side of the fixed rotor 35 is supported by a bearing 38a, and the rear side of the rotor 35 is supported by a bearing 38b. The rotors 35 have hook-shaped claw portions meshing with each other in a non-contact state. By engaging the claw portions with each other inside the cylinder 30 in accordance with the rotation of the fixed rotation shafts 34, the pair of rotors 35 compresses the air introduced from the intake port 23 and discharges the compressed air from the exhaust port 24.

The intake port 23 and the exhaust port 24 are formed to communicate with the compression chamber 22, respectively. The intake port 23 is formed in the cylindrical portion 31. The exhaust port 24 is formed in the front wall 32 that is a side wall close to the nozzle 5. The intake port 23 is formed in a portion of a peripheral wall of the cylindrical portion 31, in which two circles are partially overlapped. In the present example, the intake port 23 is formed in the lower overlapped portion of the peripheral wall of the cylindrical portion 31. Meanwhile, the intake port 23 (23a, 23b) may be formed in the peripheral wall of each of two circles in the cylindrical portion 31. Further, the intake port 23 may be formed in a side wall on the side where the exhaust port 24 is not formed. In the present example, the intake port 23 may be formed in the rear wall 33.

The rotary driving device 36 includes the driving unit 21 for rotating the rotating shafts 34, and a pair of power transmission gears 37 attached to the pair of rotating shafts 34. The driving unit 21 has a driving shaft 21a. The axial direction of the driving shaft 21a substantially coincides with an axial direction of the rotating shafts 34 and an extending direction of the nozzle 5. The pair of power transmission gears 37 is formed to be engaged with each other. When one of the rotating shafts 34 is rotated by the driving shaft 21a, the pair of rotating shafts 34 is configured to rotate in opposite directions via the power transmission gears 37. The rotary driving device 36 rotatably drives the pair of rotors 35 via the pair of rotating shaft 34.

The above-described members are combined and accommodated in a pump housing 40.

Figure 8:
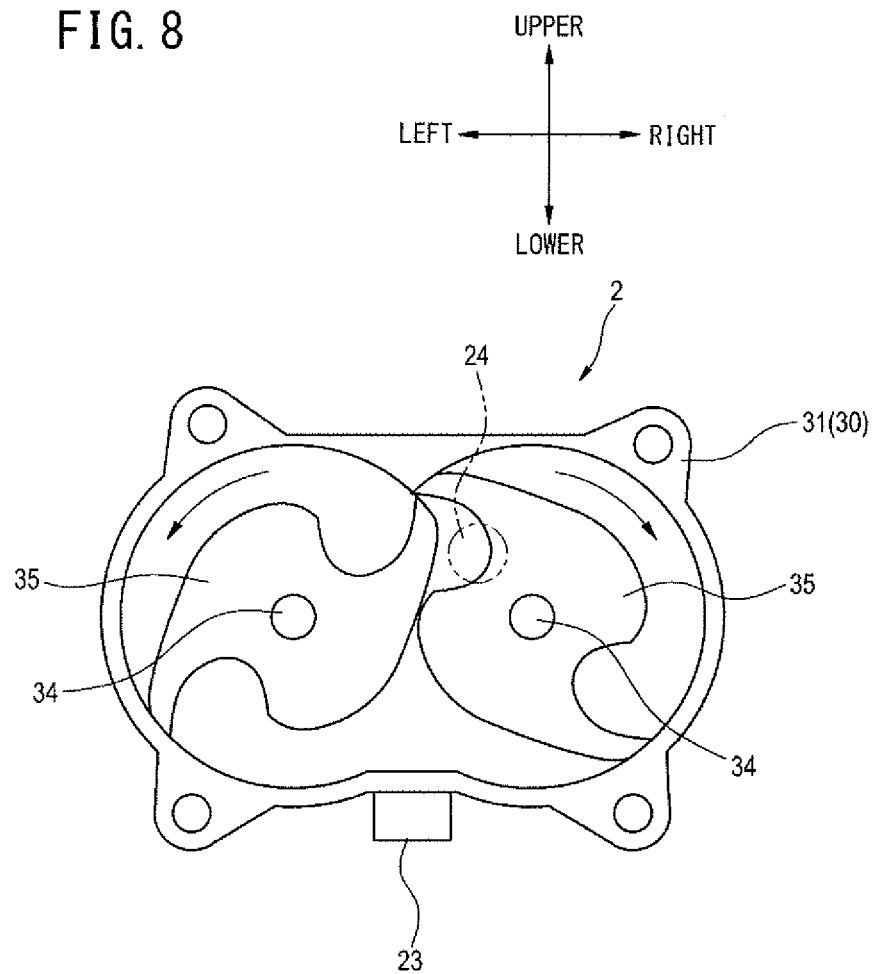
FIG. 8 is a front view showing a rotor in the pump.

FIG. 8 is a front view showing the pump 2 in a state where the front wall 32 and the packing 39 are removed.

As shown in FIG. 8, the pair of rotors 35 is accommodated in the cylindrical portion 31 of the cylinder 30 in a state of being fixed to the rotating shafts 34. The intake port 23 for introducing air is formed at a lower portion of the cylindrical portion 31 so as to protrude downward from a peripheral wall of the cylindrical portion 31. The air introduced from the intake port 23 is compressed, by synchronous rotation of the pair of rotors 35, in a compression pocket formed by the cylindrical portion 31, the front wall 32, the rear wall 33 and the pair of rotors 35, and the compressed high-pressure air is discharged to the side of the nozzle 5 from the exhaust port 24. In this manner, the pump 2 can generate high-pressure air by continuously performing suction, compression and exhaust without using lubricating oil or sealing liquid.

Meanwhile, the rotary positive displacement pump is not limited to a claw pump. For example, a vane type pump may be used.

As described above, the cleaner 1 according to the first embodiment includes the pump 2 for generating high-pressure air and the nozzle 5 for injecting high-pressure air toward the lens 101 of the in-vehicle camera 100, and the pump 2 is configured integrally with the bracket 6 supporting the in-vehicle camera 100. Therefore, the assembling workability of the cleaner 1 to the vehicle V is improved, and the space saving of the cleaner 1 in the vehicle V can be realized.

Further, since the nozzle 5 and the exhaust port 24 of the compression chamber 22 can communicate with each other via the conduit line 63 of the bracket 6, the pump 2 and the nozzle 5 can be integrated with the bracket 6 with a simple configuration.

Further, with a simple configuration of attaching the bracket 6 to the opening portion 201 of the vehicle body panel 200a, the cleaner 1 configured integrally with the bracket 6 can be efficiently attached to the vehicle body panel 200a, together with the in-vehicle camera 100 that is an object to be cleaned.

Further, since the nozzle 5 and the in-vehicle camera 100 are provided in alignment on the front surface of the bracket 6, the cleaner 1 according to the present embodiment is particularly suitable as a cleaner for cleaning the lens 101 of the in-vehicle camera 100 exposed to the outside of the vehicle body.

Further, since the pump 2, the nozzle 5, the bracket 6, and the in-vehicle camera 100 separately formed are assembled, it is possible to use the cleaner 1 suitable for each object to be cleaned by combining members of suitable shapes even when the types of the object to be cleaned are different.

Further, the pump 2 of the cleaner 1 according to the present embodiment includes the driving unit 21 and the compression chamber 22 for compressing air and generating high-pressure air based on the operation of the driving unit 21, and the compression chamber 22 is disposed between the driving unit 21 and the in-vehicle camera 100. Further, the pump 2 further includes the control ECU 25 for operating the driving unit 21. The control ECU 25 is disposed on the side of the driving unit 21 different from the side to which the compression chamber 22 is close. In this manner, the layout of the driving unit 21, the compression chamber 22, and the control ECU 25 constituting the pump 2 is efficiently made with respect to the in-vehicle camera 100, so that space saving can be realized. In particular, when the driving unit 21, the compression chamber 22, and the nozzle 5 are arranged on a straight line in the front and rear direction of the cleaner 1, more efficient layout can realized and the cleaner 1 can be easily attached to the opening portion 201 of the vehicle body panel 200*a*.

Further, since the pump 2 and the nozzle 5 are configured integrally with the bracket 6 supporting the in-vehicle camera 100, the entire size including the in-vehicle camera 100, the cleaner 1 and the bracket 6 can be set to a size that can be attached to the relatively small opening portion 201 formed in the vehicle body panel 200*a*. In this manner, these members can be easily attached to the vehicle body panel 200*a*, and workability efficiency is improved.

Further, in the present embodiment, with respect to the bracket 6, the pump 2 is disposed on the side opposite to the side where the in-vehicle camera 100 is disposed. In this way, the pump 2 can be accommodated, for example, in a vehicle interior which is not easily influenced by the outside air environment, and it is possible to generate high-pressure air having a relatively high temperature while ensuring the waterproofness. Therefore, foreign objects adhering to the in-vehicle camera 100, in particular, ice can be effectively removed.

Further, in the present embodiment, as the pump 2 for generating high-pressure air, for example, the claw pump 2*a* capable of more continuously injecting (at high cycle) high-pressure air than a conventional type pump is used. Therefore, foreign objects such as water droplets adhering to the in-vehicle camera 100, in particular, ice or mud or the like can be efficiently removed.

Further, since the axial direction of the rotating shafts 34 of the pump 2 is made to coincide with the extending direction of the nozzle 5, high-pressure air generated by the pump 2 can be continuously ejected from the nozzle 5 while realizing the space saving. Further, when the respective members of the pump 2 are linearly arranged with respect to the nozzle 5, the space saving can be further realized.

Further, since the intake port 23 is provided at an appropriate position of the compression chamber 22 (e.g., the portion of the cylindrical portion 31 where two circles are partially overlapped), it is possible to efficiently feed air into the compression chamber 22. Further, since the exhaust port 24 and the intake port 23 are provided at appropriate positions of the compression chamber 22, high-pressure air can be appropriately generated. Further, since the intake port 23 is provided, for example, in a vehicle interior, it is possible to feed relatively warm air into the compression chamber 22 while ensuring the waterproofness, as described above. In this way, foreign objects adhering to the in-vehicle camera 100, in particular, ice can be efficiently removed.

Second Embodiment

Next, a cleaner according to a second embodiment will be described with reference to FIGS. 9 to 13. Meanwhile, since the parts denoted by the same reference numerals as in the first embodiment described above have the same function, repeated explanation will be omitted.

Figure 9:
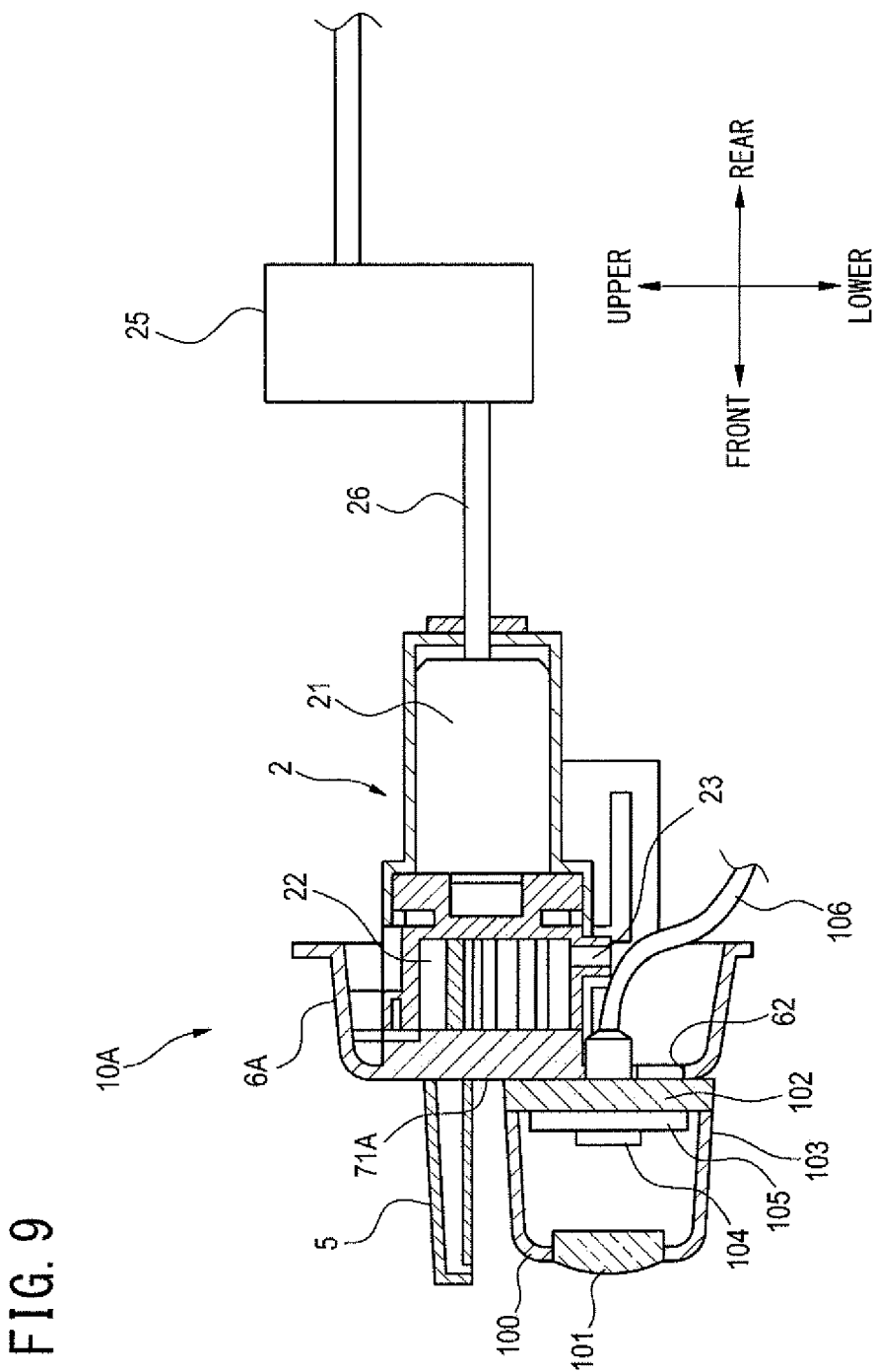
FIG. 9 is a sectional view of an in-vehicle camera and a cleaner according to a second embodiment.
Figure 10:
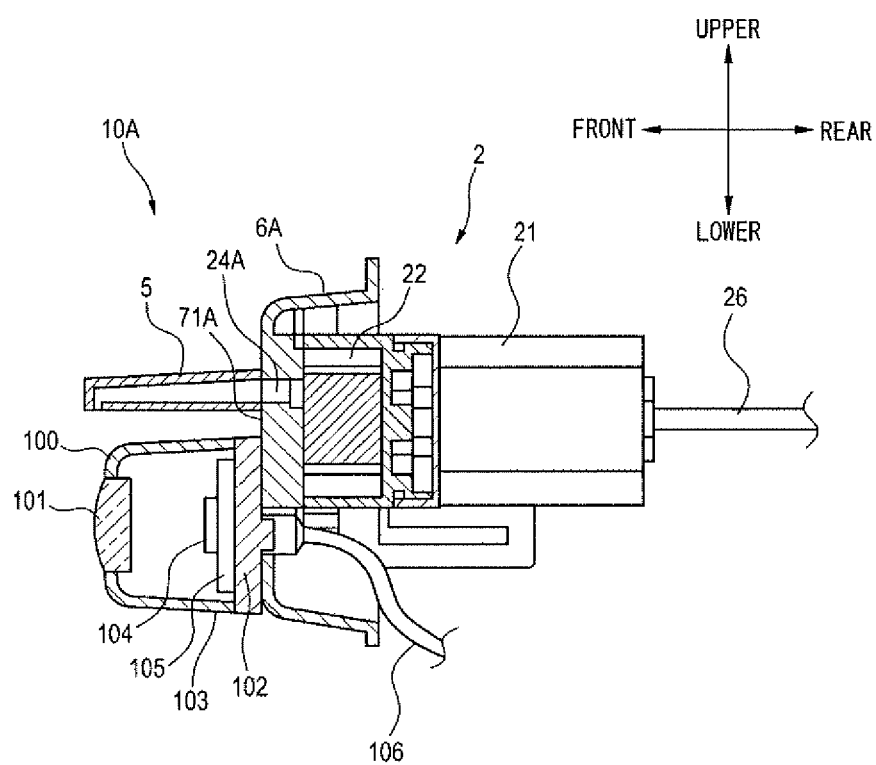
FIG. 10 is a sectional view of the in-vehicle camera and the cleaner at a position different from that in FIG. 9.

FIGS. 9 and 10 are sectional views of an in-vehicle camera and a cleaner according to the second embodiment. FIG. 9 corresponds to FIG. 5 showing the cleaner 1 of the first embodiment, and FIG. 10 also corresponds to FIG. 6.

As described above, in the cleaner 1 according to the first embodiment, the pump 2, the nozzle 5 and the in-vehicle camera 100 separately formed are mechanically assembled via the bracket 6 and integrated.

On the contrary, in a cleaner 10A of the second embodiment, as shown in FIGS. 9 and 10, at least a part of a casing defining the compression chamber 22 of the pump 2 is formed integrally with a bracket 6A as an integral part 71A of the bracket 6A.

Figure 12A:
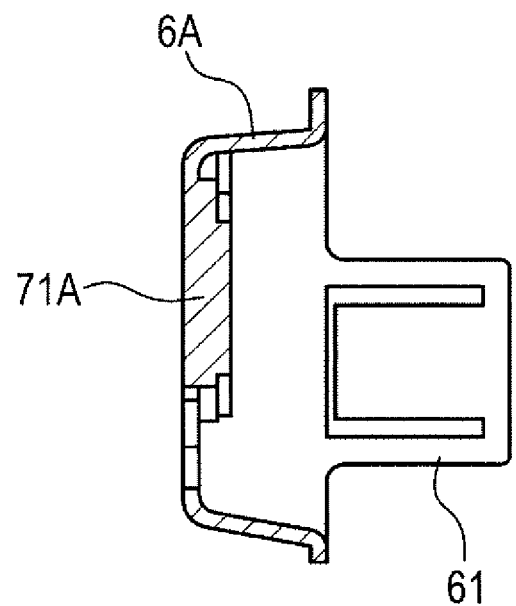
FIG. 12A is a sectional view taken along the line C-C in FIG. 11.

FIG. 11 is a rear perspective view of the bracket 6A. FIG. 12A is a sectional view taken along the line C-C in FIG. 11, and FIG. 12B is a sectional view taken along the line D-D in FIG. 11.

Figure 12B:
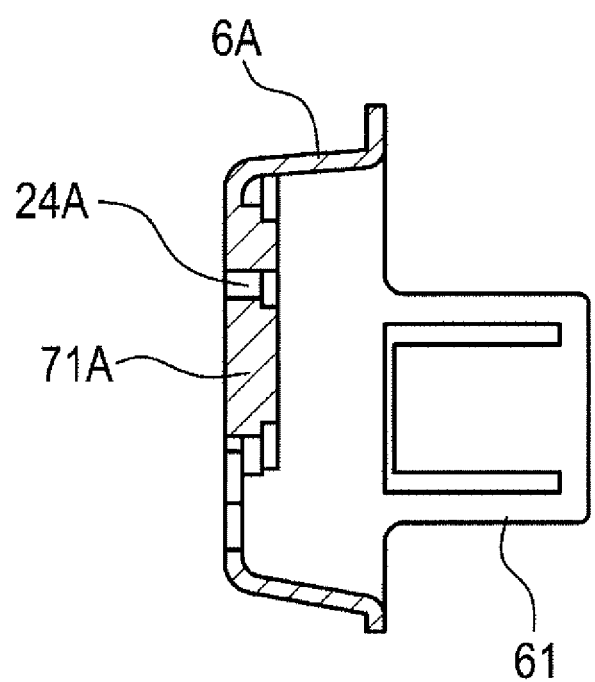
FIG. 12B is a sectional view taken along the line D-D in FIG. 11.

As shown in FIGS. 11, 12A and 12B, the portion of the bracket 6A corresponding to the front wall 32 of the pump 2 of the cleaner 1 is integrated as the integral part 71A of the bracket 6A by an integral molding. An exhaust port 24A for discharging high-pressure air to the nozzle 5 is formed in the integral part 71A. The exhaust port 24A has both the function of the conduit line 63 of the bracket 6 and the function of the exhaust port 24 of the pump 2 in the above-described cleaner 1. The nozzle 5 is mechanically coupled to a front end of the exhaust port 24A, and the compression chamber 22 (the cylindrical portion 31) of the pump 2 is mechanically coupled to a rear end of the exhaust port 24A (see FIGS. 9 and 10).

As described above, the cleaner 10A according to the second embodiment includes the pump 2 which has the compression chamber 22 for compressing air and discharging high-pressure air toward the nozzle 5, and at least a part (the integral part 71A) of the casing defining the compression chamber 22 is formed integrally with the bracket 6 supporting the in-vehicle camera 100. According to the cleaner 10A having such a configuration, the pump 2 can be integrated with the bracket 6A with a simple configuration. Further, since the exhaust port 24A for high-pressure air is formed in the integral part 71A of the bracket 6A, it is possible to feed high-pressure air generated in the compression chamber 22 to the nozzle 5 as appropriate while ensuring the waterproofness between the pump 2 and the bracket 6A.

Third Embodiment

Next, a camera with a cleaner according to a third embodiment will be described with reference to FIGS. 13 and 14. Meanwhile, since the parts denoted by the same reference numerals as in the first embodiment described above have the same function, repeated explanation will be omitted.

Figure 14:
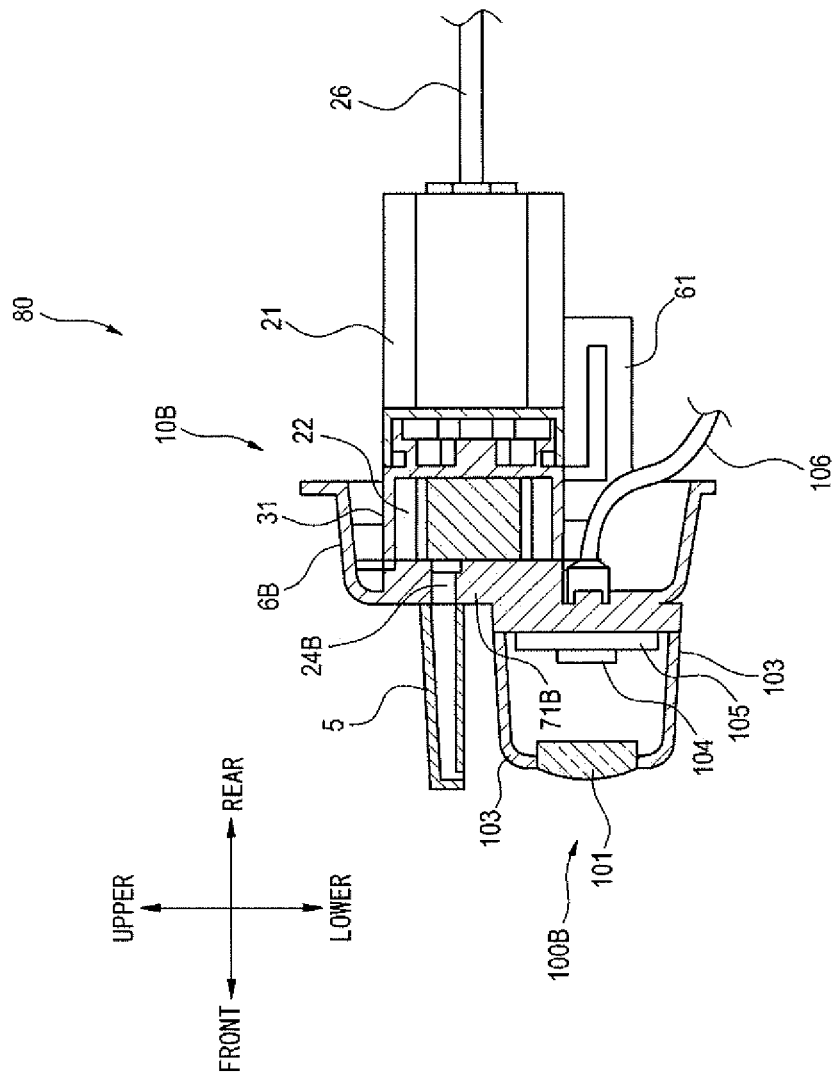
FIG. 14 is a sectional view of the camera with the cleaner at a position different from that in FIG. 13.

FIGS. 13 and 14 are sectional views of a camera 80 with a cleaner (am example of the sensor with the cleaner) according to the third embodiment. FIG. 13 corresponds to FIG. 5 showing the cleaner 1 of the first embodiment, and FIG. 14 also corresponds to FIG. 6.

As shown in FIGS. 13 and 14, the camera 80 with the cleaner includes an in-vehicle camera 100B (an example of the sensor unit) and a cleaner 10B. In the camera 80 with the cleaner, at least a part of a housing of the in-vehicle camera 100B and at least a part of a housing of the pump 2 in the cleaner 10B are configured as an integral structure via a bracket 6B (an example of the mounting portion).

In the present example, the "integral structure" means a structure integrated by an integral molding and excludes a structure integrated by mechanical fastening or bonding.

Specifically, the portion corresponding to a base housing (see the base housing 102 of the in-vehicle camera 100 in FIG. 5) of the in-vehicle camera 100B and at least a part (the portion corresponding to the front wall 32) of the casing defining the compression chamber 22 of the pump 2 are formed integrally with the bracket 6B as an integral part 71B of the bracket 6B. That is, the bracket 6B is formed integrally with (the portion corresponding to the base housing of) the in-vehicle camera 100. An exhaust port 24B for exhausting high-pressure air to the nozzle 5 is formed in the integral part 71B. The exhaust port 24B has both the function of the conduit line 63 of the bracket 6 and the function of the exhaust port 24 of the pump 2 in the cleaner 1 described above. The nozzle 5 is mechanically coupled to a front end of the exhaust port 24B. Further, the cylindrical portion 31 constituting the compression chamber 22 of the pump 2 is mechanically coupled to a rear end of the exhaust port 24B. The camera 80 with the cleaner is attached to the opening portion 201 formed in the vehicle body panel 200a via the bracket 6B.

As described above, the camera 80 with the cleaner according to the third embodiment includes the in-vehicle camera 100B and the cleaner 10B, and at least a part of the housing of the in-vehicle camera 100B and at least a part of the housing of the pump 2 of the cleaner 10B are configured as an integral structure (the integral part 71B). According to the camera 80 with the cleaner having such a configuration, the number of parts can be reduced and the mounting workability can be further improved.

Further, since a part of the casing (the cylinder 30) defining the compression chamber 22 of the pump 2 and a part of the housing of the in-vehicle camera 100B are configured as an integral structure, the layout of the pump 2 that generates high-pressure air to the in-vehicle camera 100B can be efficiently realized.

Further, since the bracket 6B is configured as an integral structure with respect to the housings of the in-vehicle camera 100 and the pump 2, the camera 80 with the cleaner can be simply attached to the opening portion 201 of the vehicle body panel 200a without increasing the number of parts.

Fourth Embodiment

Next, a camera with a cleaner according to a fourth embodiment will be described with reference to FIG. 15. Meanwhile, since the parts denoted by the same reference numerals as in the first embodiment described above have the same function, repeated explanation will be omitted.

Figure 15:
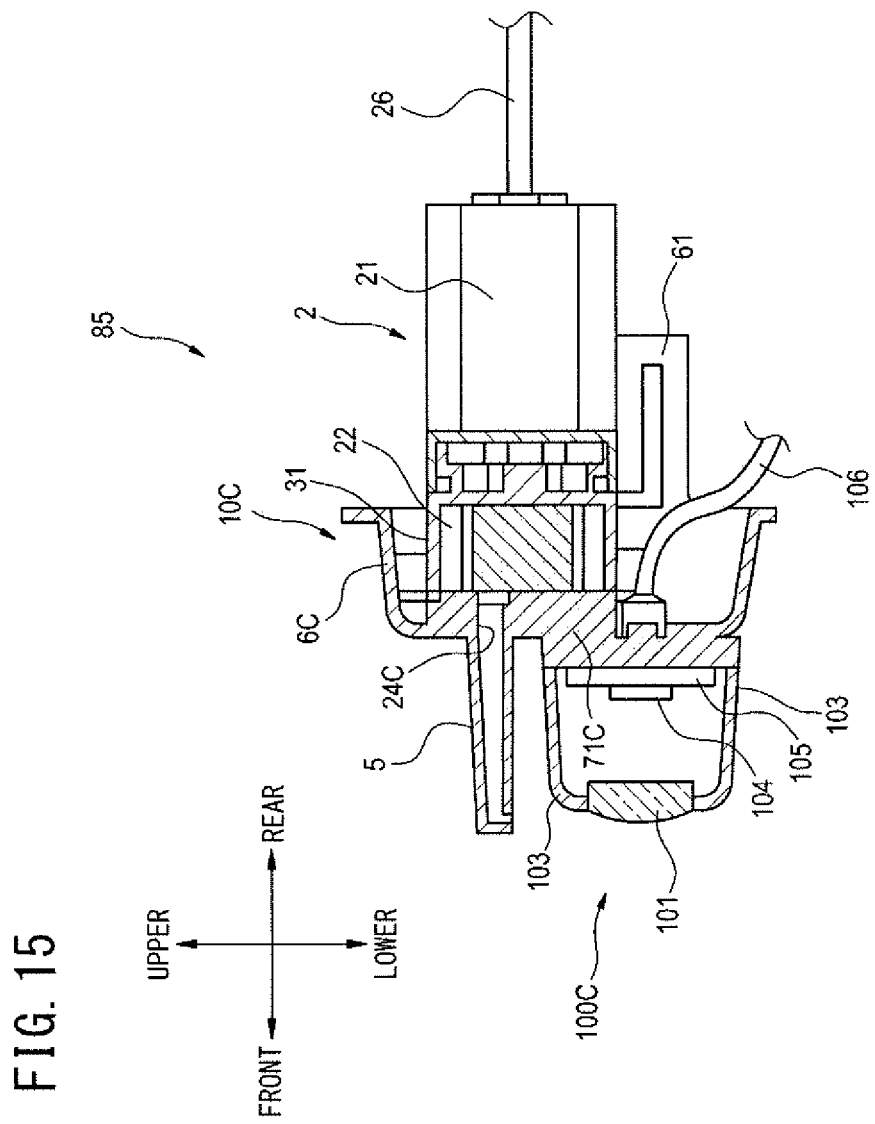
FIG. 15 is a sectional view of a camera with a cleaner according to a fourth embodiment.

FIG. 15 is a sectional view of a camera 85 with a cleaner according to the fourth embodiment.

As shown in FIG. 15, the camera 85 with the cleaner (an example of the sensor with the cleaner) includes an in-vehicle camera 100C (an example of the sensor unit) and a cleaner 10C. In addition to the configuration of the camera 80 with the cleaner of the third embodiment, in the camera 85 with the cleaner, the nozzle 5 is further configured as an integral structure via a bracket 6C (an example of the mounting portion). Meanwhile, similarly to the third embodiment, the "integral structure" means a structure integrated by an integral molding.

Specifically, the portion corresponding to a base housing of the in-vehicle camera 100C, at least a part (the portion corresponding to the front wall 32) of the casing (the cylinder 30) defining the compression chamber 22 of the pump 2, and the nozzle 5 are formed integrally with the bracket 6C as an integral part 71C of the bracket 6C. An exhaust port 24C for discharging high-pressure air is formed in the integral part 71C. The exhaust port 24C and a passage inside the nozzle 5 communicate with each other as a communication passage inside the integral part 71C. The compression chamber 22 (the cylindrical portion 31) of the pump 2 is mechanically coupled to a rear end of the exhaust port 24C.

According to the camera 85 with the cleaner having such a configuration, the nozzle 5 and the housings of the in-vehicle camera 100C and the pump 2 are configured as an integral structure. Therefore, the number of parts can be further reduced.

Fifth Embodiment

Next, a camera with a cleaner according to a fifth embodiment will be described with reference to FIGS. 16, 17A and 17B. Meanwhile, since the parts denoted by the same reference numerals as in the first embodiment described above have the same function, repeated explanation will be omitted.

Figure 16:
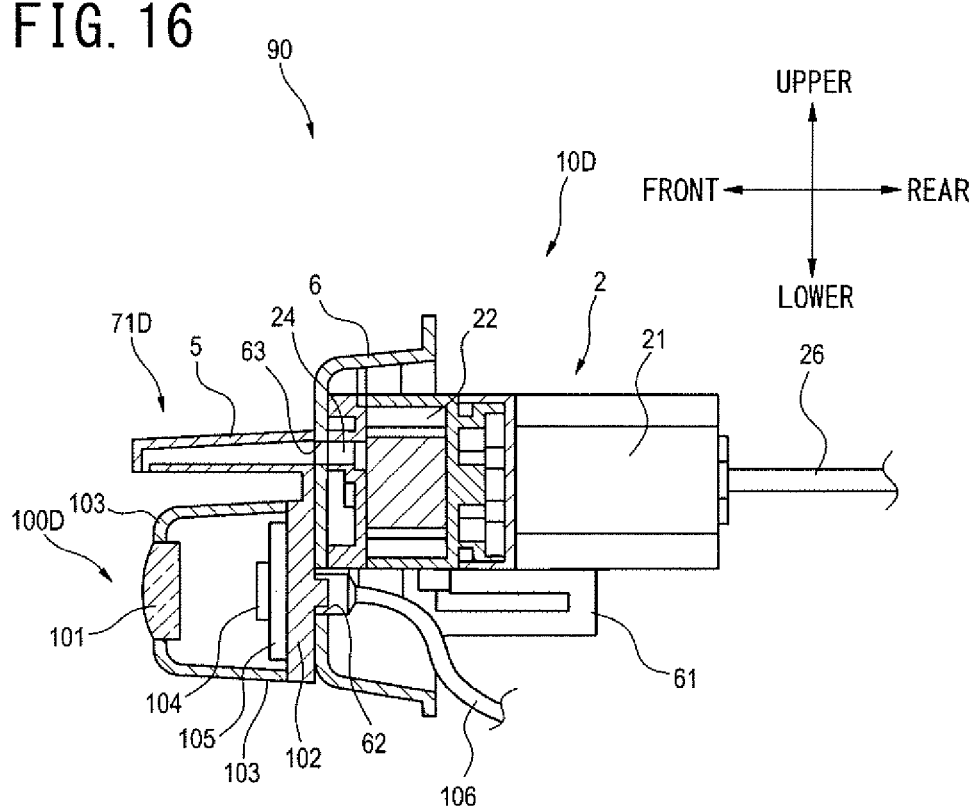
FIG. 16 is a sectional view of a camera with a cleaner according to a fifth embodiment.
Figure 17A:
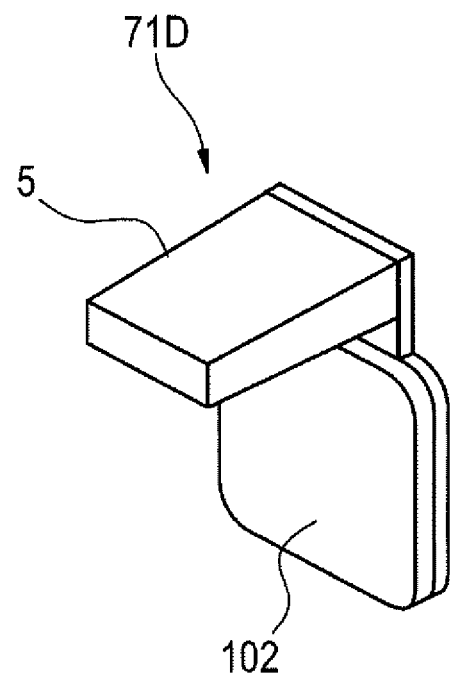
FIG. 17A is a front perspective view showing an integral structure of a camera housing and a nozzle of FIG. 16.
Figure 17B:
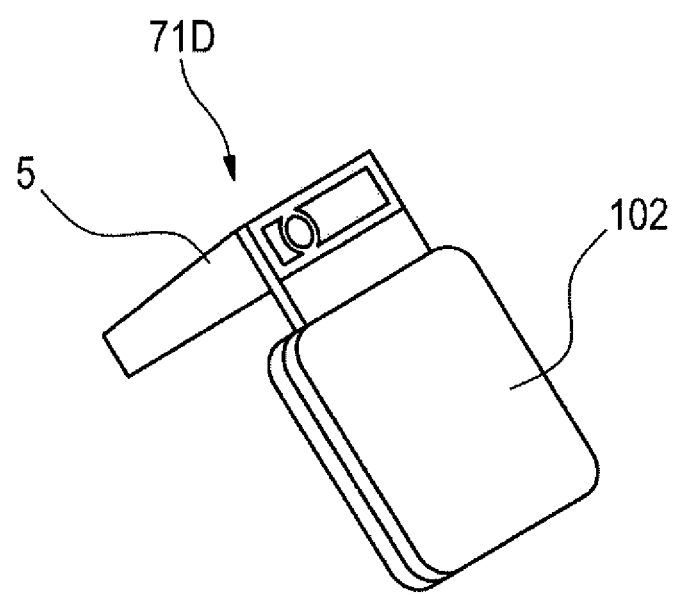
FIG. 17B is a rear perspective view of the integral structure shown in FIG. 17A.

FIG. 16 is a sectional view of a camera 90 with a cleaner according to the fifth embodiment.

As shown in FIG. 16, the camera 90 with the cleaner (an example of the sensor with the cleaner) includes an in-vehicle camera 100D (an example of the sensor unit) and a cleaner 10D. In the camera 90 with the cleaner, at least a part of a housing of the in-vehicle camera 100D and the nozzle 5 of the cleaner 10D are configured as an integral structure. In the present example, as shown in FIGS. 17A and 17B, the base housing 102 of the in-vehicle camera 100D and the nozzle 5 are configured as an integral structure 71D. Meanwhile, similarly to the third embodiment, the "integral structure" means a structure integrated by an integral molding.

The conduit line 63 is provided in the front wall of the bracket 6. The nozzle 5 constituting the integral structure 71D is mechanically coupled to a front end of the conduit line 63. Further, the exhaust port 24 of the compression chamber 22 of the pump 2 is mechanically coupled to a rear end of the conduit line 63. The nozzle 5 communicates with the exhaust port 24 via the conduit line 63 and is provided so as to extend forward from a front surface of the bracket 6. The base housing 102 constituting the integral structure 71D together with the nozzle 5 is attached to the bracket 6 via the opening portion 62. The circuit board 105 including the imaging device 104 is attached on the base housing 102. Further, the peripheral housing 103 to which the lens 101 is attached at a position facing the imaging device 104 is attached to a peripheral edge portion of the base housing 102.

According to the camera 90 with the cleaner having such a configuration, the base housing 102 of the in-vehicle camera 100D and the nozzle 5 are configured as the integral structure 71D. Therefore, the number of parts can be reduced.

Sixth Embodiment

Next, a camera built-in side turn signal lamp (hereinafter, referred to as a camera built-in STSL) according to a sixth embodiment will be described with reference to FIG. 18. Meanwhile, since the parts denoted by the same reference numerals as in the first embodiment described above have the same function, repeated explanation will be omitted.

In the following sixth embodiment, one or more embodiments of the disclosure is applied to a camera built-in STSL. Meanwhile, the scope of application of the disclosure is not limited to STSL. One or more embodiments of the disclosure can be widely applied to various vehicle lamps such as a headlamp, a clearance lamp, a tail lamp, a turn signal lamp, a stop lamp, a daytime running lamp, a cornering lamp, a hazard lamp, a position lamp, a back lamp, a fog lamp, a high mount stop lamp, a foot lamp and the like and a combination lamp thereof, so long as a camera module is disposed therein.

Figure 18:
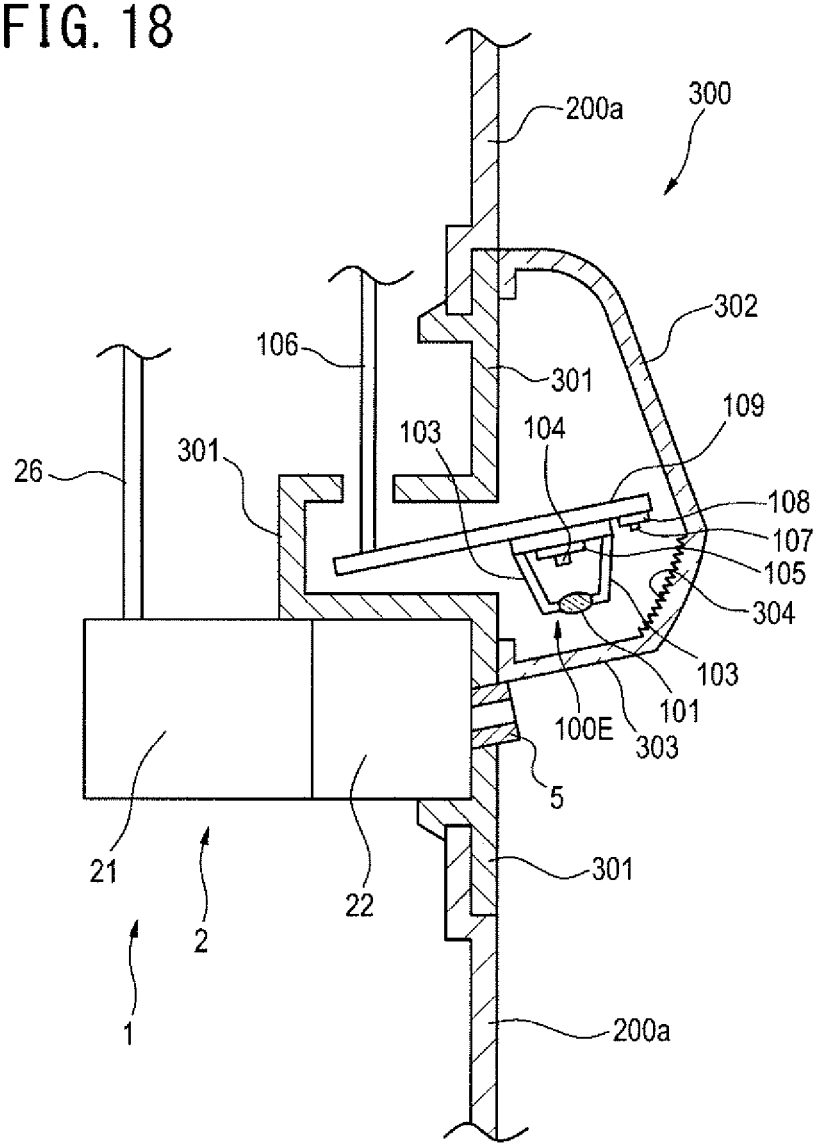
FIG. 18 is a view showing a camera built-in side turn signal lamp according to a sixth embodiment.

As shown in FIG. 18, a camera built-in STSL 300 (an example of the sensor with the cleaner) includes a lamp body 301 (an example of the bracket) and an outer cover 302 (an example of the object to be cleaned). The lamp body 301 is attached to the vehicle body panel 200a. A board 109 is disposed in a lamp chamber defined by the lamp body 301 and the outer cover 302. The cable 106 wired to a control unit (not shown) is connected to the board 109. An in-vehicle camera 100E is mounted on the board 109. The in-vehicle camera 100E includes the base housing 102 and the peripheral housing 103. The circuit board 105 on which the imaging device 104 is mounted is attached to the base housing 102. The lens 101 is provided on the surface of the peripheral housing 103 facing the imaging device 104.

On the board 109, a circuit board 108 on which a light emitting element 107 configured by, for example, a light emitting diode (LED) is mounted is attached in parallel with the in-vehicle camera 100E. The light emitting element 107 is disposed at an end portion opposite to an end portion on the side where the cable 106 is disposed in a longitudinal direction of the board 109.

The outer cover 302 includes a transmission window 303 disposed at a position facing the lens 101 of the in-vehicle camera 100E. The transmission window 303 is configured by a flat surface on which no step is formed. Further, on the inner surface of the outer cover 302, a lens step 304 for light diffusion is formed at a position facing the light emitting element 107.

The pump 2 of the cleaner 1 is attached to the surface of the lamp body 301 on the side opposite to the surface to which the outer cover 302 is attached. That is, the pump 2 is configured integrally with the lamp body 301. The pump 2 includes the driving unit 21 and the compression chamber 22 for compressing air and generating high-pressure air based on the operation of the driving unit 21. In the present embodiment, (the casing constituting) the compression chamber 22 is in contact with the lamp body 301, and the nozzle 5 for injecting high-pressure air generated in the compression chamber 22 is formed integrally with the lamp body 301, for example. The opening of the nozzle 5 is located in the vicinity of the transmission window 303 of the outer cover 302, and high-pressure air injected from the nozzle 5 is ejected toward the transmission window 303. In this way, it is possible to appropriately remove foreign objects adhering to the outer cover 302, in particular, the transmission window 303.

According to the camera built-in STSL 300 having such a configuration, the pump 2 is configured integrally with the lamp body 301 of the camera built-in STSL 300, and high-pressure air generated by the pump 2 is ejected from the opening of the nozzle 5 to the transmission window 303 of the outer cover 302 which is the object to be cleaned. In this way, the space saving of the cleaner 1 integrated with the camera built-in STSL 300 can be achieved, and the number of parts can be reduced.

Seventh Embodiment

Hereinafter, a seventh embodiment will be described with reference to FIGS. 19 to 30. Meanwhile, the constituent elements similar to those of the above embodiments are denoted by the same reference numerals, and the explanation thereof will be appropriately omitted.

Figure 19:
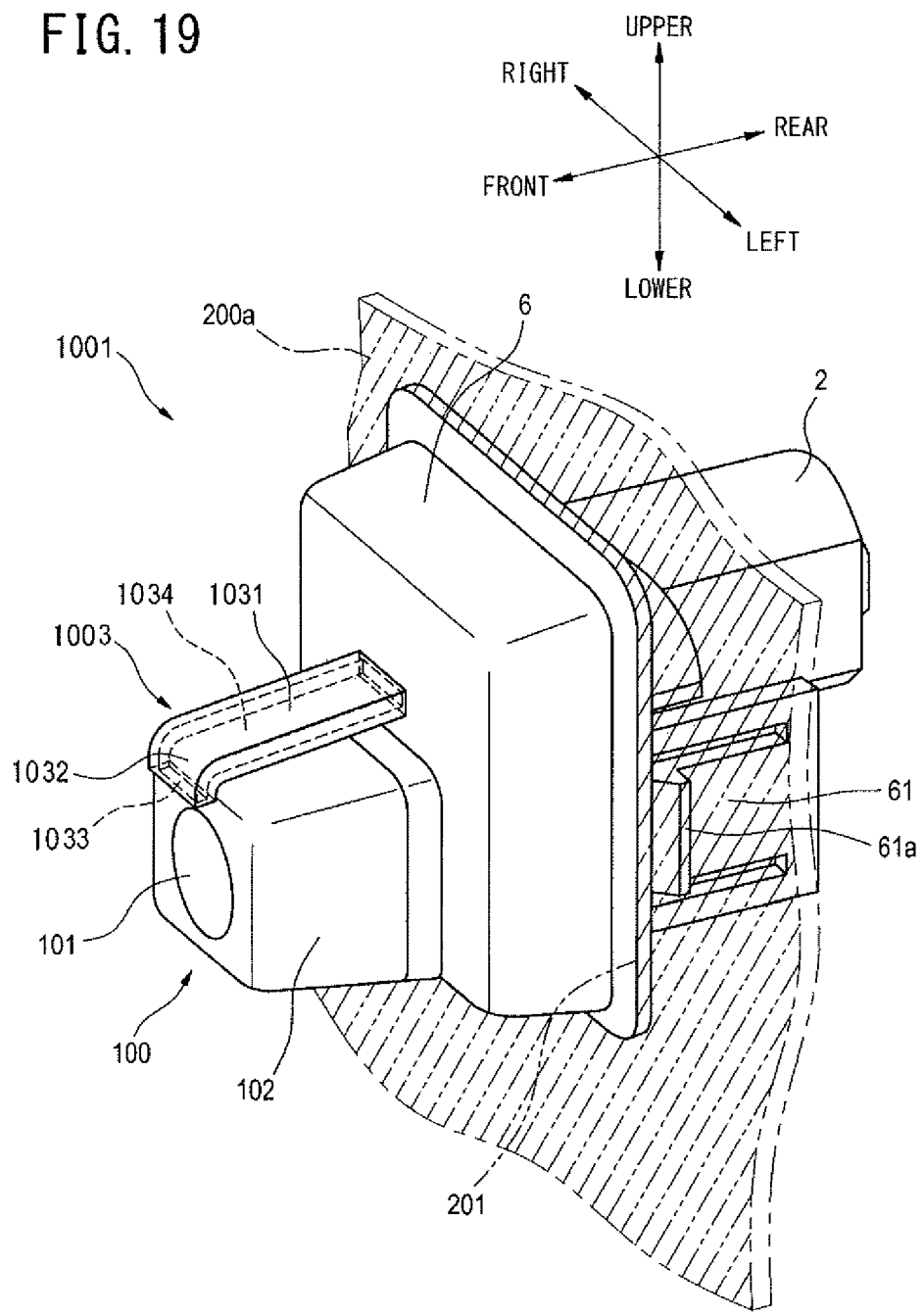
FIG. 19 is a front perspective view of a camera and a cleaner according to a seventh embodiment.

As shown in FIG. 19, the camera 100 is formed in, for example, a cubic shape and is attached to the vehicle body panel 200a so that the lens 101 of the camera 100 is exposed toward the outside of the vehicle body panel 200a (see FIG. 1). An imaging unit (not shown) is provided in the camera 100, and the lens 101 is provided on the front surface of the housing 102 so as to cover the imaging unit. A convex lens with a wide angle of view (e.g., 170 degrees or more) is used for the lens 101. Meanwhile, besides this, for example, a lens whose surface is planar (flat) may be used for the lens 101.

Meanwhile, the camera 100 is not limited to a back camera. For example, the camera 100 is a camera for confirming the front or the side of the vehicle V and may be attached to the vehicle body panel 200a on the front side or the side of the vehicle V together with the cleaner 1.

A cleaner 1001 includes the pump 2 (an example of the generation unit) that generates high-pressure air for cleaning, and a nozzle 1003 that injects high-pressure air toward the lens 101 of the camera 100. In the following, the direction (nozzle side) for feeding high-pressure air by the pump 2 is defined as the front side, and the direction opposite to the feeding direction of the high-pressure air is defined as the rear side. Further, in the cleaner 1001, the side of the nozzle 1003 is defined as the upper side, and the side of the camera 100 is defined as the lower side.

The nozzle 1003 has a joint conduit line portion 1031 extending forward along an upper surface of the camera 100, and an ejecting portion 1032 formed continuously with a front end of the joint conduit line portion 1031 and extending downward.

The joint conduit line portion 1031 is provided at its rear end with an inlet port into which high-pressure air flows. The inlet port is connected to an exhaust port of the pump 2.

The ejecting portion 1032 is a portion on the tip side of the nozzle 1003 for ejecting high-pressure air. An injection opening portion 1033 that opens horizontally (e.g., in a rectangular shape or an elliptical shape or the like) is provided at the tip of the ejecting portion 1032. The high-pressure air flowing into the inlet port of the joint conduit line portion 1031 passes through a communication passage 1034 formed in the joint conduit line portion 1031 and the ejecting portion 1032 and is injected to the lens 101 from the injection opening portion 1033 of the ejecting portion 1032.

The nozzle 1003 is formed of, for example, a resin material. Meanwhile, as the material of the nozzle 1003, a rubber material having lower rigidity than resin, for example, ethylene propylene rubber (EPDM) or the like may be used. The rubber material is suitable for the ease of assembly (routing) of the nozzle 1003 and the prevention of interference/breakage at the time of assembly, and the like. Further, in the present example, the nozzle 1003 and the pump 2 are disposed at positions close to each other. However, for example, in the case where both are disposed at positions away from each other and connected to each other via a hose made of a rubber material, it is possible to integrate the nozzle 1003 and the hose by forming the nozzle 1003 from a rubber material. Preferably, the content of crosslinking agent in EPDM is small in order to prevent contamination of the lens surface. Further, EPDM is thermally cured by sulfur vulcanization or peroxide vulcanization. However, peroxide vulcanization is preferably performed in order to prevent contamination of the lens surface. Furthermore, in order to remove cross-linking agent or the like from EPDM, it is preferable to perform secondary vulcanization (reheating) after peroxide vulcanization.

Figure 20:
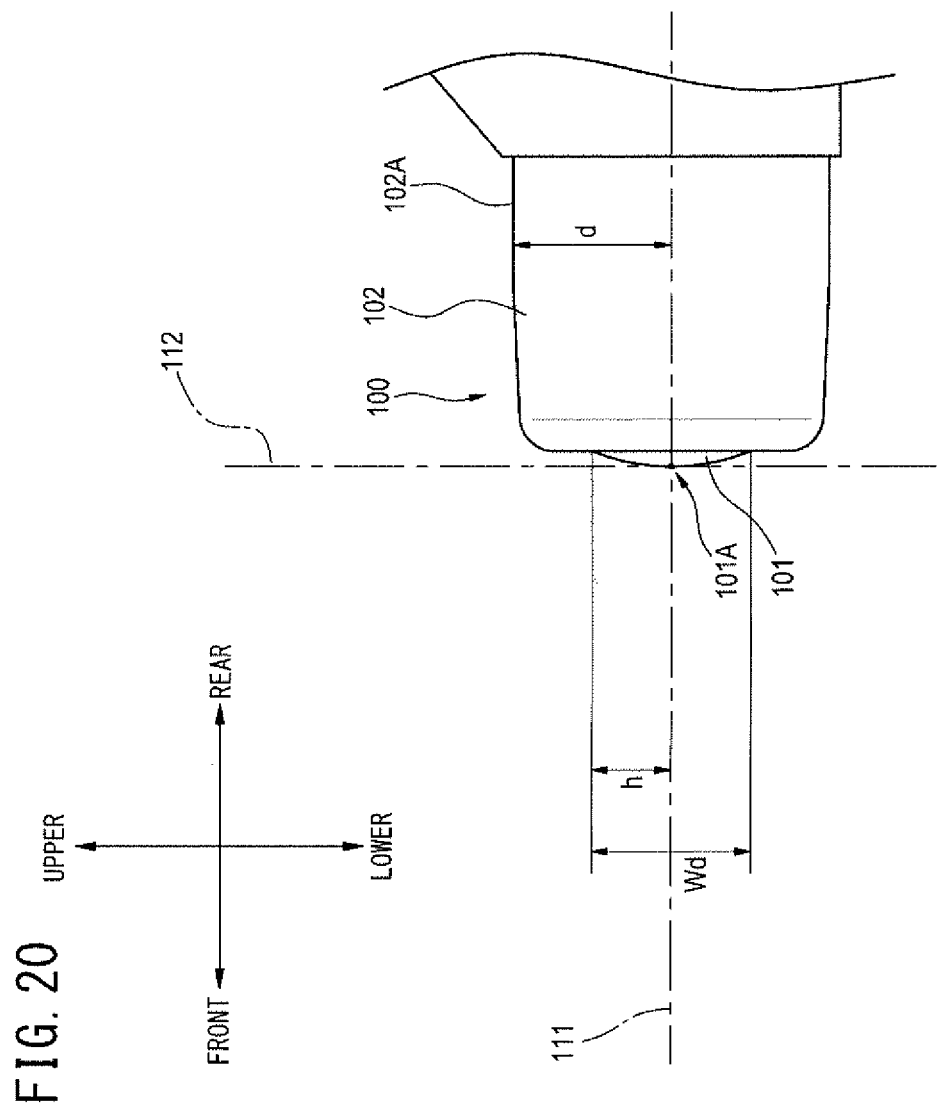
FIG. 20 is a side view showing the camera of FIG. 19.
Figure 21:
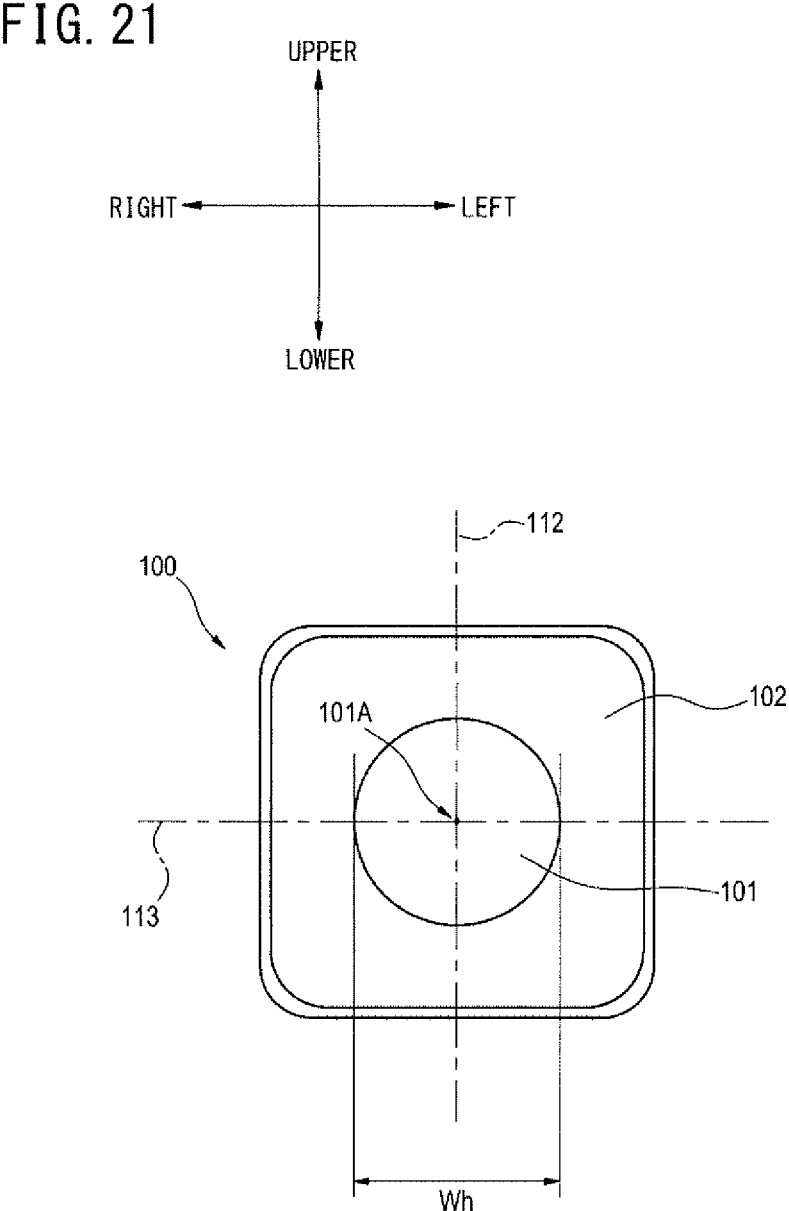
FIG. 21 is a front view showing the camera of FIG. 19.

FIG. 20 is a side view showing the camera 100, and FIG. 21 is a front view showing the camera 100.

In FIG. 20, a center axis of the lens 101 passing through a center point 101A of the lens 101 of the camera 100 and extending in the front and rear direction of the camera 100 is defined as a first axis 111. Further, a tangent line extending perpendicularly to the first axis 111 in the upper and lower direction of the camera 100 and contacting the lens (convex lens) 101 is defined as a second axis 112. Meanwhile, in the case where the lens 101 is a flat lens, an axis extending perpendicularly to the first axis 111 in the upper and lower direction of the camera 100 and passing through the surface of the lens 101 is defined as the second axis 112. Further, in FIG. 21, an axis extending perpendicularly to the second axis 112 in the right and left direction of the camera 100 is defined as a third axis 113.

In this camera 100, a distance along the second axis 112 from the center point 101A of the lens 101 to an outer end portion of the lens 101 is defined as h(mm). Furthermore, a distance along the second axis 112 from the center point 101A of the lens 101 to an outer edge portion 102A of the housing 102 of the camera 100 is defined as d(mm). As the lens 101 of the camera 100, for example, a lens is used in which a vertical width Wd along the upper and lower direction (i.e., the second axis 112) of the camera 100 is 8 mm or more but 12 mm or less and a horizontal width Wh along the right and left direction (i.e., the third axis 113) of the camera 100 is 8 mm or more but 12 mm or less. That is, the distance h of the lens 101 is, for example, 4 mm or more but 6 mm or less. Further, as the housing 102, for example, a housing is used in which the distance from the center point 101A of the lens to the outer edge portion 102A of the housing 102 is 4 mm or more but 13.5 mm or less.

Figure 22:
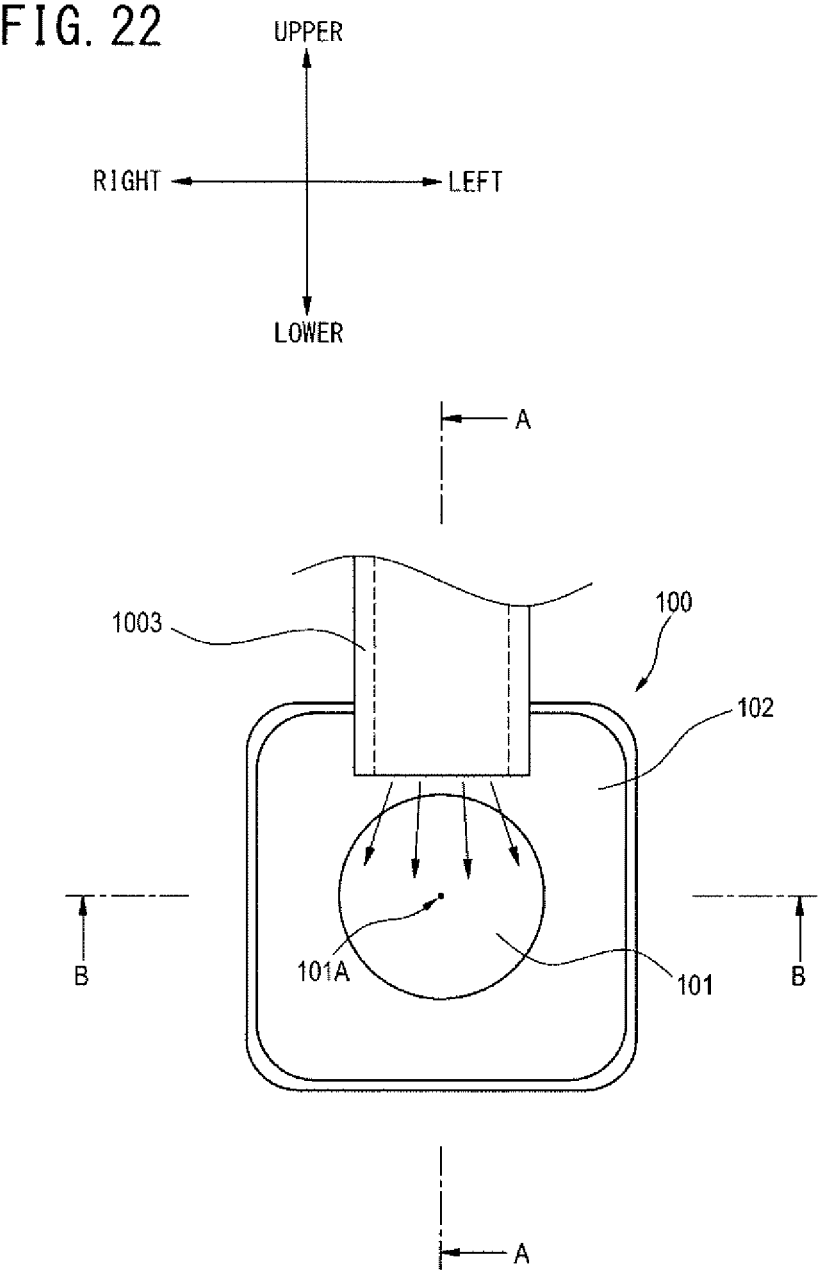
FIG. 22 is a front view of the camera and a nozzle of the cleaner of FIG. 19.
Figure 23:
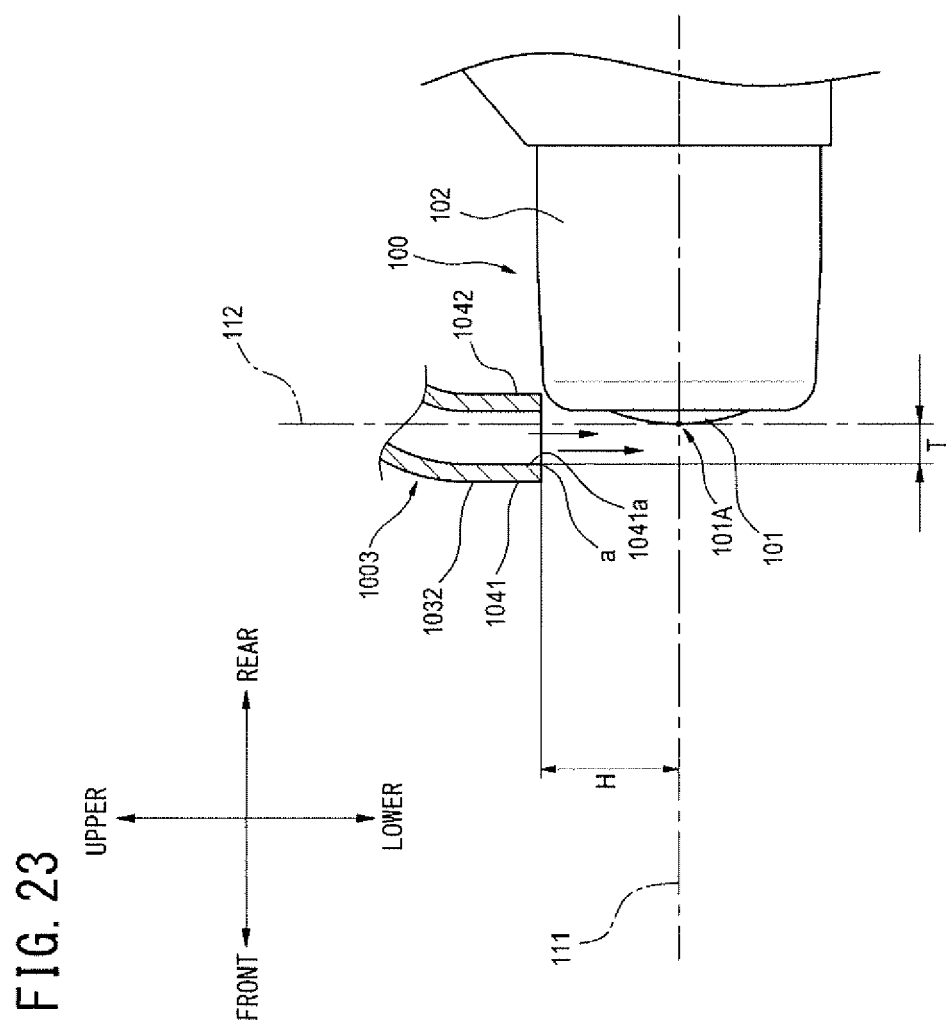
FIG. 23 is a sectional view taken along the line A-A in FIG. 22 (a view for explaining the position of the nozzle with respect to the camera)
Figure 24:
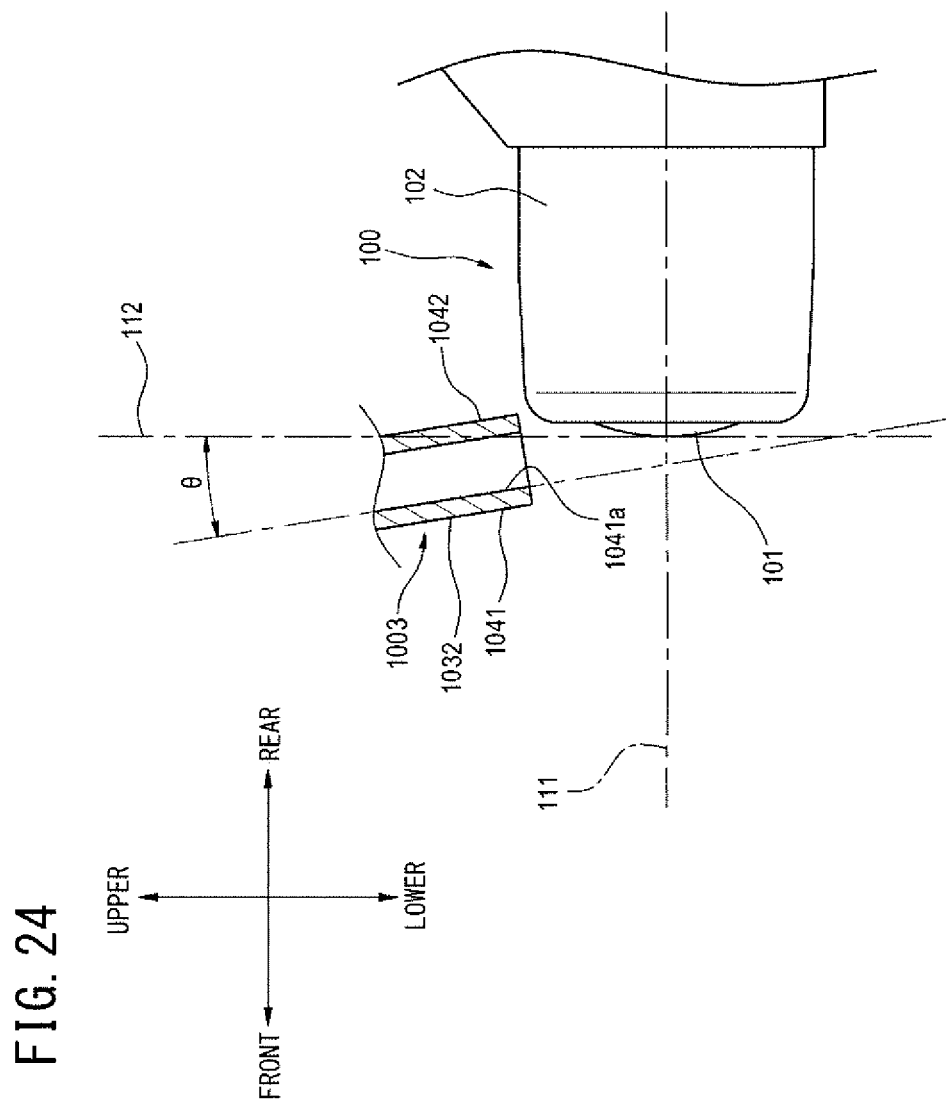
FIG. 24 is a view for explaining the direction of the nozzle in a side view.

FIG. 22 is a front view showing the camera 100 and the nozzle 1003 of the cleaner 1. FIGS. 23 and 24 are sectional views taken along the line A-A in FIG. 22, respectively (the internal structure of the camera 100 is omitted). Meanwhile, the nozzle shown in FIG. 24 is different from the nozzle shown in FIG. 23.

As shown in FIG. 23, the ejecting portion 1032 of the nozzle 1003 has a front wall 1041 (an example of the first wall portion) disposed to face the front surface of the camera 100, and a rear wall 1042 disposed to face the front wall 1041 on the rear side of the front wall 1041.

The nozzle 1003 is arranged so that the shortest distance between a tip (lower end in FIG. 23) of the front wall 1041 and the first axis 111 of the lens 101 is H(mm). Further, the nozzle 1003 is arranged so that the shortest distance between a tip "a" of an inner surface 1041a (right surface in FIG. 23) of the front wall 1041 and the second axis 112 of the lens 101 is T(mm).

Further, as shown in FIG. 24, the nozzle 1003 is arranged so that an angle formed by the inner surface 1041a of the front wall 1041 and the second axis 112 is 0.

In this case, for example, the shortest distance H and the shortest distance T are arranged in a range that satisfies the condition of the following equation 1.

$$h-1(\text{mm}) \leq H \leq h+6(\text{mm}), \text{ also, } 0(\text{mm}) \leq T \leq H \times \tan\theta + 0.5 (\text{mm}) \quad \text{(Equation 1)}$$

here, h(mm): the distance from the center point 101A of the lens 101 to the outer end portion of the lens 101

When performing calculation based on the conditional equation (1), the front wall 1041 is preferably arranged in a range where the shortest distance H is 3 mm or more but 31 mm or less and the shortest distance T is 0 mm or more but 5.5 mm or less. When the shortest distance H is shorter than 3 mm, there is a possibility that the nozzle 1003 appears in the captured image of the camera 100. When the shortest distance H is longer than 31 mm, there is a high possibility that the performance of removing foreign objects adhering to the lens 101 will be insufficient. Further, when the shortest distance T is shorter than 0 mm (i.e., when the tip "a" of the inner surface 1041a of the front wall 1041 is located behind the second axis 112), there is a high possibility that the foreign object removal performance will be insufficient. When the shortest distance T is longer than 5.5 mm, there is a possibility that the nozzle 1003 appears in the captured image of the camera 100.

Meanwhile, in the case where the lens 101 having the vertical width Wd of 8 mm or more but 12 mm or less is used, it is more preferable that the shortest distance H is 3 mm or more but 12 mm or less.

Further, the angle θ formed by the inner surface 1041a of the front wall 1041 and the second axis 112 is preferably 0 degree or more but 45 degrees or less, more preferably, 0 degree or more but 10 degrees or less. When the angle θ is located on the minus side from 0 degree, there is a high possibility that the foreign object removal performance will be insufficient. Further, when the angle θ is 45 degrees or more, there is a possibility that the nozzle 1003 appears in the captured image of the camera 100. Meanwhile, the angle θ=0 degree means a case where the front wall 1041 is arranged parallel to the second axis 112, as in the nozzle 1003 shown in FIG. 23, for example.

Figure 25:
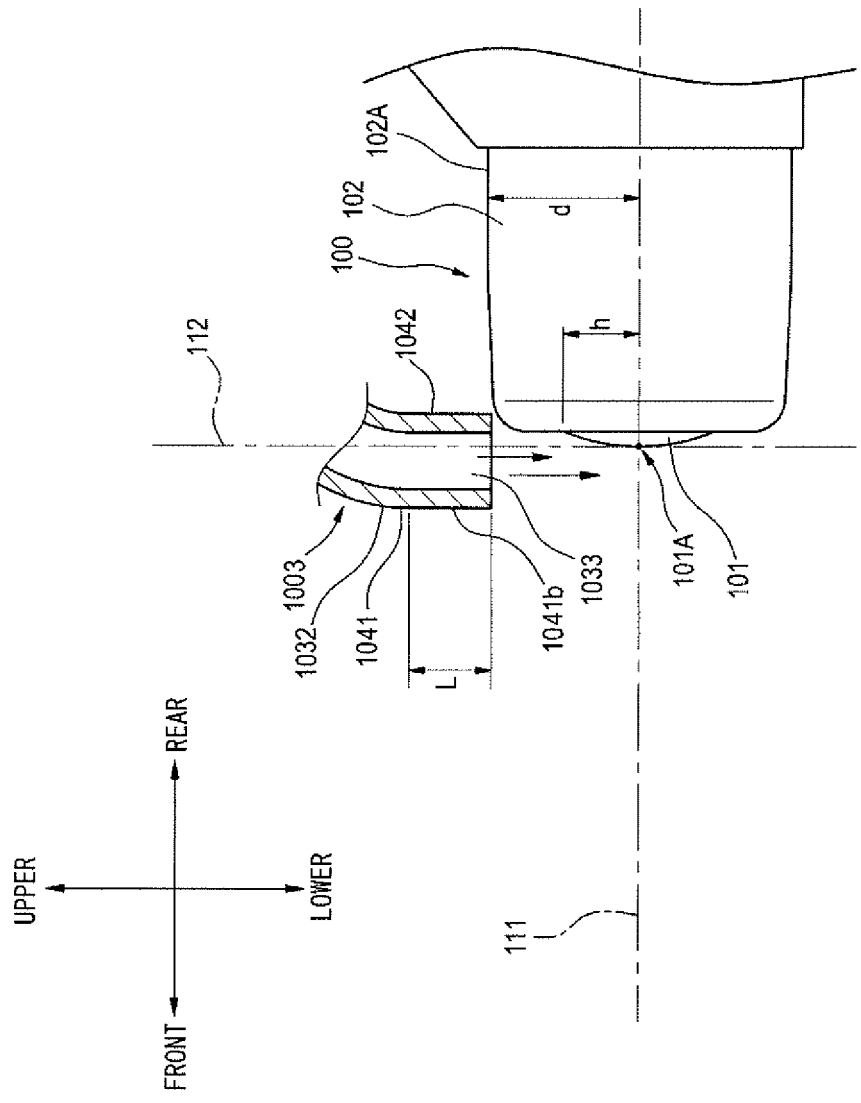
FIG. 25 is a view for explaining an ejecting portion of the nozzle.

FIG. 25 is a view for explaining the configuration of the ejecting portion 1032 of the nozzle 1003 and is a sectional view taken along the line A-A in FIG. 22 (the internal structure of the camera 100 is omitted).

As shown in FIG. 25, a tip portion 1041b (a lower end portion of the front wall 1041 in FIG. 25) of a predetermined length in the front wall 1041 of the ejecting portion 1032 is formed in a flat shape along the second axis 112.

When the length of the tip portion 1041b is defined as L(mm), the length L satisfies the condition expressed by the following equation 2.

$$0.5(\text{mm}) \leq L \leq d - h + 2.5(\text{mm}) \quad \text{(Equation 2)}$$

here, d(mm): the distance along the second axis 112 from the center point 101A of the lens 101 to the outer edge portion 102A of the housing 102

When performing calculation based on the conditional equation (2), it is preferable that the length L is, for example, 0.5 mm or more but 10.0 mm or less.

When the tip portion 1041*b* of the ejecting portion 1032 is formed in a flat shape in this manner, the cleaning efficiency of high-pressure air injected from the injection opening portion 1033 toward the surface of the lens 101 is improved. In particular, since the high-pressure air passing through a connection portion (a curved portion 1035 in FIG. 26) (to be described in detail later) between the front wall 1041 and the joint conduit line portion 1031 flows through the flat tip portion 1041*b*, the cleaning efficiency is further improved. Meanwhile, when the length L is longer than 10.0 mm, the entire size of the cleaner 1001 including the nozzle 1003 becomes unnecessarily large with respect to the camera 100. Therefore, it is preferable that the length L of the flat tip portion 1041*b* falls within a certain range.

Figure 26:
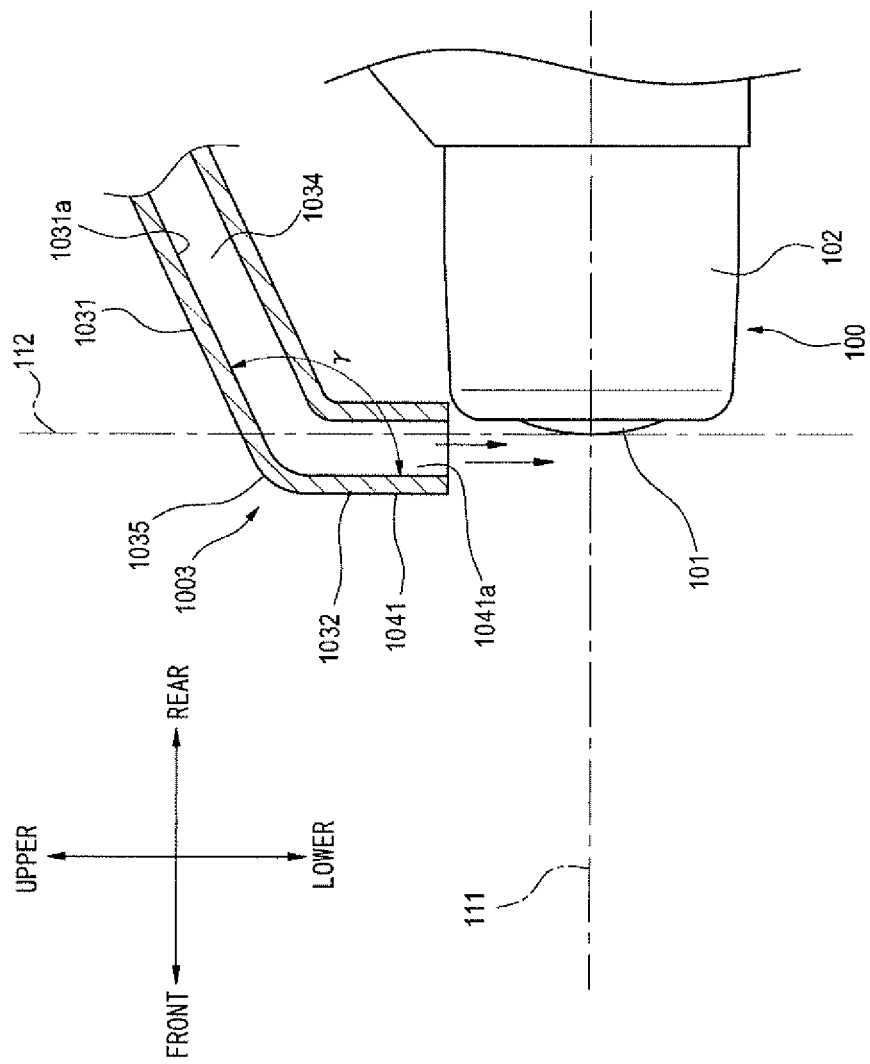
FIG. 26 is a view for explaining a bending angle of the nozzle.

FIG. 26 is a view for explaining the configuration of the communication passage 1034 formed in the nozzle 1003 and is a sectional view taken along the line A-A in FIG. 22 (the internal structure of the camera 100 is omitted).

In the nozzle 1003 shown in FIG. 26, an angle γ formed by the inner surface 1041*a* of the front wall 1041 of the ejecting portion 1032 and an inner surface 1031*a* of the joint conduit line portion 1031, that is, the angle γ at which the communication passage 1034 in the nozzle 1003 is bent is formed to be, for example, 90 degrees or more but 170 degrees or less, more preferably, 90 degrees or more but 120 degrees or less. Further, the connection portion between the ejecting portion 1032 and the joint conduit line portion 1031 is formed as the curved portion 1035. Preferably, the curved portion 1035 is formed so that a bending radius at the inner side (rear side in FIG. 26) of the communication passage 1034 is equal to or larger than R1(mm). That is, it is preferable that the ejecting portion 1032 and the joint conduit line portion 1031 are connected by the curved portion 1035 having an inscribed circle of R1(mm) or more.

When the angle γ is set to the above range, high-pressure air is facilitated to flow smoothly in the communication passage 1034. Further, when the bending radius of the curved portion 1035 is set to R1(mm), the flow of high-pressure air is further improved.

Figure 27:
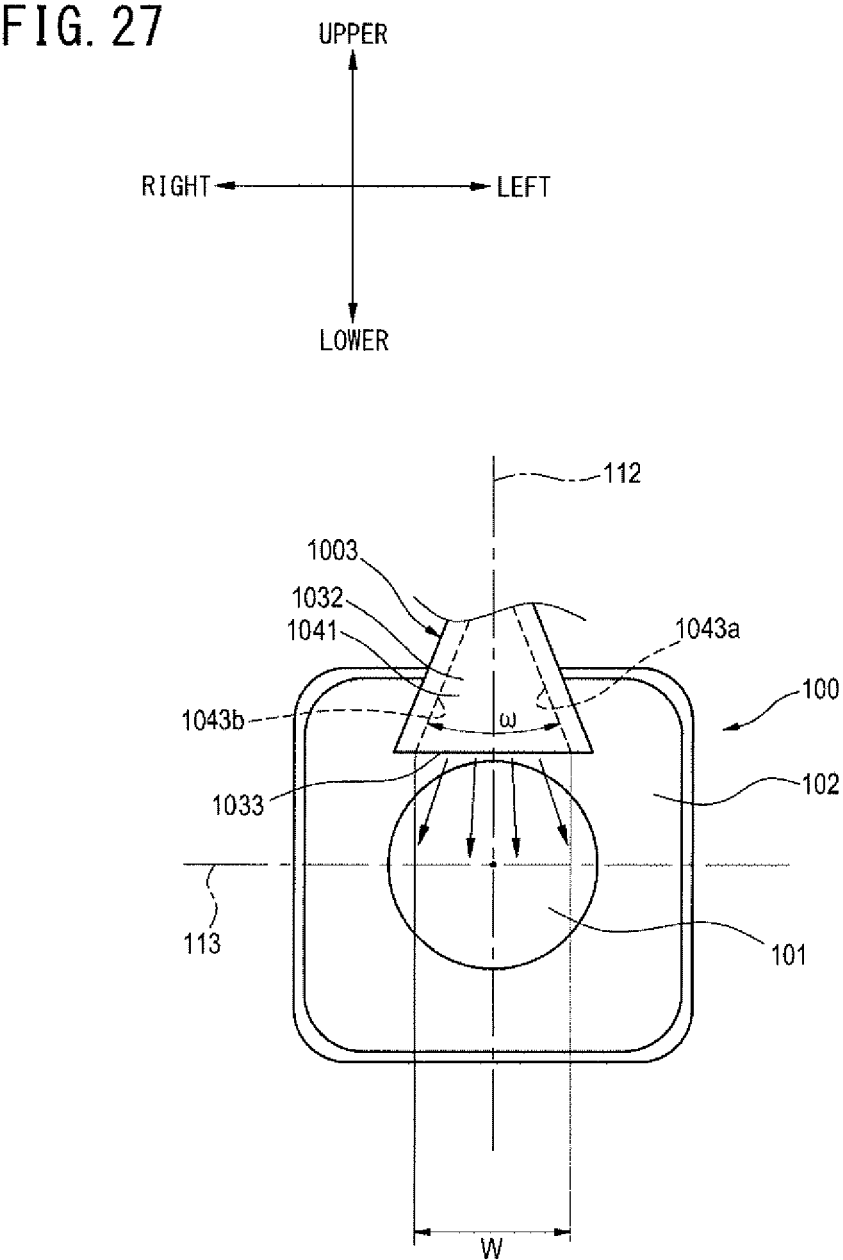
FIG. 27 is a view for explaining an opening portion of the nozzle.

FIG. 27 is a front view showing the camera 100 and the nozzle 1003 of the cleaner 1001.

In the nozzle 1003 shown in FIG. 27, a width W(mm) of the front wall 1041 along the third axis 113, that is, the opening width W(mm) in the left and right direction of the injection opening portion 1033 is defined so as to satisfy the condition expressed by the following equation 3.

$$Wh-2(\text{mm}) \leq W \leq Wh \quad \text{(Equation 3)}$$

here,

Wh(mm): the lateral width of the lens 101 along the third axis 113

When performing calculation based on the conditional equation (3), it is preferable that the opening width W is 2 mm or more but 12 mm or less when the lens 101 having the lateral width Wh of 8 mm or more but 12 mm or less is used.

Further, as shown in FIG. 27, a pair of side walls 1043*a*, 1043*b* (an example of the second wall portion) extending from the left and right side surfaces of the front wall 1041 toward the lens 101 (in the direction of the depth of the paper in FIG. 27) is formed in the nozzle 1003. Meanwhile, for the side walls, the reference will be made to the side walls 1043*a*, 1043*b* in FIG. 29 (to be described later), for example.

When an angle formed by the pair of side walls 1043*a*, 1043*b* is defined as ω, the angle ω satisfies the condition expressed by the following equation 4.

[Formula 2]
$$\omega = 2\tan^{-1}\left(\frac{W - 1.55(\text{mm})}{2(d - h + 2.5(\text{mm}))}\right) \quad \text{(Equation 4)}$$

When performing calculation based on the conditional equation (4), it is preferable that the nozzle 1003 is formed so as to open toward the lens 101 (from top toward bottom in FIG. 27) at the angle ω of 0 degree or more but 70 degrees or less. Meanwhile, the angle ω=0 degree means a case where the width (length in the right and left direction) of the front wall 1041 does not change and the side walls are arranged in parallel, for example, as in the nozzle 1003 shown in FIG. 22.

When a predetermined angle ω is formed between the side walls 1043*a*, 1043*b* and the communication passage 1034 of the nozzle 1003 is formed so as to spread toward the injection opening portion 1033, the cleaning efficiency of high-pressure air injected toward the surface of the lens 101 is improved.

Figure 28:
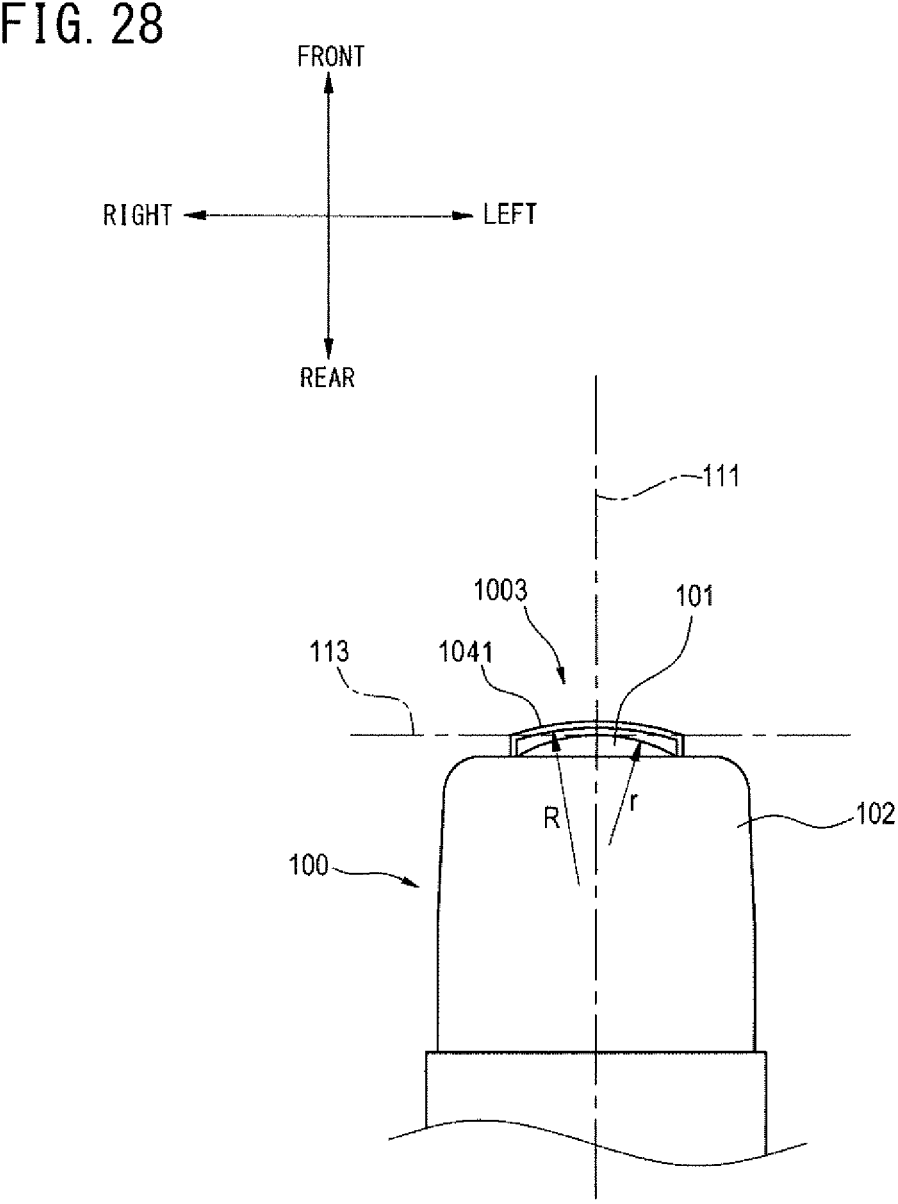
FIG. 28 is a view for explaining the radius of curvature of a front wall of the nozzle.
Figure 29:
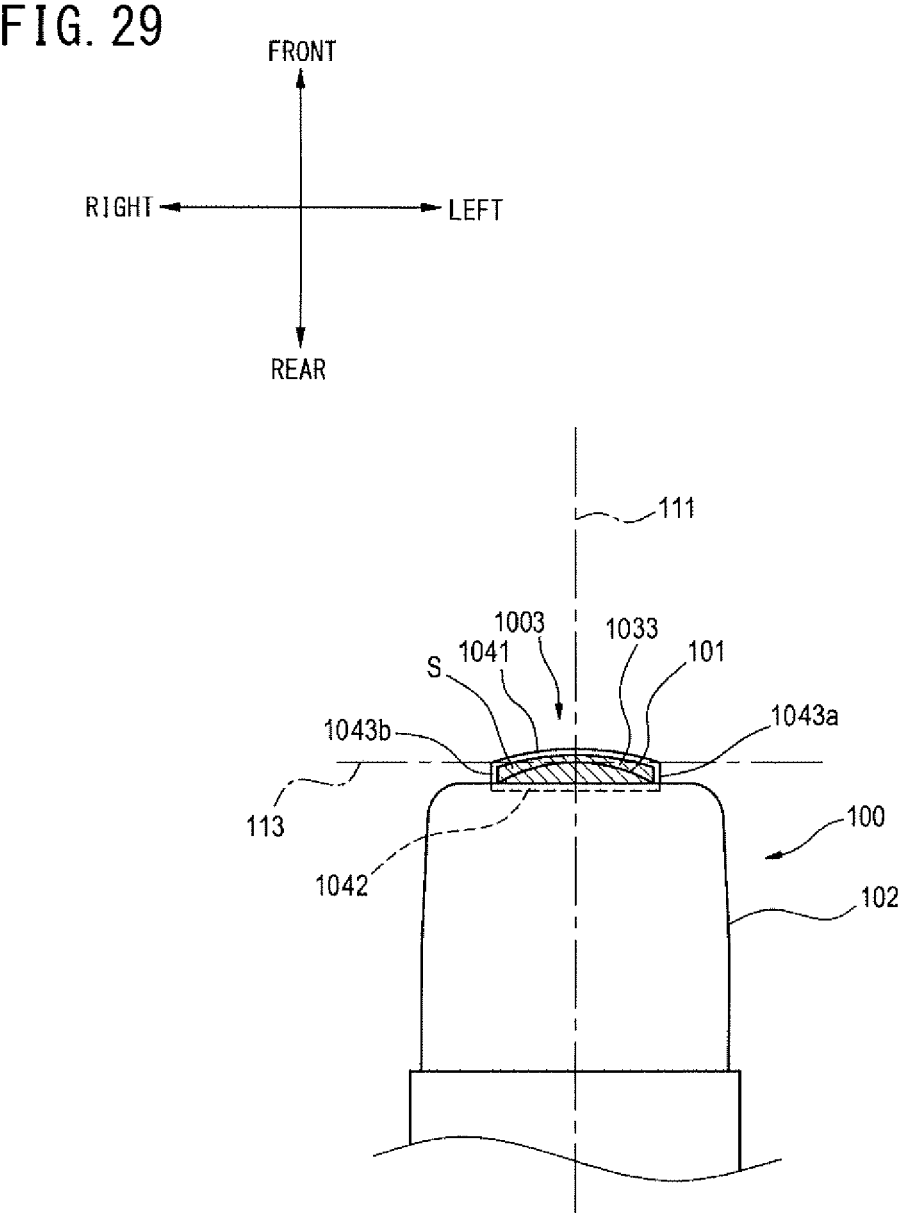
FIG. 29 is a view for explaining an opening area of the nozzle.

FIGS. 28 and 29 are sectional views taken along the line B-B in FIG. 22, respectively (the internal structure of the camera 100 is omitted). In FIG. 29, a part (the rear wall 1042 described later) of the nozzle 1003 hidden by the camera 100 is shown by an imaginary line.

In the camera 100 shown in FIG. 28, the radius of curvature of the surface of the lens 101 (e.g., convex lens) along the third axis 113 is defined as r(mm). Further, in the nozzle 1003, the radius of curvature of the front wall 1041 along the third axis 113 is defined as R(mm).

At this time, the radius of curvature r of the surface of the lens 101 and the radius of curvature R of the front wall 1041 of the nozzle 1003 satisfy the condition expressed by the following equation 5.

$$r \leq R \leq r+50(\text{mm}) \quad \text{(Equation 5)}$$

When the radius of curvature R satisfies such relationship with respect to the radius of curvature r, high-pressure air is uniformly injected from the injection opening portion 1033 of the nozzle 1003 toward the surface the lens 101, thereby improving the cleaning efficiency.

Further, in the nozzle 1003 shown in FIG. 29, the injection opening portion 1033 is defined by the front wall 1041, the pair of side walls 1043*a*, 1043*b*, and the rear wall 1042 (i.e., a straight line connecting ends of the pair of side walls 1043*a*, 1043*b* on the side opposite to the front wall 1041).

When an opening area of the injection opening portion 1033 is defined as S(mm²), the opening area S is defined to satisfy the condition expressed by the following equation 6.

$$7.5(\text{mm}^2) \leq S \leq W \times (T+2) \quad \text{(Equation 6)}$$

here,

W(mm): the opening width in the right and left direction of the injection opening portion 1033, and T(mm): the shortest distance between a tip "a" of the inner surface 1041*a* of the front wall 1041 and the second axis 112 of the lens 101

When performing calculation based on the conditional equation (6), it is preferable that the opening area S is 7.5 mm² or more but 90 mm² or less when the shortest distance T is 0 mm or more but 5.5 mm or less and W is 2 mm or more but 12 mm or less.

When the opening area S of the injection opening portion 1033 is set to the size within the predetermined range, high-pressure air is efficiently injected on the surface of the lens 101, thereby improving the cleaning efficiency.

Figure 30:
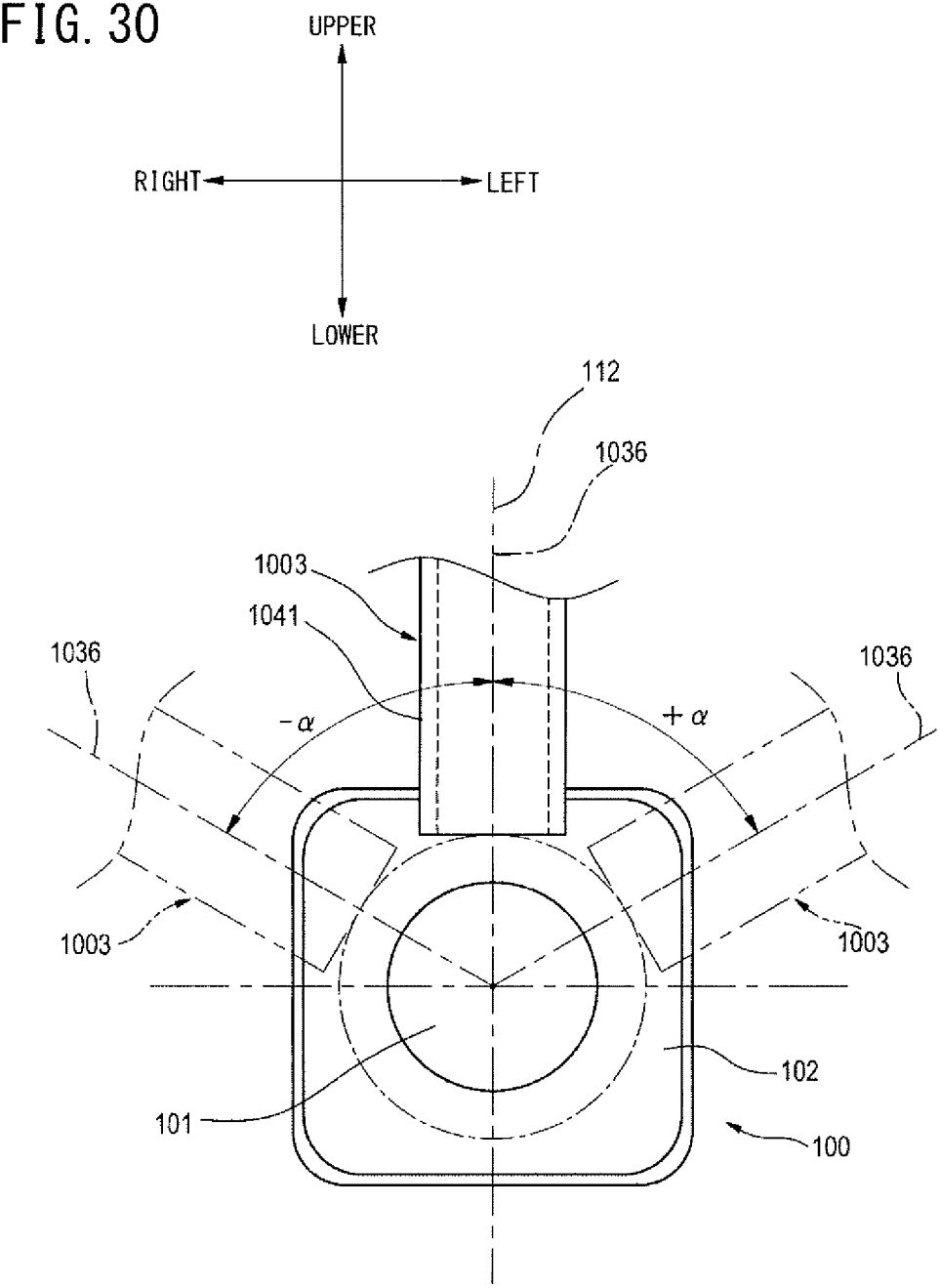
FIG. 30 is a view for explaining the direction of the nozzle in a front view.

FIG. 30 is a front view showing the camera 100 and the nozzle 1003 of the cleaner 1001.

As shown in FIG. 30, in the front view of the camera 100, an angle at which a central axis 1036 of the front wall 1041 of the nozzle 1003 rotates in the clockwise direction with respect to the second axis 112 is defined as +α, and an angle at which the central axis 1036 rotates in the counterclockwise direction is defined as −α.

In this case, the nozzle 1003 can be arranged with respect to the camera 100 so that the angle α formed by the central axis 1036 and the second axis 112 is −60 degrees or more but +60 degrees or less, more preferably, the angle α is −20 degrees or more but +20 degrees or more.

When the angle α is set to the above range, the nozzle 1003 can be disposed at a position avoiding another member without lowering the cleaning efficiency of the nozzle 1003, for example, even when another member is disposed around the camera 100.

According to the cleaner 1001 having such a configuration, the condition of the equation (1) is satisfied, so that the nozzle 1003 can be disposed at a position in which it does not appear in the captured image of the camera 100, and the performance of removing foreign objects on the lens 101 of the camera 100 can be improved.

Further, since the specific constituent conditions described above are satisfied, the performance of removing foreign objects on the lens of the camera can be further improved.

Eighth Embodiment

Hereinafter, an example of an eighth embodiment will be described with reference to FIGS. 31 to 36. Meanwhile, the constituent elements similar to those of the first embodiment or the like are denoted by the same reference numerals, and the explanation thereof will be appropriately omitted.

Figure 31:
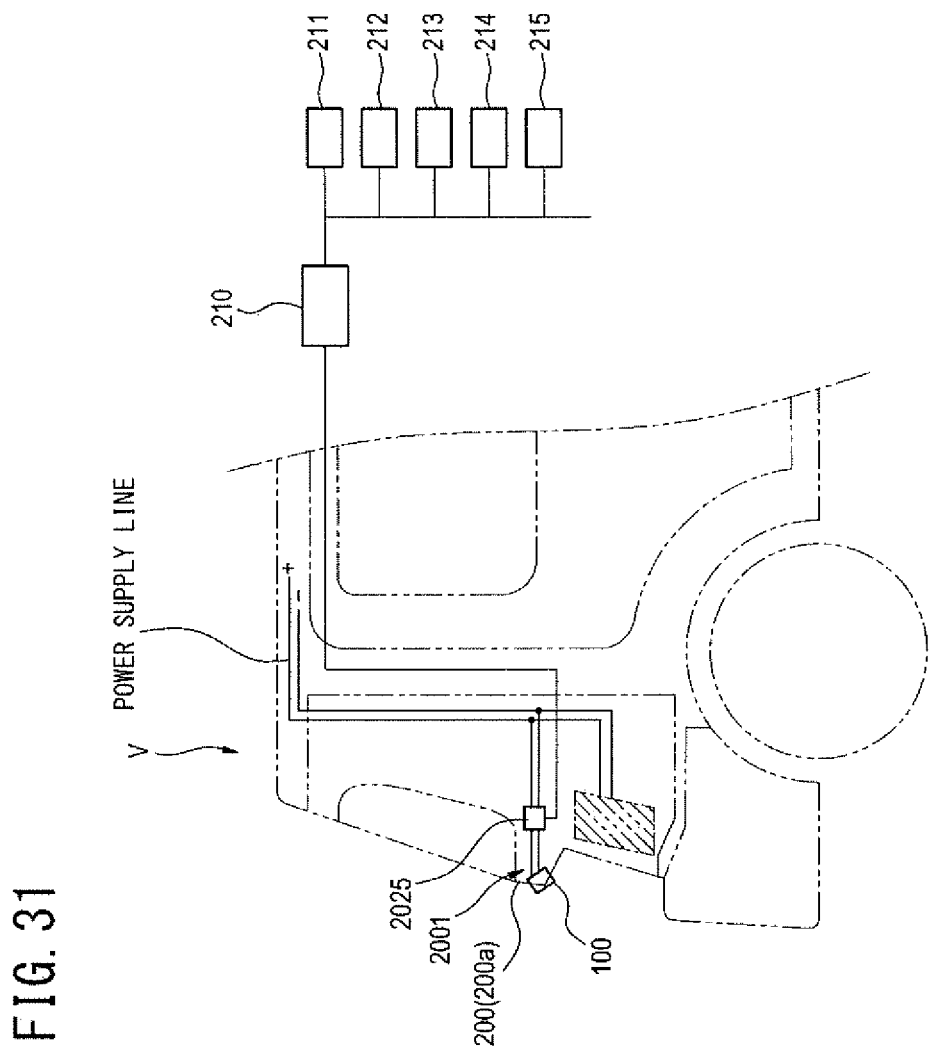
FIG. 31 is a side view of a rear part of a vehicle (a cleaner is shown in perspective)

As shown in FIG. 31, a cleaner 2001 is attached to, for example, the vehicle body panel 200a of the back door 200 of the vehicle V. The vehicle body panel 200a includes, for example, a body panel, a garnish, and the like. The cleaner 2001 includes a driving unit which is connected to a power supply line of the vehicle V. The cleaner 2001 includes a cleaner ECU 2025 (Electronic Control Unit, an example of the control unit) that controls the operation of the driving unit. For example, the supply of power from the power supply line to the driving unit is controlled by the cleaner ECU 2025.

A vehicle ECU 210 for controlling the operation of the vehicle is connected to the cleaner ECU 2025. A dirt sensor 211, a temperature sensor 212, a rain sensor 213, a vehicle speed sensor 214, and a shift range sensor 215, and the like are connected to the vehicle ECU 210. The dirt sensor 211 detects whether or not foreign objects adhere to the cleaning surface of the object to be cleaned. Although not shown, the dirt sensor 211 is configured so that light is emitted from, for example, an LED (light emitting diode) and projected on an object (here, for example, the lens of the in-vehicle camera), the light reflected by the lens is received by a PD (photo diode), and the contamination of the lens surface is detected from a change in the amount of received light. The temperature sensor 212 detects the outside air temperature around the vehicle V. The rain sensor 213 detects the presence or absence of rain. The vehicle speed sensor 214 detects the travelling speed (vehicle speed) of the vehicle V. The shift range sensor 215 detects the shift range (shift position) of the transmission of the vehicle V. That is, the shift range sensor 215 detects whether the shift lever is shifted to a parking range, a reverse range, a neutral range, or a driving range.

The cleaner 2001 is applied as a device (foreign object removal device) for cleaning (removing) foreign objects adhering to the cleaning surface of the object to be cleaned with high-pressure air or a device (foreign object adhesion preventing device) for preventing foreign objects from adhering to the cleaning surface of the object to be cleaned.

The object to be cleaned may include, for example, a vehicle lamp and a front/rear window and the like, in addition to various in-vehicle sensors mounted on a vehicle. The in-vehicle sensor includes the in-vehicle camera 100 for confirming the rear side of the vehicle V as shown in FIG. 31. The in-vehicle camera 100 can be attached to the vehicle body panel 200a of the vehicle V together with the cleaner 2001. The in-vehicle camera 100 includes, for example, a back camera that can confirm the backward view by capturing a backward image of a vehicle and displaying the backward image on a monitor screen of a navigation device or the like when the shift position is switched to the reverse range (when the shift lever is shifted to the reverse range), a rearview mirror (or a side-view mirror) camera for capturing a backward image of a vehicle during travelling and displaying the backward image on a rearview mirror (or a side-view mirror) type monitor, or the like. The vehicle lamp includes, for example, a head lamp, a rear lamp, and the like. The cleaning surface of the object to be cleaned includes a camera lens, a lamp outer cover, and the like. Adhering foreign objects include water droplets, mud, dust, icing due to freezing or the like, etc.

Meanwhile, the in-vehicle camera 100 is not limited to a back camera. For example, the in-vehicle camera 100 is a camera for confirming the front or the side of the vehicle V and may be attached to the vehicle body panel 200a on the front side or the side of the vehicle V together with the cleaner 2001.

Figure 32:
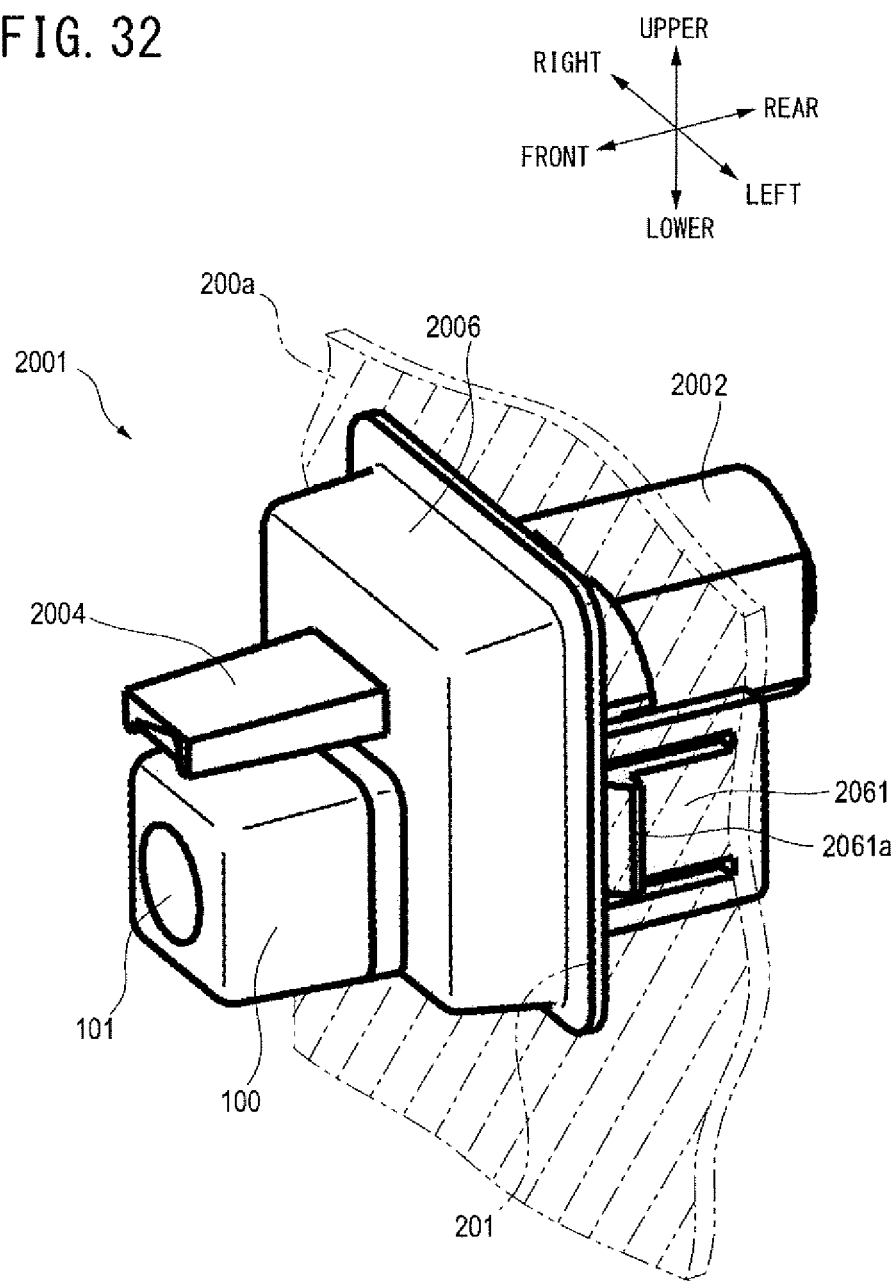
FIG. 32 is a front perspective view of a cleaner according to an eighth embodiment.
Figure 33:
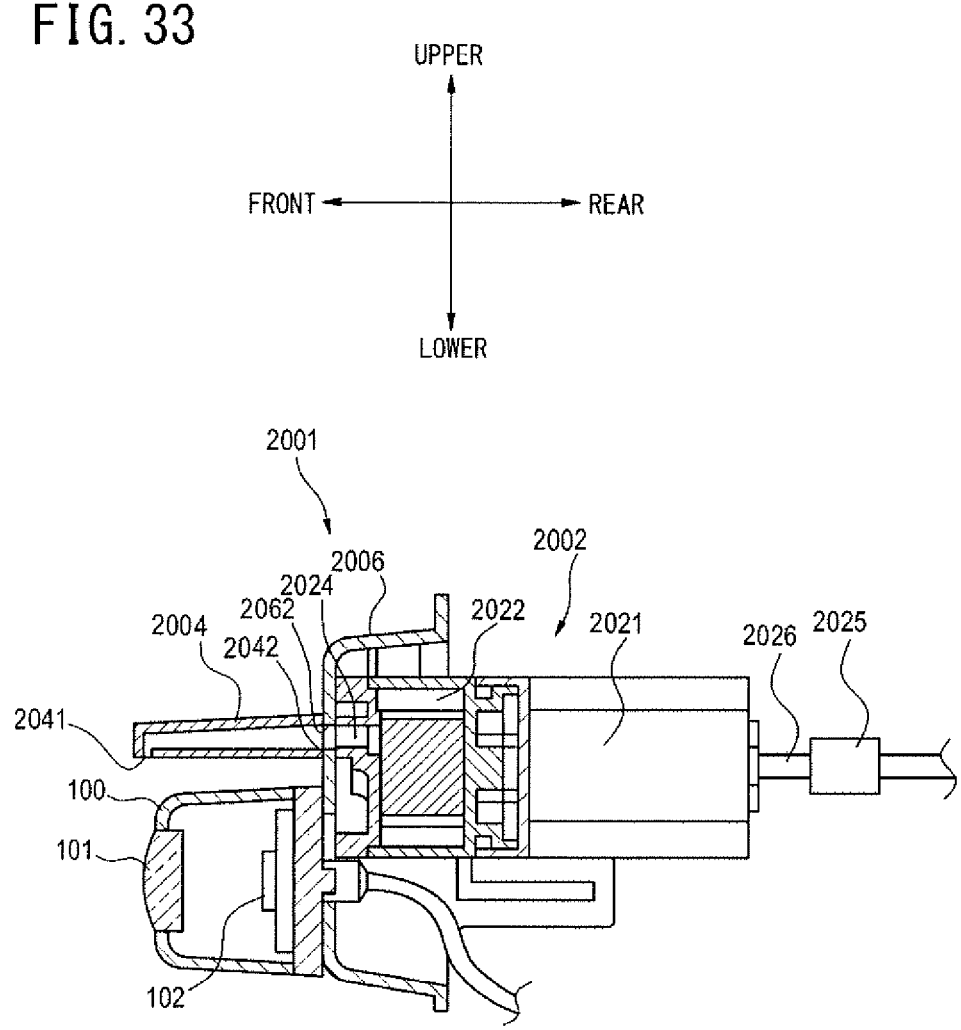
FIG. 33 is a transverse sectional view of the cleaner of FIG. 32.

As shown in FIGS. 32 and 33, the cleaner 2001 includes a pump 2002 (an example of the generation unit) that generates high-pressure air for cleaning, a nozzle 2004 that injects high-pressure air toward the lens 101 of the in-vehicle camera 100, and the cleaner ECU 2025 that controls the injection of high-pressure air. In the following, the direction (nozzle side) for feeding high-pressure air by the pump 2002 is defined as the front side, and the direction opposite to the feeding direction of high-pressure air is defined as the rear side. Further, in the cleaner 2001, the side of the nozzle 2004 is defined as the upper side, and the side of the in-vehicle camera 100 is defined as the lower side.

The pump 2002 and the nozzle 2004 are integrally configured via a bracket 2006 supporting the in-vehicle camera 100. The bracket 2006 is formed in, for example, a rectangular lid shape, and a mounting arm portion 2061 to be attached to the vehicle V is provided on the rear side thereof which is an opening side. The bracket 2006 is attached to the vehicle body panel 200a by engaging, for example, a claw portion 2061a provided on the mounting arm portion 2061 with the opening portion 201 formed in the vehicle body panel 200a.

The pump 2002 is attached to the rear side of the bracket 2006. When the bracket 2006 is attached to the vehicle body panel 200a, the pump 2002 is disposed inside the vehicle body panel 200a. The pump 2002 includes a driving unit 2021 for operating the pump 2002 and a compression chamber 2022 for compressing air. The driving unit 2021 is configured by, for example, a motor. The compression chamber 2022 has an intake port (not shown) for introducing outside air and an exhaust port 2024 for discharging compressed high-pressure air toward the nozzle 2004. The cleaner ECU 2025 is connected to the pump 2002 via a cable 2026. According to this configuration, the pump 2002 can be accommodated, for example, in a vehicle interior which is not easily influenced by the outside air environment, and it is possible to generate high-pressure air having a relatively high temperature while ensuring the waterproofness.

The nozzle 2004 is attached so as to extend from the front surface of the bracket 2006 and provided so as to be exposed toward the outside of the vehicle body panel 200*a*. An injection port 2041 at the front end of the nozzle 2004 is formed so as to face the lens 101 of the in-vehicle camera 100. An inlet port 2042 at the rear end of the nozzle 2004 communicates with the exhaust port 2024 of the pump 2002 through which high-pressure air is discharged via a conduit line 2062 formed in the bracket 2006.

The in-vehicle camera 100 is arranged below the nozzle 2004 so as to be aligned with the nozzle 2004 on the front surface of the bracket 2006. The in-vehicle camera 100 is attached to the vehicle body panel 200*a* so that the lens 101 is exposed toward the outside of the vehicle body panel 200*a*. An imaging unit 102 is provided inside the in-vehicle camera 100, and the lens 101 is provided on the front surface of the in-vehicle camera 100 so as to cover the imaging unit 102.

High-pressure air discharged from the pump 2002 passes through a communication passage formed in the nozzle 2004 and is injected from the injection port 2041 of the nozzle 2004 toward the lens 101 of the in-vehicle camera 100.

Subsequently, an operation example of the cleaner 2001 will be described with reference to the flowcharts of FIGS. 34 to 36.

When the ignition of the vehicle V is turned on (an ignition switch is turned on) and a voltage is supplied to each part via a power supply line, the dirt sensor 211, the temperature sensor 212, the rain sensor 213, the vehicle speed sensor 214, and the shift range sensor 215 and the like connected to the vehicle ECU 210 start respective detection operations. The detection information of these sensors is transmitted from the vehicle ECU 210 to the cleaner ECU 2025 via a signal line.

Operation Example 1

Figure 34:
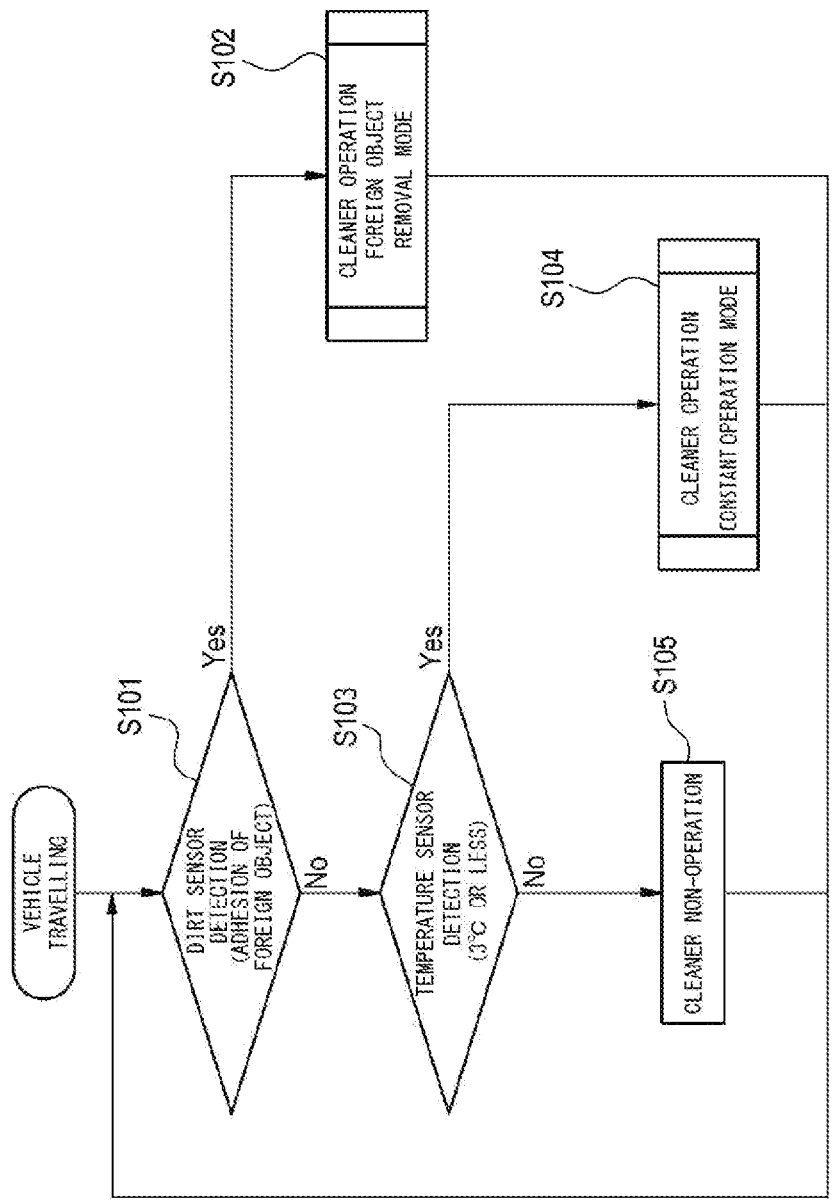
FIG. 34 is a flowchart for explaining an operation example 1 of the cleaner of FIG. 32.

As shown in FIG. 34, for example, during the travelling of the vehicle V, the cleaner ECU 2025 of the cleaner 2001 determines whether or not foreign objects adhere to the lens 101 of the in-vehicle camera 100 based on the detection information of the dirt sensor 211 transmitted from the vehicle ECU 210 (Step S101). Instead of using the method of detecting the presence or absence of foreign objects on the lens 101 by the dirt sensor 211, the adhesion of foreign objects may be detected by image recognition of the backward image displayed on the monitor screen.

When it is determined that foreign objects adhere (Yes in Step S101), the cleaner ECU 2025 operates the pump 2002 to generate high-pressure air and executes a foreign object removal mode for removing foreign objects adhering to the lens 101 (Step S102). In the foreign object removal mode, high-pressure air generated by the pump 2002 is continuously injected from the nozzle 2004 toward the lens 101, for example, for a predetermined time. The injection of the high-pressure air is repeated until it is determined in the determination of Step S101 that foreign objects do not adhere.

On the contrary, when it is determined that foreign objects do not adhere (No in Step S101), the cleaner ECU 2025 executes a foreign object adhesion preventing mode for preventing foreign objects from adhering to the lens 101. Specifically, for example, the cleaner ECU 2025 determines whether or not the outside air temperature of the vehicle V is equal to or lower than a predetermined temperature (e.g., 3° C.) based on the detection information of the temperature sensor 212 (Step S103).

When it is determined that the outside air temperature is equal to or lower than 3° C. (Yes in Step S103), the cleaner ECU 2025 operates the pump 2002 to generate high-pressure air and executes, for example, a constant operating mode for preventing foreign objects from adhering to the lens 101 (Step S104). The foreign object adhesion preventing mode includes a plurality of operating modes, for example, "a first intermittent operating mode," and "a second intermittent operating mode" and the like, in addition to the "constant operating mode." The constant operating mode is a mode in which high-pressure air is constantly injected toward the lens 101. The first intermittent operating mode is a mode in which high-pressure air is intermittently injected toward the lens 101 at a predetermined cycle (e.g., at an interval of 10 seconds). The second intermittent operating mode is a mode in which high-pressure air is injected toward the lens 101 at a cycle (e.g., at an interval of 5 seconds or 2 seconds) shorter than in the first intermittent operating mode.

On the contrary, when it is determined that the outside air temperature is not equal to or lower than 3° C. (No in Step S103), the cleaner ECU 2025 does not operate the cleaner 2001 (does not inject high-pressure air) (Step S105). Then, the cleaner ECU 2025 returns to Step S101 and repeats the above-described process of each step.

According to this cleaner 2001, the operating mode is switched depending on whether or not foreign objects adhere to the lens 101 of the in-vehicle camera 100, so that high-pressure air can be efficiently injected to the lens 101 while preventing the service life of the cleaner 2001 from being lowered. Further, in the case where the outside air temperature is equal to or lower than 3° C., that is, in a situation where the freezing of the lens 101 is expected, the constant operating mode is executed, and high-pressure air generated by the pump 2002 arranged inside the vehicle body panel 200*a* and having a relatively high temperature is constantly injected to the lens 101. In this way, it is possible to reliably prevent the icing and freezing of the lens 101.

Meanwhile, the cleaner ECU 2025 may always execute the constant operating mode whenever the outside air temperature of the vehicle V is equal to or lower than 3° C. based on the detection information of the temperature sensor 212, regardless of the determination of the foreign object adhesion by the dirt sensor 211. That is, Step S101 and Step S102 may be omitted in FIG. 34. In this manner, even when foreign objects do not adhere to the lens 101, the constant operating mode in which high-pressure air is generated and constantly injected is executed when a predetermined condition is satisfied (e.g., the outside air temperature is equal to or lower than 3° C.). As a result, adhesion of foreign objects to the lens 101, in particular, icing or freezing can be prevented. Further, when the outside air temperature is higher than 3° C. and the freezing of the lens 101 is not expected, the cleaner 2001 is not operated. Therefore, the consumption of each part of the cleaner 2001 can be suppressed, thereby providing the cleaner 2001 having a long service life.

Operation Example 2

Figure 35:
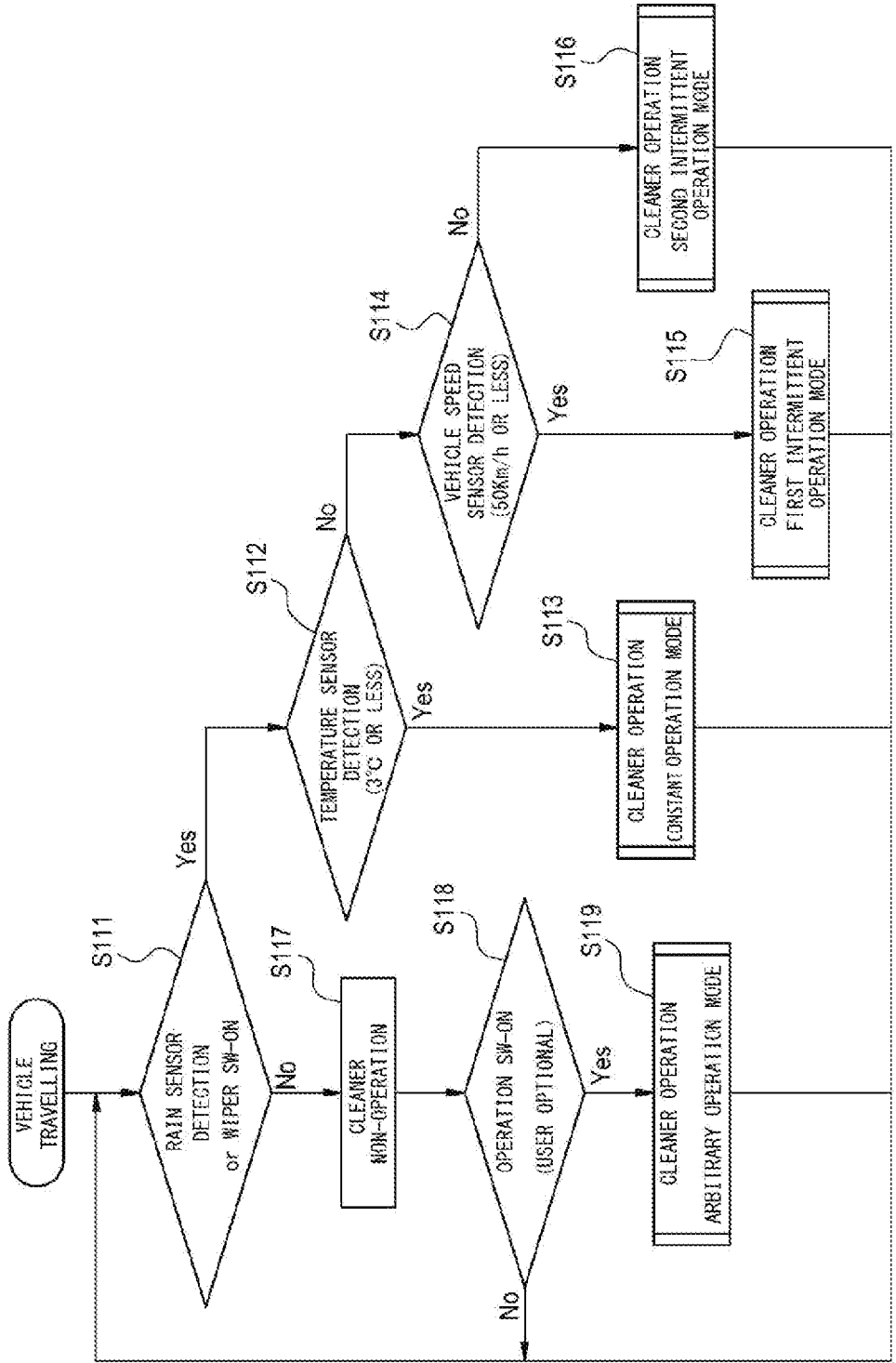
FIG. 35 is a flowchart for explaining an operation example 2 of the cleaner of FIG. 32.
Figure 36:
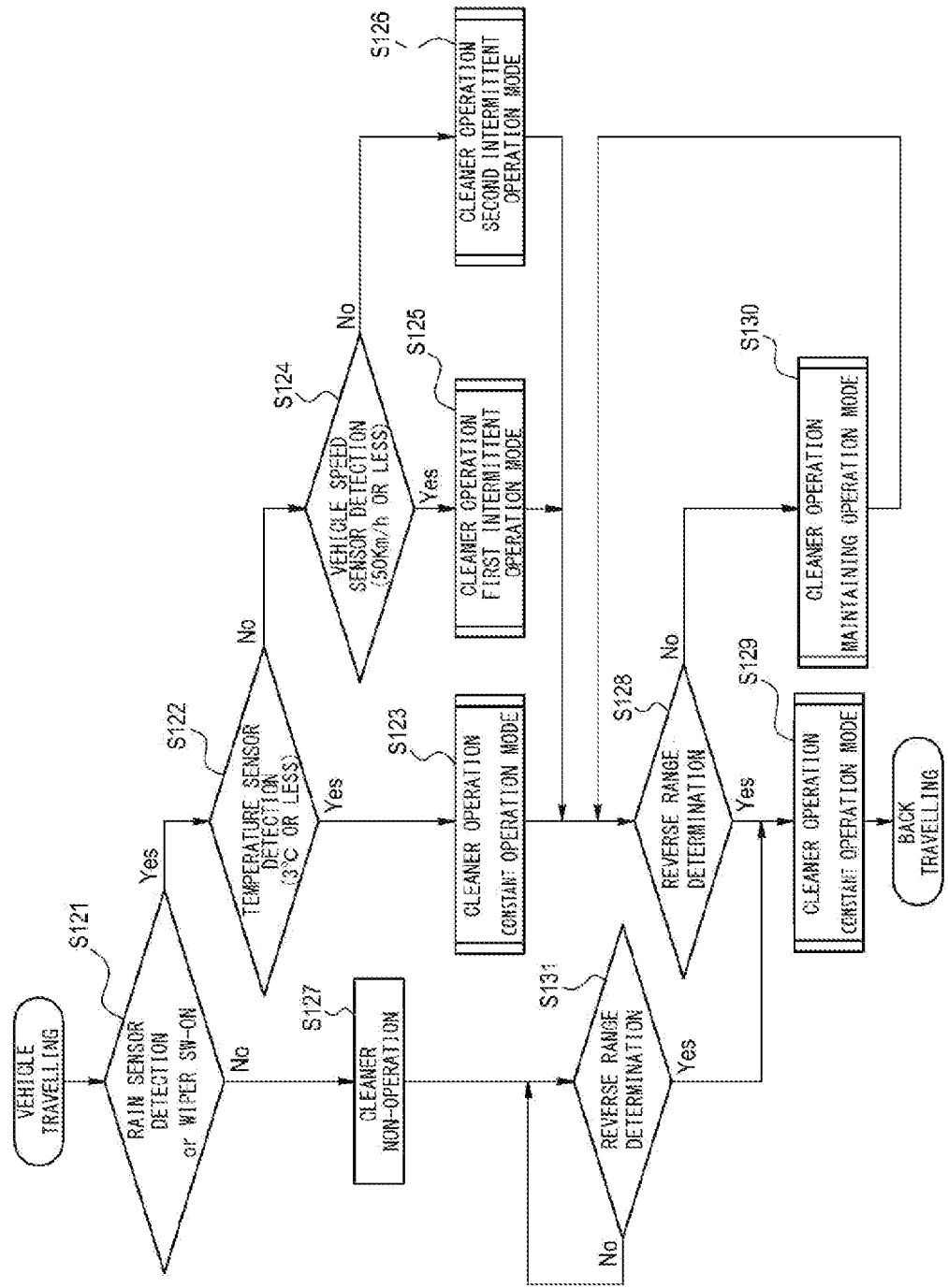
FIG. 36 is a flowchart for explaining an operation example 3 of the cleaner of FIG. 32.

As shown in FIG. 35, for example, during the travelling of the vehicle V, the cleaner ECU 2025 of the cleaner 2001 determines whether or not it is raining based on the detection information of the rain sensor 213 transmitted from the vehicle ECU 210 (Step S111). Meanwhile, instead of the detection information of the rain sensor 213, whether it is raining may be determined based on whether or not a wiper switch is turned on. Further, in addition to this, for example, it may be determined whether or not snow is falling or whether or not freezing has occurred.

When it is determined that it is raining (Yes in Step S111), the cleaner ECU 2025 determines whether or not the outside air temperature of the vehicle V is equal to or lower than 3° C. based on the detection information of the temperature sensor 212 (Step S112). When it is determined that the outside air temperature is equal to or lower than 3° C. (Yes in Step S112), the cleaner ECU 2025 operates the pump 2002 to generate high-pressure air and executes the constant operating mode (see the operation example 1) for preventing foreign objects (in particular, ice) from adhering to the lens 101 (Step S113). Then, the cleaner ECU 2025 returns to Step S111 and repeats the above-described process of each step.

On the contrary, when it is determined that the outside air temperature is not equal to or lower than 3° C. (No in Step S112), the cleaner ECU 2025 determines whether or not the travelling speed of the vehicle V is equal to or lower than a predetermined speed (e.g., 50 km/h) based on the detection information of the vehicle speed sensor 214 (Step S114).

When it is determined that the travelling speed is equal to or lower than 50 km/h (Yes in Step S114), the cleaner ECU 2025 operates the pump 2002 to generate high-pressure air and executes the first intermittent operating mode in order to prevent foreign objects (in particular, raindrop) from adhering to the lens 101 (Step S115). Then, the cleaner ECU 2025 returns to Step S111 and repeats the above-described process of each step.

On the contrary, when it is determined that the travelling speed is faster than 50 km/h (No in Step S114), the cleaner ECU 2025 executes the second intermittent operating mode having an injection interval shorter than in the first intermittent operating mode in order to prevent foreign objects (in particular, water droplets rolled up by surrounding vehicles and raindrops) from adhering to the lens 101 (Step S116). Then, the cleaner ECU 2025 returns to Step S111 and repeats the above-described process of each step.

Further, when it is determined in Step S111 that it is not raining (No in Step S111), the cleaner ECU 2025 does not operate the cleaner 2001 (Step S117).

In addition, the cleaner ECU 2025 determines whether or not an operation switch of the cleaner 2001 is turned on, that is, whether or not a user driving the vehicle V is turning on the operation switch of the cleaner 2001 (Step S118). For example, when it is determined that a backward image of the vehicle V captured by the in-vehicle camera 100 that is a back camera and displayed on a monitor screen of a navigation device or the like when the shift lever is shifted to the reverse range is difficult to see due to adhesion of foreign objects such as water drops, a user can turn on the operation switch of the cleaner 2001. Alternatively, also when it is determined that a backward image captured by the in-vehicle camera 100 that is a rearview mirror (a side-view mirror) camera and displayed on a rearview mirror (or a side-view mirror) type monitor is difficult to see due to adhesion of foreign objects, a user can turn on the operation switch of the cleaner 2001.

When it is determined that the operation switch of the cleaner 2001 is turned on (Yes in Step S118), the cleaner ECU 2025 executes any operation mode selected by a user, for example, one of the constant operating mode, the first intermittent operating mode, and the second intermittent operating mode (Step S119). Then, the cleaner ECU 2025 returns to Step S111 and repeats the above-described process of each step.

On the contrary, when it is determined that the operation switch of the cleaner 2001 is not turned on (No in Step S118), the cleaner ECU 2025 does not operate the cleaner 2001 and returns to Step S111.

According to this cleaner 2001, in a situation where freezing of the lens 101 of the in-vehicle camera 100 is expected with high probability (for example, in the case where it is raining and the outside air temperature is equal to or lower than 3° C.), high-pressure air is constantly injected to the lens 101. In this way, the icing or freezing of the lens 101 can be prevented, and the de-icing of the lens 101 can be performed.

Further, even when the outside air temperature is higher than 3° C., in the case where the travelling speed of the vehicle V is faster than a constant speed (in the case of high-speed driving), due to the rolled up or the like of raindrops by surrounding vehicles, raindrops tend to adhere to the lens 101 more than in the case of low-speed driving. Therefore, high-pressure air can be intermittently injected to the lens 101 while switching the operating mode between the first intermittent operating mode and the second intermittent operating mode according to the travelling speed of the vehicle V. In this way, foreign objects such as raindrops adhering to the lens 101 can be efficiently removed.

In this manner, the operation mode can be appropriately switched according to the predicted adhesion situation of foreign objects to the lens 101, so that high-pressure air can be efficiently injected to the lens 101 while preventing the service life of the cleaner from being lowered.

Operation Example 3

Subsequently, the operation of the cleaner 2001 in the case where the in-vehicle camera 100 is a back camera for confirming the backward view by a monitor screen during back travelling will be described with reference to FIG. 36. In FIG. 36, each operation of Step S121 to Step S127 is similar to each operation of Step S111 to Step S117 in the operation example 2 of FIG. 35.

In the present example, when the execution of each of the operation modes at Steps S123, S125, S126 is ended, the cleaner ECU 2025 determines whether or not the shift lever is shifted to the reverse range based on the detection information of the shift range sensor 215 transmitted from the vehicle ECU 210 (Step S128).

When it is determined that the shift lever is shifted to the reverse range (Yes in Step S128), the cleaner ECU 2025 operates the pump 2002 to generate high-pressure air and executes the constant operating mode in order to prevent foreign objects from adhering to the lens 101 (Step S129). After executing the constant operating mode at Step S129, the cleaner ECU 2025 transmits a signal indicating that the constant operating mode has been executed to the vehicle ECU 210. Then, the vehicle ECU 210 executes a back travelling operation of the vehicle V.

On the contrary, when it is determined that the shift lever is not shifted to the reverse range (No in Step S128), the cleaner ECU 2025 maintains the execution of each of the operation modes at Steps S123, S125, S126 which are executed before Step S128 (Step S130). For example, when the first intermittent operating mode is executed as Step S125 before Step S128, the first intermittent operating mode is also executed at Step S130.

Further, even when it is determined in Step S121 that it is not raining and the cleaner 2001 is inoperative (Step S127), the cleaner ECU 2025 determines whether or not the shift lever is shifted to the reverse range based on the detection information of the shift range sensor 215 transmitted from the vehicle ECU 210 (Step S131).

When it is determined that the shift lever is shifted to the reverse range (Yes in Step S131), the cleaner ECU 2025 executes the constant operating mode (Step S129). On the contrary, when it is determined that the shift lever is not shifted to the reverse range (No in Step S131), the cleaner ECU 2025 repeats the determination of Step S131 until it is determined that the shift lever is shifted to the reverse range.

According to this cleaner 2001, the same operational effects as those of the operation example 2 can be obtained. Further, when the constant operating mode is executed in a situation where it is expected that the vehicle V will start back travelling, foreign objects such as raindrops or ice adhering to the lens 101 of the in-vehicle camera 100 that is a back camera can be reliably removed. In this way, it is possible to display the backward image with good visibility on the monitor screen.

Meanwhile, the disclosure is not limited to the above-described embodiments, but can be appropriately deformed or unproved. In addition, the materials, shapes, dimensions, numerical values, modes, quantities, and locations and the like of the respective components in the above-described embodiments are arbitrary and not limited.

Although the claw pump has been described in the above-described example, the rotary positive displacement pump according to the disclosure is not limited thereto. For example, a vane type pump or a roots pump may be used.

Figure 37:
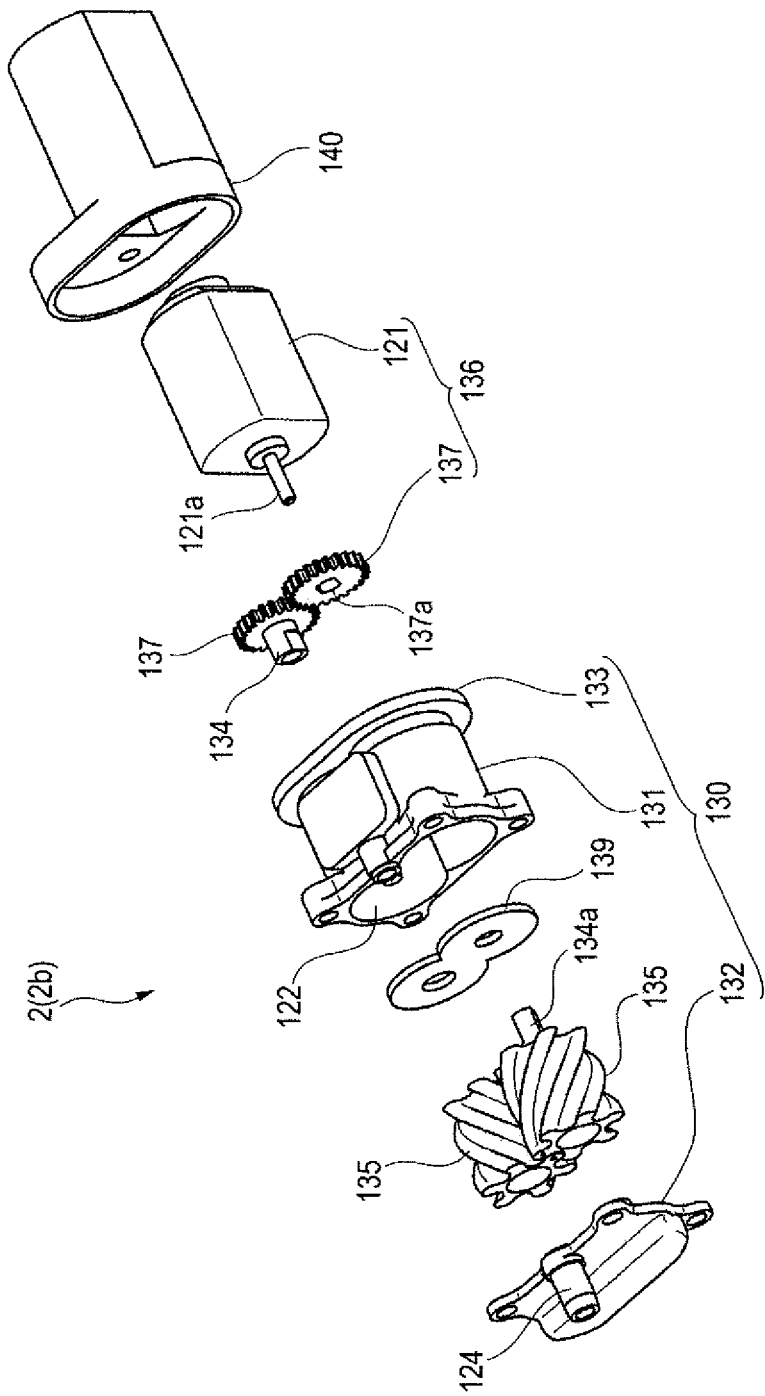
FIG. 37 is an exploded perspective view of a modification of the pump.

A specific configuration of a roots pump 2b will be described in detail with reference to FIGS. 37, 38 and 39.

The roots pump 2b includes a cylinder 130 forming a compression chamber 122, a pair of rotating shafts 134, 134a, a pair of rotors 135, intake ports 123, 123a~123d, an exhaust port 124, and a rotary driving device 136.

The cylinder 130 includes a cylindrical portion 131 having a cross-sectional shape obtained by partially overlapping two circles, a front wall 132 attached to a front end surface of the cylindrical portion 131, and a rear wall 133 attached to a rear end surface of the cylindrical portion 131.

The rotary driving device 136 includes a driving unit 121 and a pair of power transmission gears 137. The driving unit 121 has a driving shaft 121a. The driving shaft 121a functions as driving shafts of the power transmission gears 137 and also functions as rotating shafts of the rotors 135. The pair of power transmission gears 137 is formed to mesh with each other. One of the power transmission gears 137 has a hole 137a at its center and is fixed to the driving shaft 121a inserted into the hole 137a via the rotating shaft 134a to rotate together with the driving shaft 121a. The other of the power transmission gears 137 is attached to the rotating shaft 134. Each axial direction of the rotating shaft 134 and the driving shaft 121a substantially coincides with an extending direction of the nozzle 5 provided on the front surface side of the bracket 6. The rotating shaft 134 and the driving shaft 121a are parallel to each other and configured to synchronously rotate in opposite directions. As one of the power transmission gears 137 is rotated by the driving shaft 121a, the rotating shaft 134a and the rotating shaft 134 fixed to the driving shaft 121a are configured to rotate in opposite directions via the power transmission gears 137. The rotary driving device 136 rotationally drives the pair of rotors 135 via the rotating shaft 134a and the rotating shaft 134 fixed to the driving shaft 121a.

The pair of rotors 135 is accommodated in the cylinder 130 and fixed to the rotating shaft 134 and the driving shaft 121a, respectively. The rotating shaft 134 and the driving shaft 121a are supported by a plate 139 on the rear side of the fixed rotor 135, respectively. Each of the rotors 135 has a plurality of ridge portions spirally extending on the outer periphery thereof. The ridge portions of the pair of rotors 135 spirally extend in opposite directions and are formed so as to mesh with each other in a contact state. Further, a plurality of helical spaces is formed in the cylinder 130 by the plurality of ridge portions and the cylinder 130. By engaging the ridge portions with each other inside the cylinder 130 with the rotation of the rotating shafts 134, 134a in opposite directions, the pair of rotors 135 feeds the air introduced from the intake port 123 along the helical spaces with the rotation of the rotors 135 while compressing the air and discharges the compressed air from the exhaust port 124.

The intake ports 123, 123a to 123d and the exhaust port 124 are formed so as to communicate with the compression chamber 122, respectively. A protruding portion 132a protruding forward is formed on the lower side of the front surface of the front wall 132. The intake port 123 is formed in a side wall of the protruding portion 132a, and the intake ports 123a to 123d are formed in a rear wall of the protruding portion 132a. As indicated by an arrow in FIG. 39, air introduced from the intake port 123 is introduced into the compression chamber 122 via the intake ports 123a to 123d. The exhaust port 124 is formed in the front wall 132 that is a side wall close to the nozzle 5. The intake port 123 may be formed in a portion of a peripheral wall of the cylindrical portion 131, in which two circles are partially overlapped, or the intake port 123 may be formed in the peripheral wall of each of two circles in the cylindrical portion 131. Further, the intake port 123 may be formed in a side wall on the side where the exhaust port 124 is not formed.

The above-described members are combined and accommodated in a pump housing 140.

Figure 38:
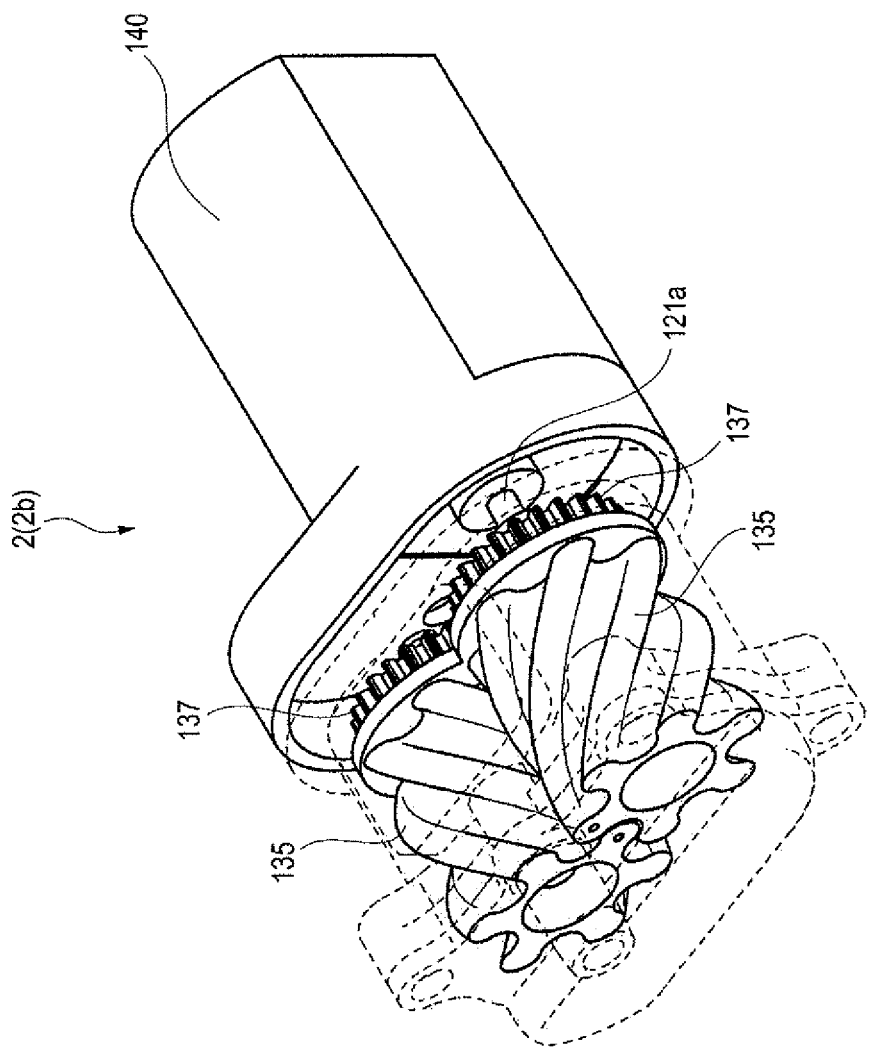
FIG. 38 is a perspective view of the pump of FIG. 37.
Figure 39:
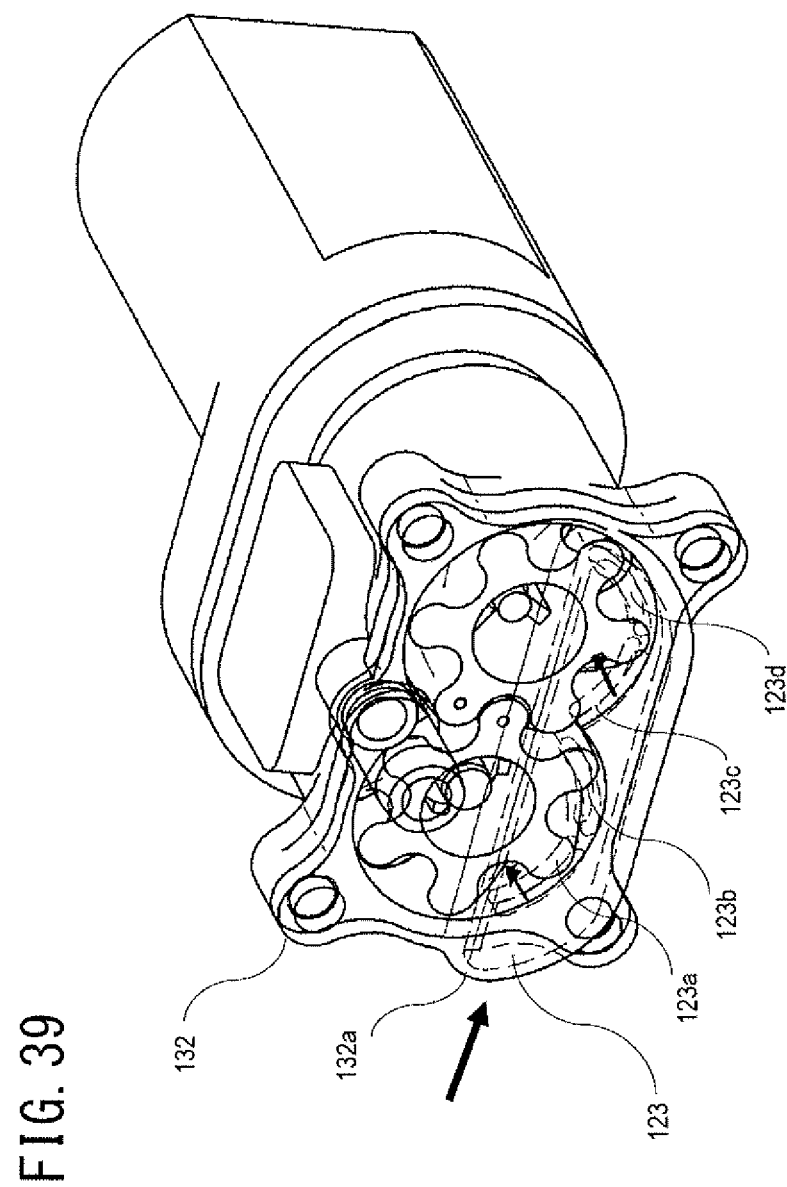
FIG. 39 is a perspective view of the pump of FIG. 37 as viewed from another direction.

FIG. 38 is a perspective view showing the roots pump 2b in which the cylinder 130 is indicated by a broken line.

As shown in FIG. 38, the pair of rotors 135 is accommodated in the cylindrical portion 131 of the cylinder 130 in a state of being fixed to the rotating shaft 134 and the driving shaft 121a. The air introduced from the intake port 123 is compressed, by synchronous rotation of the pair of rotors 135, in a compression pocket formed by the cylindrical portion 131, the front wall 132, the rear wall 133 and the pair of rotors 135, and the compressed high-pressure air is discharged to the side of the nozzle 5 from the exhaust port 124. In this manner, the roots pump 2b can generate high-pressure air by continuously performing suction, compression and exhaust without using lubricating oil or sealing liquid.

Further, in the above-described example, the application of the cleaner to the in-vehicle camera (not limited to the visible light) has been described. However, the sensor to which the cleaner according to the disclosure is applied is not limited thereto. One or more embodiments of the disclosure can be applied to any sensors attachable to a vehicle, such as LiDAR (laser radar), millimeter wave radars, and ultrasonic sensors.

Further, the part of the cleaner to be cleaned is not limited to the lens of the in-vehicle camera. For example, one or more embodiments of the disclosure can be applied to a cleaner for removing foreign objects adhering on a "partition wall" which is defined as a concept covering an optical lens of a sensor element, a cover for covering the front surface of an optical lens, a lamp having a portion functioning as a communication widow of a sensor, a cover for a vehicle-mounted part such as a mirror, a bumper, a grill and a door knob, and a vehicle window when a sensor is mounted in a vehicle interior. Meanwhile, the partition wall is not limited to a transparent member (translucency) and may not be transparent in ultrasonic sensors or millimeter wave radars or the like.

Meanwhile, in the above embodiments, the application of the cleaner to the in-vehicle camera has been described. However, the object to be cleaned, to which one or more embodiments of the disclosure is applied, is not limited as long as it is a camera used outdoors. For example, a camera mounted so as to be exposed to the outside of an airplane, a railroad, a ship, a robot, an outdoor installation object, a building and the like may be included.

While a limited number of embodiments are described in the present disclosure, those skilled in the art, having benefit of this disclosure, will appreciate that other embodiments can be devised which do not depart from the scope of the disclosure as disclosed herein. Accordingly, the scope of the disclosure should be limited only by the attached claims.

The invention claimed is:

1. A cleaner for cleaning an object to be cleaned, the cleaner comprising:
   a pump configured to generate high-pressure air,
   a nozzle configured to inject the high-pressure air toward a cleaning surface of the object to be cleaned, and
   a control unit configured to control an injection of the high-pressure air, wherein even when foreign objects do not adhere to the cleaning surface, the control unit executes an operation mode in which the high-pressure air is generated and injected when a predetermined condition is satisfied,
   wherein the object to be cleaned comprises at least one of a vehicle lamp and an in-vehicle sensor mounted on a vehicle,
   wherein the operation mode comprises a normal constant operation mode in which the high-pressure air is normally constantly injected, a first intermittent operation mode in which the high-pressure air is intermittently injected at a predetermined cycle, and a second intermittent operation mode in which the high-pressure air is injected at a cycle shorter than in the first intermittent operating mode, and
   wherein, as the predetermined condition, when it is detected that an outside air temperature is higher than a predetermined temperature, the control unit executes the first intermittent operation mode when it is detected that a travelling speed of the vehicle is equal to or lower than a predetermined speed, and executes the second intermittent operation mode when it is detected that the travelling speed of the vehicle is faster than the predetermined speed.

2. The cleaner according to claim 1,
   the predetermined condition comprises detection of a situation in which the outside air temperature of the vehicle is equal to or lower than the predetermined temperature.

3. The cleaner according to claim 2,
   wherein the predetermined temperature is 3° C.

4. The cleaner according to claim 1,
   wherein, as the predetermined condition, when it is detected that the outside air temperature is equal to or lower than the predetermined temperature, the control unit executes the normal constant operation mode.

5. The cleaner according to claim 1,
   wherein the predetermined speed is 50 km/h.

6. The cleaner according to claim 1,
   wherein the object to be cleaned is a back camera attached to a rear portion of a vehicle so that its lens is exposed toward an outside of a body panel of the vehicle, and the control unit executes the normal constant operation mode when it is detected that a shift position of a transmission of the vehicle is switched to a reverse range.

7. The cleaner according to claim 1,
   wherein the operation mode comprises a foreign object removal mode for removing foreign objects when it is detected that the foreign objects adhere to the cleaning surface, and a foreign object adhesion preventing mode for preventing adhesion of foreign objects when it is not detected that the foreign objects adhere to the cleaning surface.

8. The cleaner according to claim 1,
   wherein the object to be cleaned is an in-vehicle camera attached to a vehicle so that its lens is exposed toward an outside of a body panel of the vehicle.

9. A vehicle comprising the cleaner according to claim 1.

* * * * *